(12) United States Patent
Michiyama

(10) Patent No.: US 9,851,877 B2
(45) Date of Patent: Dec. 26, 2017

(54) IMAGE PROCESSING APPARATUS, IMAGE PROCESSING METHOD, AND COMPUTER PROGRAM PRODUCT

(71) Applicant: JVC KENWOOD Corporation, Yokohama-shi (JP)

(72) Inventor: Reiji Michiyama, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 541 days.

(21) Appl. No.: 14/472,242

(22) Filed: Aug. 28, 2014

(65) Prior Publication Data
US 2014/0368621 A1 Dec. 18, 2014

Related U.S. Application Data

(63) Continuation of application No. PCT/JP2013/054027, filed on Feb. 19, 2013.

(30) Foreign Application Priority Data

Feb. 29, 2012 (JP) ................................ 2012-044776
Feb. 29, 2012 (JP) ................................ 2012-044785
(Continued)

(51) Int. Cl.
*H04N 13/02* (2006.01)
*G06F 3/0484* (2013.01)
(Continued)

(52) U.S. Cl.
CPC ...... *G06F 3/04842* (2013.01); *G06F 3/04815* (2013.01); *G06T 7/75* (2017.01);
(Continued)

(58) Field of Classification Search
CPC . G06F 3/04815; G06F 3/04842; G06T 15/20; G06T 19/006; G06T 2200/04;
(Continued)

(56) References Cited

U.S. PATENT DOCUMENTS

2007/0226616 A1 9/2007 Gagvani et al.
2007/0247525 A1 10/2007 Samarasekera et al.
(Continued)

FOREIGN PATENT DOCUMENTS

JP 2000-331279 A 11/2000
JP 2007-088584 A 4/2007
(Continued)

OTHER PUBLICATIONS

Collins et al. "A System for Video Surveillance and Monitoring", Carnegie Mellon University 2000 (Collins).*
(Continued)

*Primary Examiner* — Mohammed Rahaman
(74) *Attorney, Agent, or Firm* — Venable LLP; Michael A. Sartori; Miguel A. Lopez

(57) ABSTRACT

Provided is an image processing apparatus that includes: a three-dimensional model storage unit configured to store a three-dimensional model data, positions of a plurality of devices including a camera disposed in a three-dimensional region as positions in the three-dimensional model, and a plurality of device icons; an acquiring unit configured to acquire a shot image taken at the camera and a shooting direction when shooting; a composing unit configured to determine a view point with respect to the three-dimensional model of the camera position disposed in the three-dimension region, generate a three-dimensional model by disposing the device icons according to the determined view point and the shooting direction, generate a two-dimensional projection image, and generate a composite image by com-
(Continued)

posing the shot image in a predetermined region on the generated two-dimensional projection image; and an output unit configured to output the composite image.

14 Claims, 52 Drawing Sheets

(30) Foreign Application Priority Data

| Feb. 29, 2012 | (JP) | 2012-044787 |
|---|---|---|
| Feb. 29, 2012 | (JP) | 2012-044788 |
| Feb. 29, 2012 | (JP) | 2012-044791 |
| Oct. 1, 2012 | (JP) | 2012-219198 |
| Oct. 1, 2012 | (JP) | 2012-219199 |
| Oct. 1, 2012 | (JP) | 2012-219200 |
| Oct. 1, 2012 | (JP) | 2012-219201 |
| Oct. 1, 2012 | (JP) | 2012-219204 |

(51) Int. Cl.

| H04N 5/232 | (2006.01) |
|---|---|
| G06T 15/20 | (2011.01) |
| G06T 19/00 | (2011.01) |
| H04N 13/00 | (2006.01) |
| H04N 5/77 | (2006.01) |
| H04N 9/804 | (2006.01) |
| G06F 3/0481 | (2013.01) |
| G06T 7/73 | (2017.01) |

(52) U.S. Cl.
CPC .............. *G06T 15/20* (2013.01); *G06T 19/006* (2013.01); *H04N 5/23216* (2013.01); *H04N 5/77* (2013.01); *H04N 9/8042* (2013.01); *H04N 13/004* (2013.01); *H04N 13/026* (2013.01); *G06T 2200/04* (2013.01); *G06T 2200/24* (2013.01); *G06T 2207/10016* (2013.01); *G06T 2207/20221* (2013.01); *G06T 2207/30232* (2013.01); *H04N 5/23203* (2013.01)

(58) Field of Classification Search
CPC ....... G06T 2200/24; G06T 2207/10016; G06T 2207/20221; G06T 2207/30232; G06T 7/0046; H04N 13/004; H04N 13/026; H04N 5/23203; H04N 5/23216; H04N 5/77

See application file for complete search history.

(56) References Cited

U.S. PATENT DOCUMENTS

| 2008/0074494 | A1* | 3/2008 | Nemethy | G01S 3/7864 |
| | | | | 348/143 |
| 2008/0291279 | A1* | 11/2008 | Samarasekera | G08B 13/19693 |
| | | | | 348/159 |
| 2011/0043627 | A1* | 2/2011 | Werling | G06T 19/006 |
| | | | | 348/143 |
| 2012/0191223 | A1* | 7/2012 | Dharwada | G05B 15/02 |
| | | | | 700/17 |

FOREIGN PATENT DOCUMENTS

| JP | 2008-005450 A | 1/2008 |
| JP | 2008-502228 A | 1/2008 |

OTHER PUBLICATIONS

International Search Report and Written Opinion in PCT International Application No. PCT/JP2013/054027, dated May 7, 2013.

* cited by examiner

FIG.4
111
| THREE-DIMENSIONAL MODEL DATA | DEVICE ID | ICON TYPE ID | ICON POSITION |
|---|---|---|---|
| ENTIRE MONITOR AREA | #01 | A001 | $(x_1, y_1, z_1)$ |
| | #02 | A001 | $(x_2, y_2, z_2)$ |
| | #1001 | A002 | $(x_3, y_3, z_3)$ |
| | ⋮ | ⋮ | ⋮ |
| ICON TYPE ID | ICON |
|---|---|
| A001 | 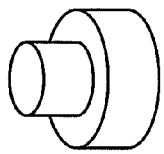 |
| A002 |  |
| ⋮ | ⋮ |

| VIEW POINT POSITION ID | VIEW POINT POSITION |
|---|---|
| B001 (ENTIRE MONITOR AREA) | $(x_{10}, y_{10}, z_{10})$ |
| B011 (CAMERA 1) | $(x_{11}, y_{11}, z_{11})$ |
| B012 (CAMERA 2) | $(x_{12}, y_{12}, z_{12})$ |
| ⋮ | ⋮ |

FIG.28

| HIERARCHY | THREE-DIMENSIONAL MODEL DATA | DEVICE ID | ICON TYPE ID | ICON POSITION |
|---|---|---|---|---|
| FIRST HIERARCHY | ENTIRE MONITOR AREA | #01 (CAMERA 1) | A001 | $(x_1, y_1, z_1)$ |
| | | #02 (CAMERA 2) | A001 | $(x_2, y_2, z_2)$ |
| | | #1001 (SENSOR 1) | A002 | $(x_3, y_3, z_3)$ |
| | | ⋮ | ⋮ | ⋮ |
| SECOND HIERARCHY | MALL AREA | | | |
| THIRD HIERARCHY | CENTRAL AREA | #301 (CAMERA 6) | A001 | $(x_{31}, y_{31}, z_{31})$ |
| | | #302 (CAMERA 7) | A001 | $(x_{32}, y_{32}, z_{32})$ |
| | | ⋮ | ⋮ | ⋮ |
| | WEST SECOND FLOOR AREA | #306 (CAMERA 8) | A001 | $(x_{36}, y_{36}, z_{36})$ |
| | | #307 (CAMERA 9) | A001 | $(x_{37}, y_{37}, z_{37})$ |
| | | #308 (CAMERA 10) | A001 | $(x_{38}, y_{38}, z_{38})$ |
| ⋮ | ⋮ | ⋮ | ⋮ | ⋮ |

| ICON TYPE ID | ICON |
|---|---|
| A001 | |
| A002 | |
| ⋮ | ⋮ |

| VIEW POINT POSITION ID | VIEW POINT POSITION |
|---|---|
| B001 (ENTIRE MONITOR AREA) | $(x_{10}, y_{10}, z_{10})$ |
| B002 (MALL AREA) | $(x_{13}, y_{13}, z_{13})$ |
| B003 (CENTRAL AREA) | $(x_{14}, y_{14}, z_{14})$ |
| B004 (WEST SECOND FLOOR AREA) | $(x_{15}, y_{15}, z_{15})$ |
| B005 (WEST FIRST FLOOR AREA) | $(x_{16}, y_{16}, z_{16})$ |
| B006 (EAST SECOND FLOOR AREA) | $(x_{17}, y_{17}, z_{17})$ |
| B007 (EAST FIRST FLOOR AREA) | $(x_{18}, y_{18}, z_{18})$ |
| ⋮ | ⋮ |
| B011 (CAMERA 1) | $(x_{11}, y_{11}, z_{11})$ |
| B012 (CAMERA 2) | $(x_{12}, y_{12}, z_{12})$ |
| ⋮ | ⋮ |

FIG.35

| HIERARCHY | THREE-DIMENSIONAL MODEL DATA | VIEW POINT RANGE | | | | | | DEVICE ID | ICON TYPE ID | ICON POSITION |
|---|---|---|---|---|---|---|---|---|---|---|
| | | z-AXIS | | y-AXIS | | | | | | |
| | | ROTATION AXIS POSITION | RADIUS | ROTATION ANGLE RANGE | ROTATION AXIS POSITION | RADIUS | ROTATION ANGLE RANGE | | | |
| FIRST HIERARCHY | ENTIRE MONITOR AREA | $(x_{41}, y_{41})$ | $r_{11}$ | ±120° | $(x_{42}, y_{42})$ | $r_{12}$ | +40° TO −20° | #01 (CAMERA 1) | A001 | $(x_1, y_1, z_1)$ |
| | | | | | | | | #02 (CAMERA 2) | A001 | $(x_2, y_2, z_2)$ |
| | | | | | | | | #1001 (SENSOR 1) | A002 | $(x_3, y_3, z_3)$ |
| | | | | | | | | ... | | |
| SECOND HIERARCHY | MALL AREA | $(x_{43}, y_{43})$ | $r_{13}$ | ±100° | $(x_{44}, y_{44})$ | $r_{14}$ | +40° TO −20° | | | |
| | CENTRAL AREA | $(x_{45}, y_{45})$ | $r_{15}$ | ±120° | $(x_{46}, y_{46})$ | $r_{16}$ | +40° TO −20° | #301 (CAMERA 6) | A001 | $(x_{31}, y_{31}, z_{31})$ |
| | | | | | | | | #302 (CAMERA 7) | A001 | $(x_{32}, y_{32}, z_{32})$ |
| | | | | | | | | ... | | |
| THIRD HIERARCHY | WEST SECOND FLOOR AREA | $(x_{47}, y_{47})$ | $r_{17}$ | ±120° | $(x_{48}, y_{48})$ | $r_{18}$ | +40° TO −20° | #306 (CAMERA 8) | A001 | $(x_{36}, y_{36}, z_{36})$ |
| | | | | | | | | #307 (CAMERA 9) | A001 | $(x_{37}, y_{37}, z_{37})$ |
| | | | | | | | | #308 (CAMERA 10) | A001 | $(x_{38}, y_{38}, z_{38})$ |
| ... | | | | | | | | | | |

| ICON TYPE ID | ICON |
|---|---|
| A001 | |
| A002 | |
| ... | |

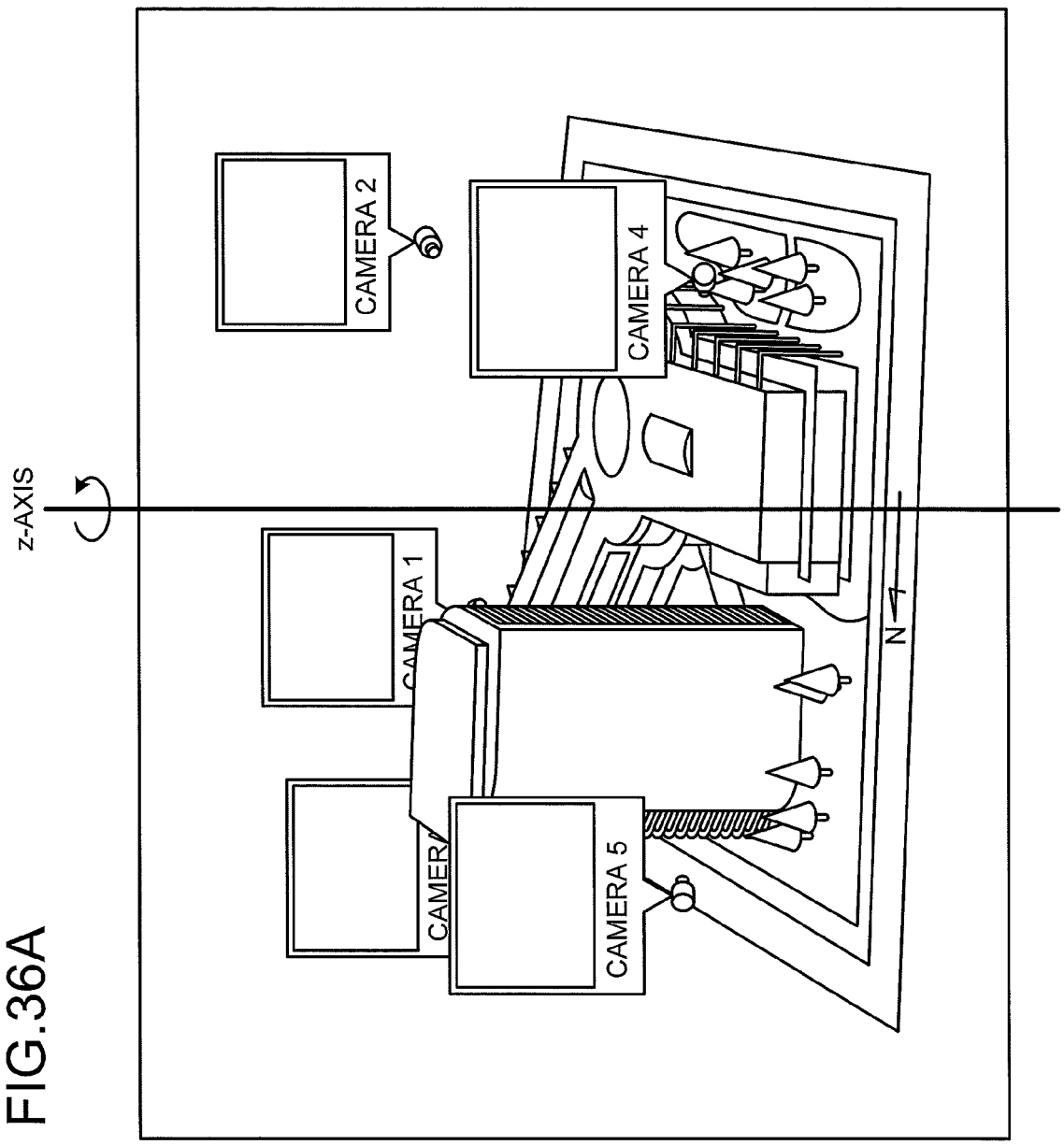

| DEVICE ID (CAMERA) | SHOOTING TIME | PTZ INFORMATION | SHOT IMAGE | SELECT FLAG |
|---|---|---|---|---|
| #01 | 13:00:01 | P:20, T:-5, Z:0 | FRAME #101 | 0 |
| #01 | 13:00:02 | P:20, T:-5, Z:0 | FRAME #102 | 0 |
| #01 | 13:00:03 | P:20, T:-5, Z:+1 | FRAME #103 | 1 |
| #01 | 13:00:04 | P:20, T:-5, Z:+2 | FRAME #104 | 1 |
| #01 | 13:00:05 | P:20, T:-5, Z:+2 | FRAME #105 | 1 |
| ⋮ | ⋮ | ⋮ | ⋮ | ⋮ |

FIG.42

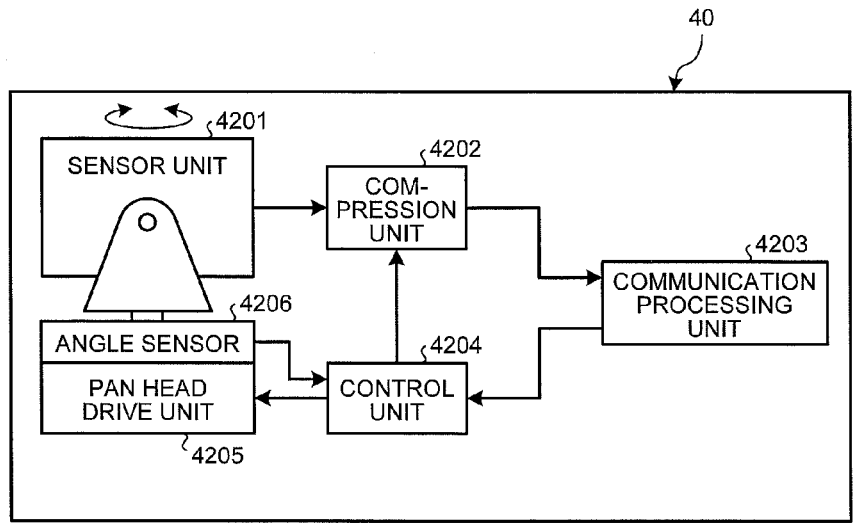

FIG.43

| EVENT ID | DEVICE ID (SENSOR) | DETECTED DATA | OCCURRING TIME | FINISH TIME | (PT INFORMATION) | CONFIRMATION FLAG |
|---|---|---|---|---|---|---|
| 11 | #1001 | HUMAN DETECTION | 13:23:15 | 13:25:17 | P:35, T:-60 | CONFIRMED |
| 12 | #1003 | HEAT DETECTION | 13:31:14 | 13:31:19 | (null) | CONFIRMED |
| 13 | #1001 | HUMAN DETECTION | 14:01:31 | 14:03:22 | P:15, T:-60 | (null) |
| 14 | #1002 | OPENING/ CLOSING OF DOOR | 14:11:22 | 14:11:39 | (null) | (null) |
| ⋮ | ⋮ | ⋮ | ⋮ | ⋮ | ⋮ | ⋮ |

FIG.44

| DEVICE ID (SENSOR) | COVER CAMERA ID | SENSOR IMPORTANCE DEGREE | SENSOR TYPE |
|---|---|---|---|
| #1001 | 01 | LOW | HUMAN DETECTION |
| #1002 | 01 | MIDDLE | OPENING/CLOSING OF DOOR |
| #1003 | 02 | HIGH | HEAT DETECTION |
| ⋮ | ⋮ | ⋮ | ⋮ |

IMAGE PROCESSING APPARATUS, IMAGE PROCESSING METHOD, AND COMPUTER PROGRAM PRODUCT

CROSS-REFERENCE TO RELATED APPLICATION(S)

This application is a continuation of PCT International Application Ser. No. PCT/JP2013/054027 filed on Feb. 19, 2013 which designates the United States, incorporated herein by reference; and which claims the benefit of priority from Japanese Patent Applications No. 2012-219204, filed on Oct. 1, 2012, Japanese Patent Applications No. 2012-219201, filed on Oct. 1, 2012, Japanese Patent Applications No. 2012-219200, filed on Oct. 1, 2012, Japanese Patent Applications No. 2012-219199, filed on Oct. 1, 2012, Japanese Patent Applications No. 2012-219198, filed on Oct. 1, 2012, Japanese Patent Applications No. 2012-044785, filed on Feb. 29, 2012, Japanese Patent Applications No. 2012-044776, filed on Feb. 29, 2012, Japanese Patent Applications No. 2012-044788, filed on Feb. 29, 2012, Japanese Patent Applications No. 2012-044787, filed on Feb. 29, 2012, and Japanese Patent Applications No. 2012-044791, filed on Feb. 29, 2012, incorporated herein by reference.

BACKGROUND OF THE INVENTION

1. Field of the Invention

The present invention relates to an image processing apparatus, an image processing method, and a computer program product.

2. Description of the Related Art

Heretofore, there is a technique in which a target is imaged by a camera to be made a target model, and the target model is composed at a corresponding position on a three-dimensional model on which a view point position and a line-of-sight direction are set in display, and the target model is displayed. For example, see Japanese Laid-open Patent Publication No. 2000-331279. Japanese Laid-open Patent Publication No. 2000-331279 discloses a technique in which a camera image in a region where an event occurs is displayed together with the three-dimensional model described above.

However, the previously existing technique has a problem in that it is difficult to intuitively grasp a region being taken at a camera. In the previously technique, since the view point position and line-of-sight direction in the three-dimensional model are not matched with the view point position and line-of-sight direction in the actual camera image, it is difficult to intuitively grasp the region taken at the camera.

SUMMARY OF THE INVENTION

There is a need to at least partially solve the problems in the conventional technology.

Provided is an image processing apparatus that includes: a three-dimensional model storage unit configured to store a three-dimensional model data expressing a three-dimensional model of a three-dimensional region, positions of a plurality of devices including a camera disposed in the three-dimensional region as positions in the three-dimensional model, and a plurality of device icons expressing types of the devices in the three-dimensional model; an acquiring unit configured to acquire a shot image taken at the camera and a shooting direction when shooting; a composing unit configured to determine a view point with respect to the three-dimensional model according to the camera position disposed in the three-dimension region, generate a three dimensional model by disposing the device icons corresponding to the device types on positions of the devices stored in the three dimensional model storing unit according to the determined view point and the shooting direction, generate a two-dimensional projection image that the three-dimensional model is projected onto a two-dimensional plane, and generate a composite image by composing the shot image in a predetermined region on the generated two-dimensional projection image; and an output unit configured to output the composite image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of exemplary items of information stored into a three-dimensional model storage unit;

FIG. 6 is a diagram of exemplary items of information stored into a view point information storage unit;

FIG. 28 is a diagram of exemplary items of information stored into a three-dimensional model storage unit;

FIG. 30 is a diagram of exemplary items of information stored into a view point information storage unit;

FIG. 35 is a diagram of exemplary items of information stored into a three-dimensional model storage unit;

FIG. 36A is a diagram of a two-dimensional projection image formed when a view point position is changed;

FIG. 42 is a diagram of an exemplary configuration of a sensor according to the first embodiment to an eleventh embodiment;

FIG. 43 is a diagram of an exemplary event management table held on an event storage unit illustrated in FIG. 40;

FIG. 44 is a diagram of an exemplary sensor management table managed at a three-dimensional model storage unit according to the tenth embodiment;

DETAILED DESCRIPTION OF THE PREFERRED EMBODIMENTS

In the following, embodiments of an image processing apparatus, an image processing method, and a computer program product for image processing will be described with reference to the accompanying drawings. It is noted that the present invention is not limited to the embodiments below. Moreover, the embodiments can be appropriately combined with each other in the scope consistent with the content.

First Embodiment

The Configuration of a Monitoring System According to a First Embodiment

Figure 1:
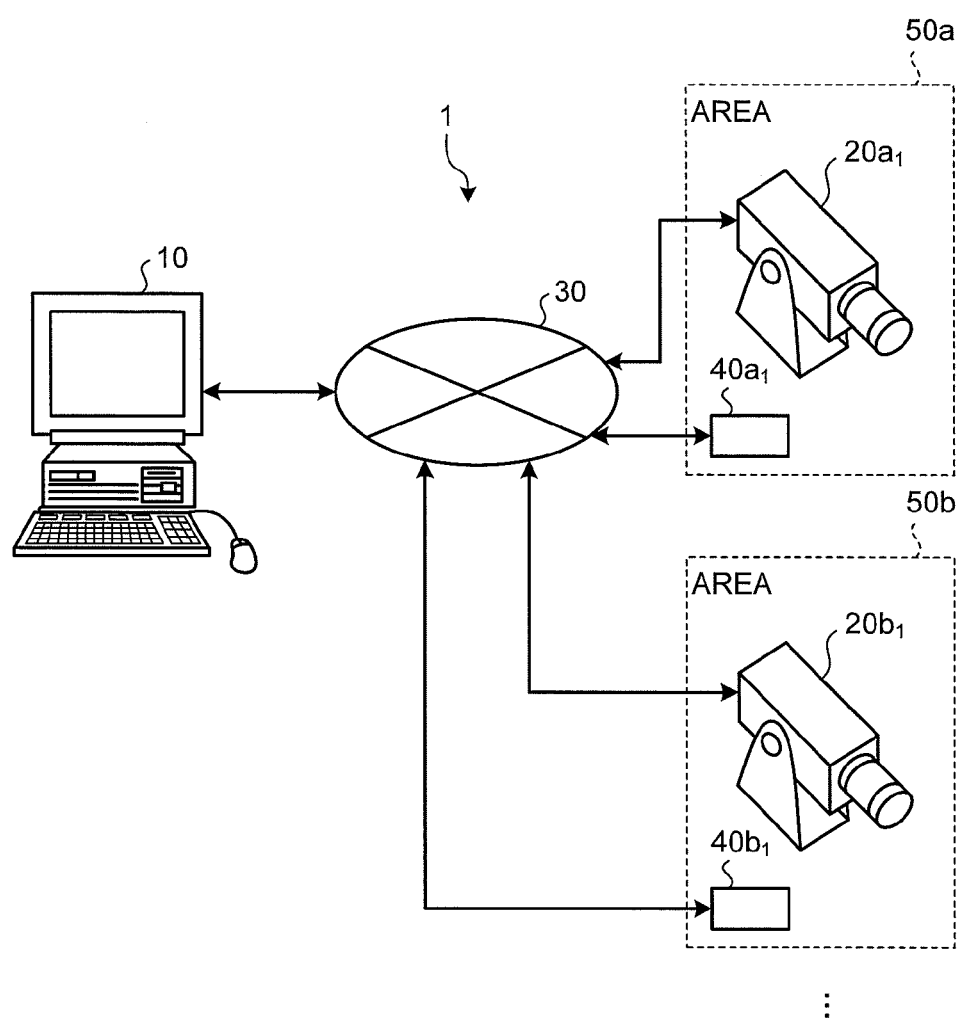
FIG. 1 is a diagram of an exemplary configuration of a monitoring system according to a first embodiment.

The configuration of a monitoring system according to a first embodiment will be described with reference to FIG. 1. FIG. 1 is a diagram of an exemplary configuration of a monitoring system according to the first embodiment.

As illustrated in FIG. 1, in a monitoring system 1, an image processing apparatus 10, an imaging device 20$a$1, a sensor 40$a$1, an imaging device 20$b$1, and a sensor 40$b$1 are connected to a network 30. This monitoring system 1 is used for monitoring a predetermined area. The image processing apparatus 10 is sometimes installed in an administration office in a store, and a guardroom in a security company, for example. In the following, the entire area monitored by the monitoring system 1 is sometimes referred to as "an entire monitor area".

Moreover, the imaging device 20$a$1 and the sensor 40$a$1 are disposed in an area 50$a$, which is a part of the entire monitor area. Similarly, the imaging device 20$b$1 and the sensor 40$b$1 are disposed in an area 50$b$, which is a part of the entire monitor area. In the area 50$a$, a plurality of imaging devices and a plurality of sensors are sometimes disposed in addition to the imaging device 20$a$1 and the sensor 40$a$1. Furthermore, in the area 50$b$, a plurality of imaging devices and a plurality of sensors are sometimes disposed in addition to the imaging device 20$b$1 and the sensor 40$b$1. In the following, the imaging device 20$a$1 and the imaging device 20$b$1 are sometimes referred to as "an imaging device 20". Moreover, in the following, the sensor 40$a$1 and the sensor 40$b$1 are sometimes referred to as "a sensor 40". Furthermore, in the following, an area 50$a$1 and an area 50$b$1 are sometimes referred to as "an area 50".

Among them, the imaging device 20 includes a camera that images a subject in an imaginable range included in the area 50. The imaging device 20 then sends a shot image, of which image taken at the camera is compressed, to the image processing apparatus 10. At this time, the imaging device 20 sends zoom information that is information about the zoom lens focal length of the camera when shooting and shooting direction information to the image processing apparatus 10 together with the shot image. This shooting direction information is pan information that is an angle in the horizontal direction of the shooting direction and tilt information that is an angle in the vertical direction of the shooting direction, for example.

The image processing apparatus 10 stores three-dimensional model data expressing a three-dimensional model of the entire monitor area. This three-dimensional model data is information expressing the shapes, sizes, and layout (positional information) of objects such as buildings in the entire monitor area. The three-dimensional model data is generated in advance by rendering using the shape of an object obtained by imaging at the imaging device 20 and information such as a view point, for example. Alternatively, the three-dimensional model data may be generated from a sketch drawing of the entire monitor area, for example. Additionally, the image processing apparatus 10 stores the camera positions of cameras (corresponding to the imaging devices 20) disposed in the entire monitor area and the camera positions are positions in the three-dimensional model.

The image processing apparatus 10 then acquires a shot image taken at the imaging device 20 and the zoom lens focal length and the shooting direction when shooting, for example, from the imaging device 20. Subsequently, the image processing apparatus 10 determines the view point in generating a two-dimensional image from a three-dimensional model based on the camera position; and generates a two-dimensional projection image according to the determined view point, the shooting direction, and the zoom lens focal length. After the generating, the image processing apparatus 10 generates a composite image by composing the shot image in a predetermined region in the generated two-dimensional projection image, and outputs the generated composite image.

The sensor 40 is a sensor including a human body sensor and an opening and closing sensor appropriately disposed in the area 50, for example, for detecting a person or the opening and closing of a door and sends an alarm. The sensor 40 sends detected data to the image processing apparatus 10.

In other words, the image processing apparatus 10 composes and outputs the shot image taken at the imaging device 20 to a predetermined region in the generated two-dimensional projection image according to the shooting direction of the imaging device 20, for example, so that a person seeing the composite image can intuitively grasp which region is the region taken at the camera in the entire monitor area. It is noted that the detailed configurations of the image processing apparatus 10 and the imaging device 20 will be described later.

The Configuration of the Imaging Device According to the First Embodiment

Figure 2:
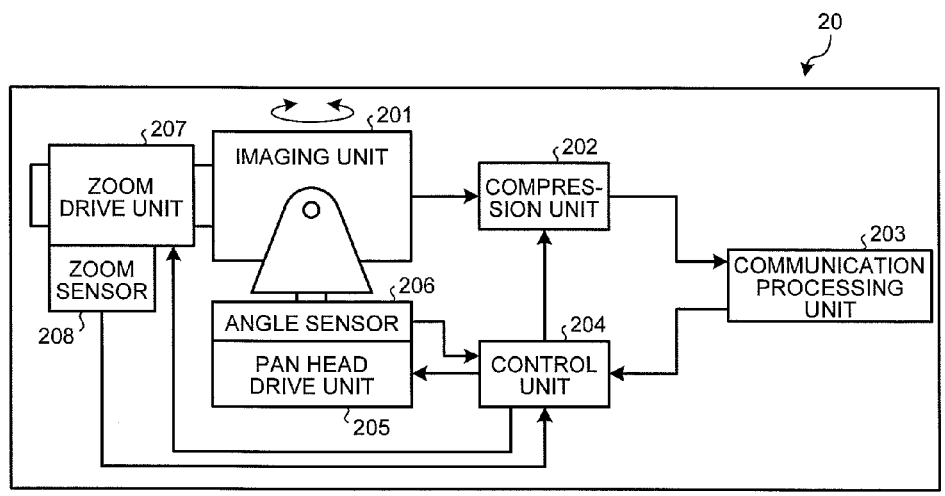
FIG. 2 is a diagram of an exemplary configuration of an imaging device according to the first embodiment.

Next, the configuration of the imaging device 20 according to the first embodiment will be described with reference to FIG. 2. FIG. 2 is a diagram of an exemplary configuration of the imaging device 20 according to the first embodiment.

As illustrated in FIG. 2, the imaging device 20 includes an imaging unit 201, a compression unit 202, a communication processing unit 203, a control unit 204, a pan head drive unit 205, an angle sensor 206, a zoom drive unit 207, and a zoom sensor 208. Moreover, the imaging device 20 is a network camera connected to the image processing apparatus 10 via the network 30, and can change the shooting direction according to control signals received via the network 30.

The imaging unit 201 takes a subject in the imaginable range, and outputs the taken shot image to the compression unit 202. The shot image may be a still image or a moving picture. The compression unit 202 compresses the shot image taken at the imaging unit 201 acceding to the standard such as JPEG (Joint Photographic Experts Group) or MPEG-4 (Moving Picture Experts Group phase 4), and outputs the compressed digital image as a shot image to the communication processing unit 203. Moreover, the compression unit 202 receives pan information, tilt information, and zoom information from the control unit 204, and adds them to the header or the footer of the shot image, for example. Thus, the shot image added with the pan information, the tilt information, and the zoom information is sent to the communication processing unit 203.

The communication processing unit 203 sends the shot image added with the pan information, the tilt information, and the zoom information and output from the compression unit 202 to the image processing apparatus 10 via the network 30. Moreover, the communication processing unit 203 outputs control signals received from an external device to the control unit 204. These control signals are control signals related to pan, tilt, and zoom, for example. Namely, as similar to a typical network camera, the communication processing unit 203 receives control signals from the external device for controlling the camera. The communication processing unit 203 according to the embodiment receives control signals from the image processing apparatus 10.

The control unit 204 controls the pan head drive unit 205 for panning and tilting and the zoom drive unit 207 to zoom a zoom lens. This control is based on control signals input through the communication processing unit 203. Moreover, in another example, the control unit 204 may perform the control according to a preset algorithm. Furthermore, the control unit 204 receives a pan angle and a tilt angle detected at the angle sensor 206, and sends the angles to the compression unit 202. In addition, the control unit 204 receives a zoom lens focal length detected at the zoom sensor 208, and sends the zoom lens focal length to the compression unit 202.

The pan head drive unit 205 changes the shooting direction of the imaging unit 201 according to control from the control unit 204, for example. This pan head drive unit 205 is provided with the angle sensor 206 that detects angles of the pan direction and the tilt direction. The angle sensor 206 detects a pan angle and a tilt angle, for example, and outputs the angles to the control unit 204. The zoom drive unit 207 is mounted on the zoom lens of the imaging unit 201. The zoom drive unit 207 changes the zoom lens focal length according to the zoom lens focal length instructed from the control unit 204, for example. The zoom lens is provided with the zoom sensor 208 that detects the zoom lens focal length. The zoom sensor 208 detects a zoom lens focal length, for example, and outputs the zoom lens focal length to the control unit 204. The control unit 204 appropriately controls the shooting direction and the zoom lens focal length of the imaging unit 201 based on the detected results at the angle sensor 206 and the zoom sensor 208 while confirming the shooting direction and the zoom lens focal length.

Figure 3:
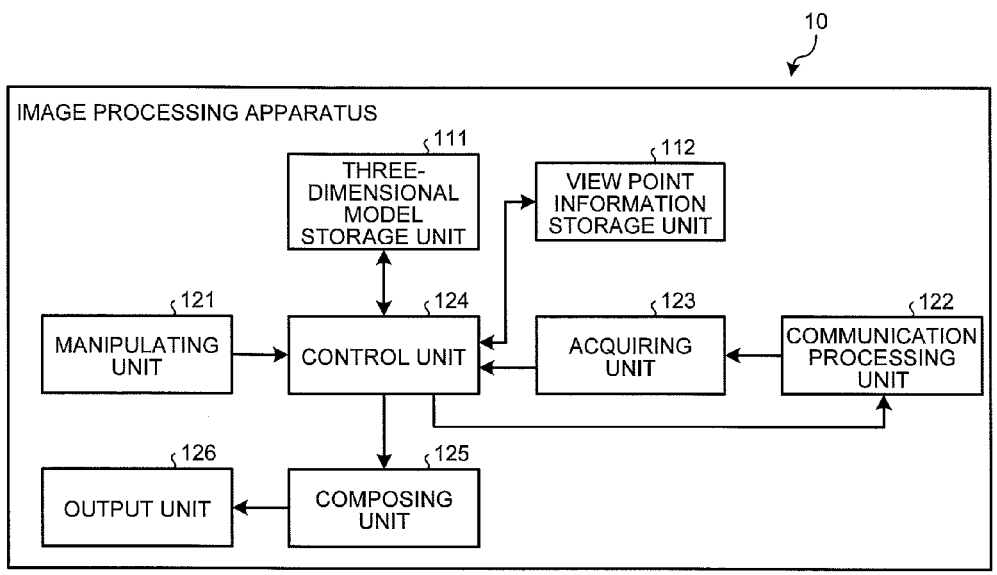
FIG. 3 is a diagram of an exemplary configuration of an image processing apparatus according to the first embodiment.

The Configuration of the Image Processing Apparatus According to the First Embodiment Next, the configuration of the image processing apparatus 10 according to the first embodiment will be described with reference to FIG. 3. FIG. 3 is a diagram of an exemplary configuration of the image processing apparatus 10 according to the first embodiment.

The image processing apparatus 10 includes a three-dimensional model storage unit 111, a view point information storage unit 112, a manipulating unit 121, a communication processing unit 122, an acquiring unit 123, a control unit 124, a composing unit 125, and an output unit 126. The image processing apparatus 10 is an information processing apparatus such as a PC (Personal Computer) connected to a network camera such as the imaging device 20 and to the sensor 40 via the network 30.

The three-dimensional model storage unit 111 stores three-dimensional model data, for example. FIG. 4 is a diagram of exemplary items of information stored into the three-dimensional model storage unit 111. As illustrated in FIG. 4, the three-dimensional model storage unit 111 stores three-dimensional model data expressing the three-dimensional model of the entire monitor area, device IDs (identifiers), icon type IDs, and icon positions in association with each other. Here, the device ID means identification information that is unique to a device disposed in the three-dimensional model expressed by three-dimensional model data and that identifies the device. The icon type ID means a type of an icon that expresses a device in the three-dimensional model. In the image processing apparatus 10 according to the embodiment, different types of icons are allocated to individual device types, and the icon type ID is information that identifies the type of an icon. The icon position is a position (coordinates) at which an icon is disposed in the three-dimensional model.

For example, as illustrated in FIG. 4, the three-dimensional model storage unit 111 stores the three-dimensional model data "entire monitor area", device ID "#01" expressing camera 1, icon type ID "A001" expressing a camera as an icon type, and icon position "(x1, y1, z1)" in association with each other. Therefore, the positions at which devices are disposed can be identified by making reference to the three-dimensional model storage unit 111. For example, in the example illustrated in FIG. 4, coordinates "(x1, y1, z1)", "(x2, y2, z2)", and "(x3, y3, z3)" in the three-dimensional model of "entire monitor area" can respectively be identified as the positions at which "camera 1", "camera 2", and "sensor 1" are disposed.

Moreover, as illustrated in FIG. 4, the three-dimensional model storage unit 111 stores three-dimensional parts models of various icons in association with the icon type IDs. It is noted that the three-dimensional parts model of an icon corresponding to the imaging device 20 includes a portion corresponding to a lens. In disposing the three-dimensional parts model of the imaging device 20 in the three-dimensional model, the orientation of the lens of the three-dimensional parts model of the imaging device 20 can be disposed as matched with the orientation of the lens (the shooting direction) of an actual imaging device 20.

Figure 5:
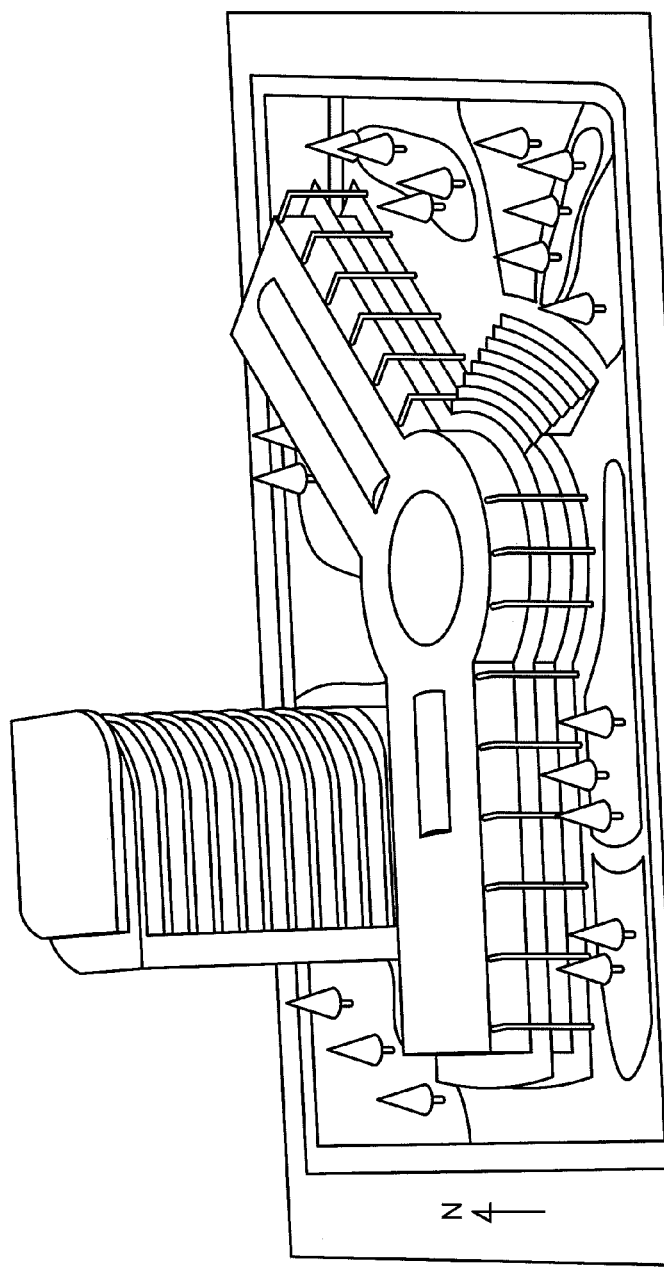
FIG. 5 is a diagram illustrative of three-dimensional model data.

FIG. 5 is a diagram illustrative of three-dimensional model data. It is noted that FIG. 5 is a bird's eye view of a three-dimensional model observed from a view point diagonally above the three-dimensional model. As illustrated in FIG. 5, the three-dimensional model is a model in which objects such as buildings, the ground, and trees in the entire monitor area are laid out according to the sizes of each objects. The three-dimensional model data is data expressing the shapes, sizes, and positions of these objects, for example. It is noted that the view point, the fixation point, and the angle of view are defined with respect to the three-dimensional model data, so that a two-dimensional projection image that is a two-dimensional image, in which a three-dimensional model is projected onto a two-dimensional plane, can be generated as the bird's eye view illustrated in FIG. 5.

The view point information storage unit 112 stores view point positions for use in generating a two-dimensional projection image from three-dimensional model data at the composing unit 125 described later. FIG. 6 is a diagram of exemplary items of information stored into the view point information storage unit 112. More specifically, the view point information storage unit 112 stores view point positions for use in generating the two-dimensional projection image of the entire monitor area and view point positions for use in generating the two-dimensional projection image of an area observed from the position at which the camera is disposed in association with view point position IDs that identify view point positions.

For example, as illustrated in FIG. 6, the view point information storage unit 112 stores the view point position ID "B001" expressing the entire monitor area and a view point position "(x10, y10, z10)" in association with each other. Moreover the view point information storage unit 112 stores the view point position ID "B011" expressing camera 1 and a view point position "(x11, y11, z11)" in association with each other. Here, the view point position in association with the view point position ID expressing a camera is a camera position. It is noted that the view point position ID of the view point position expressing a camera position may be the same value as the device ID of a camera (in the following, referred to as a camera ID). Thus, the view point position can be directly identified from the camera ID.

The manipulating unit 121 includes input devices such as a mouse and a touch panel, and accepts various instructions through user manipulations from a user of the monitoring system 1. For example, the manipulating unit 121 accepts a camera select instruction from the user. Moreover, when a predetermined camera (the imaging device 20) is selected by a user manipulation, the manipulating unit 121 accepts an instruction to output the shot image at the selected imaging device 20. Furthermore, the manipulating unit 121 accepts setting instructions for pan, tilt, and zoom with respect to a predetermined imaging device 20 by a user manipulation. It is noted that setting instructions for pan, tilt, and zoom are sent to the imaging device 20 as control signals related to pan, tilt, and zoom through the control unit 124 and the communication processing unit 122.

The communication processing unit 122 controls communication with the imaging device 20 and the sensor 40 connected via the network 30. For example, the communication processing unit 122 receives a shot image, pan information, tilt information, and zoom information from the imaging device 20. Moreover, the communication processing unit 122 sends the setting instructions for pan, tilt, and zoom accepted at the manipulating unit 121 as control signals related to pan, tilt, and zoom to the imaging device 20.

The acquiring unit 123 acquires a shot image, pan information and tilt information as the shooting direction, and zoom information from the imaging device 20 through the communication processing unit 122. Moreover, the acquiring unit 123 acquires detected data from the sensor 40. It is noted that detected data may include information (pan information and tilt information, for example) related to the detection direction of the sensor 40, for example.

The control unit 124 controls the overall image processing apparatus 10. For example, the control unit 124 outputs the shot image, the pan information, the tilt information, and the zoom information when shooting acquired at the acquiring unit 123 to the composing unit 125 according to the instruction accepted at the manipulating unit 121. Moreover, the control unit 124 acquires the three-dimensional model and the view point position from the three-dimensional model storage unit 111 according to the instruction accepted at the manipulating unit 121, and outputs them to the composing unit 125.

At this time, the control unit 124 also acquires the images of camera icons corresponding to the imaging devices 20 and sensor icons corresponding to the sensors 40, and the icon positions of the icons from the three-dimensional model storage unit 111; and outputs the acquired icons and the icon positions of the icons to the composing unit 125. Furthermore, the control unit 124 accepts the shot image taken at the imaging device 20 corresponding to each of the camera icons selected by the user as well as shot images corresponding to the camera icons from the acquiring unit 123, and also outputs the shot images to the composing unit 125.

The composing unit 125 generates a two-dimensional projection image based on the view point and the shooting direction of the three-dimensional model, and composes the shot image that is a two-dimensional image taken at the imaging device 20 in a predetermined region in the generated two-dimensional projection image. It is noted that a predetermined region is a region in a predetermined size set at a predetermined position in the two-dimensional projection image. For example, the composing unit 125 generates a two-dimensional projection image according to the view point position read out of the three-dimensional model storage unit 111 by the control unit 124 and the panning, tilting, and zooming of the imaging device 20 that takes a shot image to be a composite target. Subsequently, the composing unit 125 generates a composite image by composing the shot image output from the control unit 124 in a predetermined region near the center of the generated two-dimensional projection image, for example.

At this time, the composing unit 125 also disposes icons such as camera icons and sensor icons output from the control unit 124 in the two-dimensional projection image based on the icon positions. Moreover, the composing unit 125 composes shot images taken at the individual imaging devices 20 in regions (pop-ups, for example) each set near the camera icons corresponding to the imaging devices 20. It is noted that images displayed as pop-ups on the camera icons may be the thumbnails of the shot images. The regions set near the camera icons are regions smaller than a predetermined region described above, for example. As described above, the composing unit 125 accepts a shot image corresponding to a predetermined region as well as shot images taken at the imaging devices 20 from the control unit 124 for displaying the shot images as pop-ups in the regions set near the camera icons. Furthermore, in the embodiment and the other embodiments, it may be fine that the three-dimensional model storage unit 111 stores comments such as camera numbers, camera names, and places at which images are taken, in which a comment is superposed on a shot image to be displayed on a pop-up or only a comment is displayed as a pop-up.

The output unit 126 outputs a composite image. For example, the output unit 126 outputs a composite image including the icon composed in the two-dimensional projection image, the shot image composed in the region near the camera icon, or the shot image composed in a predetermined region of the two-dimensional projection image at the composing unit 125, for example. It is noted that the output unit 126 may be a display device that displays composite images; or the output unit 126 may output a composite image to a display device connected to the image processing apparatus 10.

The Overall Process Flow According to the First Embodiment

Figure 7:
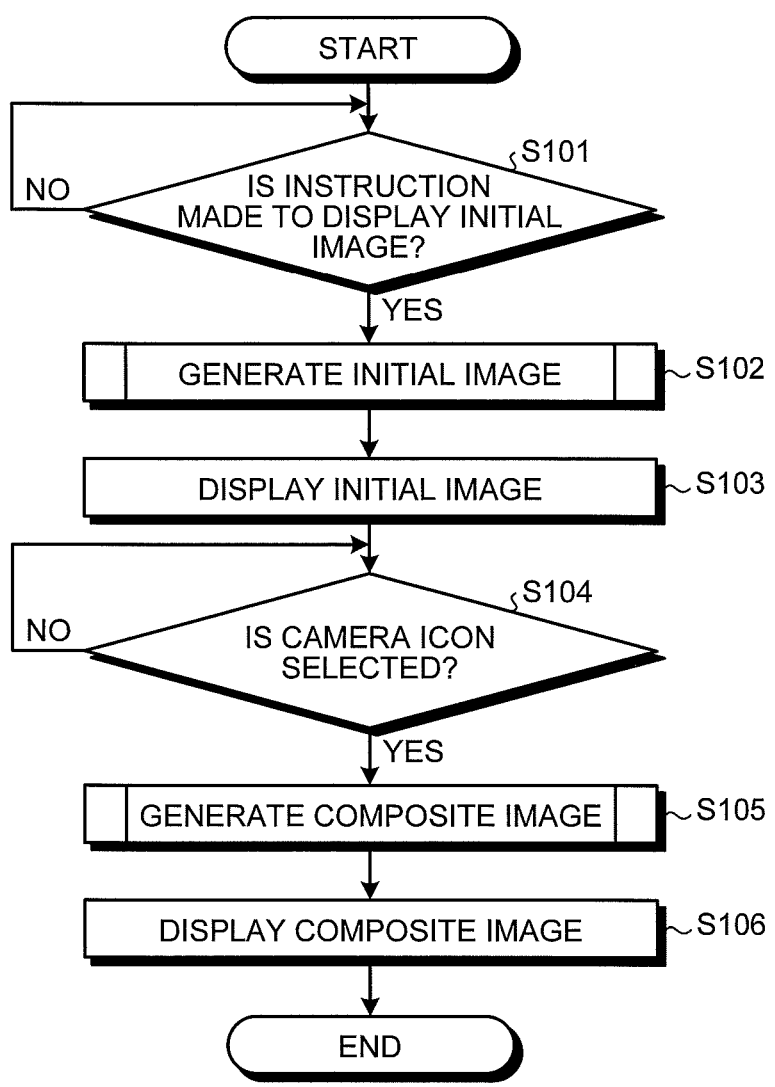
FIG. 7 is a flowchart of an exemplary overall process flow according to the first embodiment.

Next, the overall process flow according to the first embodiment will be described with reference to FIG. 7. FIG. 7 is a flowchart of an exemplary overall process flow according to the first embodiment.

For example, as illustrated in FIG. 7, in a case where the manipulating unit 121 of the image processing apparatus 10 accepts an instruction to display an initial image (YES in Step S101), the composing unit 125 generates an initial image (Step S102). The output unit 126 then displays the initial image generated at the composing unit 125 on a display screen (Step S103). On the other hand, in a case where the manipulating unit 121 does not accept an instruction to display an initial image (NO in Step S101), the manipulating unit 121 is in the state waiting for the display instruction for the initial image.

Figure 9:
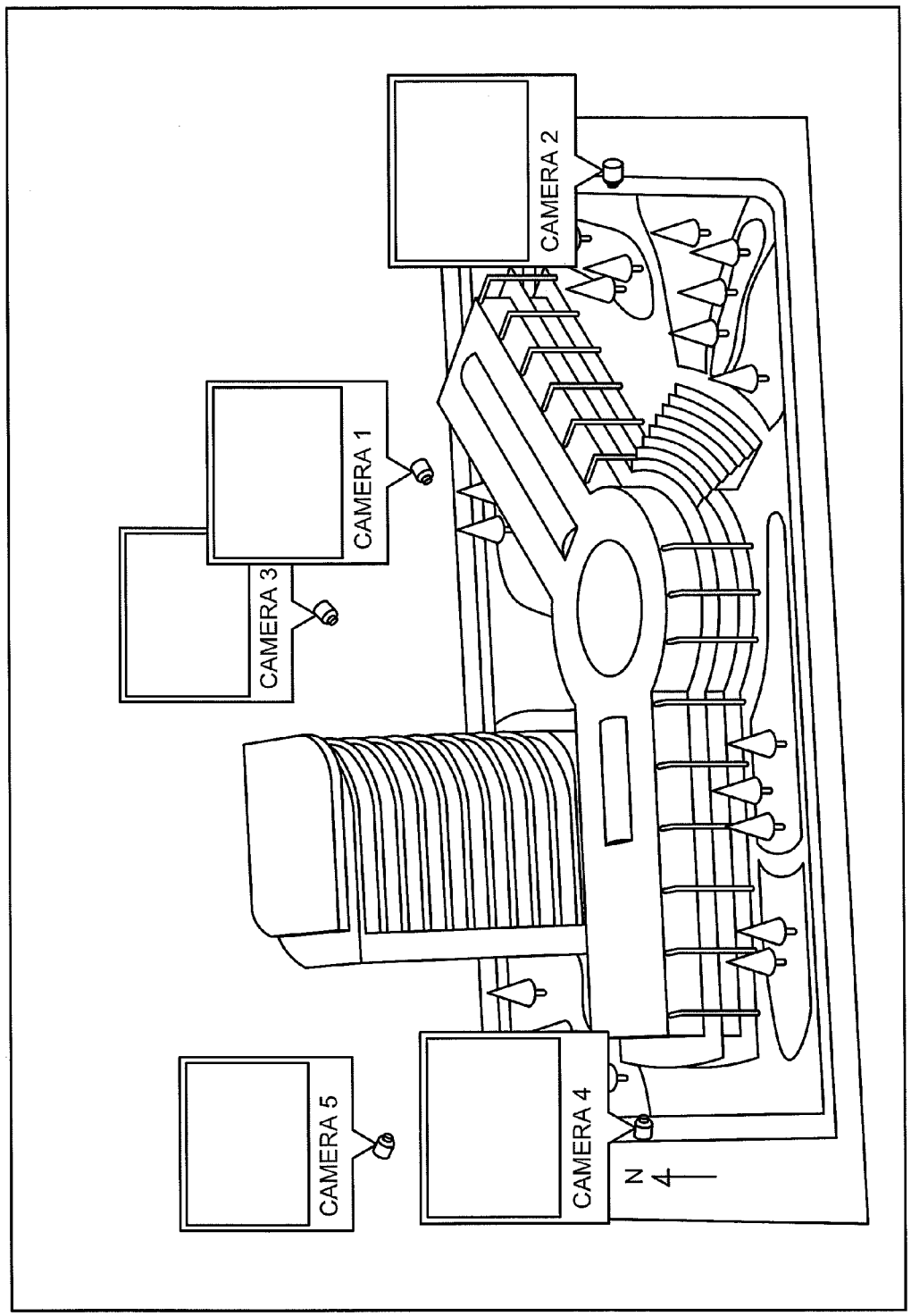
FIG. 9 is a diagram of an exemplary initial image.

FIG. 9 is a diagram of an exemplary initial image. As illustrated in FIG. 9, the initial image is a two-dimensional projection image of the entire monitor area. This initial image includes the icons of various devices stored in association with the three-dimensional model data of the entire monitor area on the three-dimensional model storage unit 111. The two-dimensional projection image illustrated in FIG. 9 includes camera icons corresponding to the imaging devices 20 as devices. Moreover, in the two-dimensional projection image illustrated in FIG. 9, shot images taken at the imaging devices 20 are displayed near the camera icons as pop-ups. In addition, in FIG. 9, the camera icons are disposed in midair. However, cameras are actually mounted on poles at a height of few meters from the ground, for example. Furthermore, in the case where the inside of a building is monitored, cameras are actually mounted on high places such as ceilings. Namely, camera icons are disposed in midair in the two-dimensional projection image such as an initial image, and it is suppressed that shields such as buildings hide the indications of the camera icons, so that the operability of selecting camera icons is improved. It is noted that although not illustrated in FIG. 9, in the case where the icons of various devices other than cameras such as the sensors 40 are included, the icons of the sensors 40, for example, are also displayed.

Again referring to FIG. 7, in the image processing apparatus 10, in the case where a camera icon is selected on the initial image by a user manipulation; and the manipulating unit 121 accepts a select instruction (YES in Step S104), the composing unit 125 generates a composite image that an image taken at the imaging device 20 corresponding to the selected camera icon is composed in a two-dimensional projection image having a view point at a position at which the selected camera icon is disposed (Step S105). The output unit 126 then displays the composite image on the display screen (Step S106). On the other hand, in the case where no camera icon is selected on the initial screen (NO in Step S104), the manipulating unit 121 is in the state waiting for selection of the camera icon.

The Initial Image Generating Process Flow According to the First Embodiment

Figure 8:
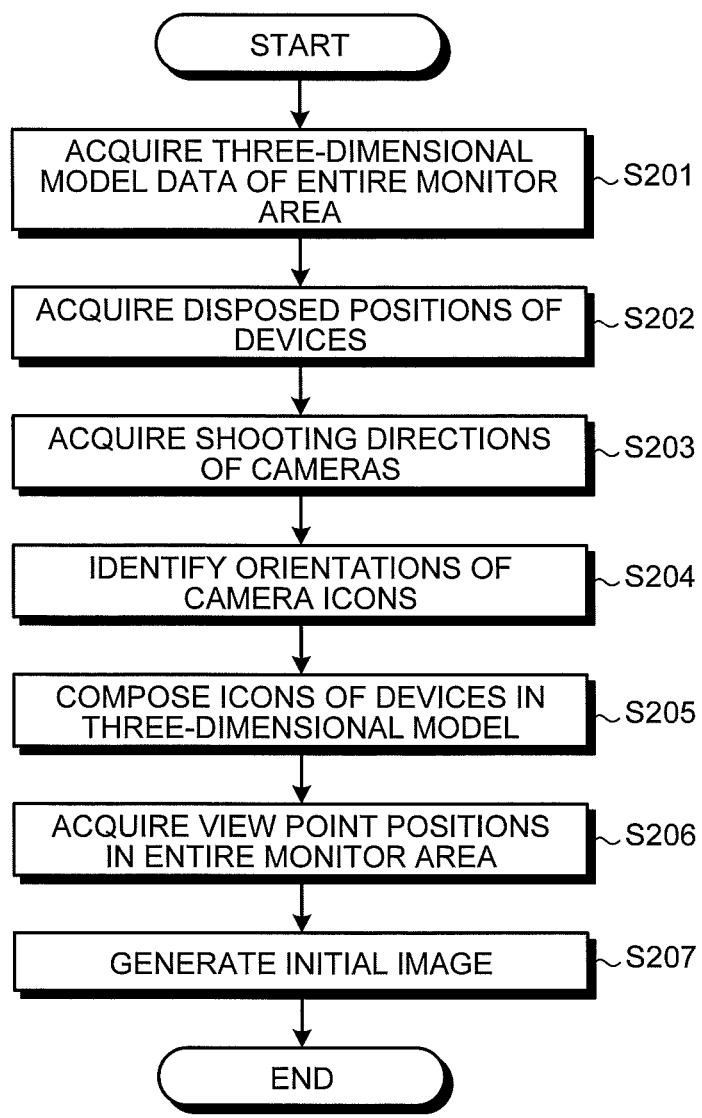
FIG. 8 is a flowchart of an exemplary initial image generating process flow according to the first embodiment.

Next, the initial image generating process flow according to the first embodiment will be described with reference to FIG. 8. FIG. 8 is a flowchart of an exemplary initial image generating process flow according to the first embodiment. It is noted that the initial image generating process according to the first embodiment is the process in Step S102.

As illustrated in FIG. 8, the composing unit 125 of the image processing apparatus 10 acquires the three-dimensional model data of the entire monitor area from the three-dimensional model storage unit 111 (Step S201). The composing unit 125 then acquires the disposed positions of the devices associated with the three-dimensional model of the entire monitor area, which are store in the three-dimensional model storage unit 111, that is, icons and the icon positions of the icons from the three-dimensional model storage unit 111 (Step S202). Subsequently, the composing unit 125 acquires the shooting directions sent from the imaging devices 20 through the communication processing unit 122, the acquiring unit 123, and the control unit 124 (Step S203).

After that, the composing unit 125 identifies the orientations of the camera icons from the acquired shooting directions (Step S204). The composing unit 125 then composes the icons of the devices at the icon positions in the three-dimensional model (Step S205). At this time, for the camera icons, the composing unit 125 disposes the camera icons in the three-dimensional model in a state in which the lenses of the camera icons are directed in the orientations identified in Step S204. However, for the devices such as the sensors 40 without orientations being set, the icons are composed at the corresponding icon positions in the three-dimensional model without considering into the orientations particularly.

The composing unit 125 then acquires the view point positions associated with the view point position IDs in the entire monitor area from the view point information storage unit 112 (Step S206). Subsequently, the composing unit 125 generates the two-dimensional projection image by rendering using a given method as by projecting the three-dimensional model onto the projection plane based on the acquired view point positions, the preset fixation points, and the angles of view; and the generated two-dimensional projection image is set to as an initial image (Step S207). It is noted that as illustrated in FIG. 9, in this initial image, the shot images taken at the imaging devices 20 corresponding to the camera icons are composed in pop-up regions set near the camera icons in the two-dimensional projection image.

The Image Process Flow According to the First Embodiment

Figure 10:
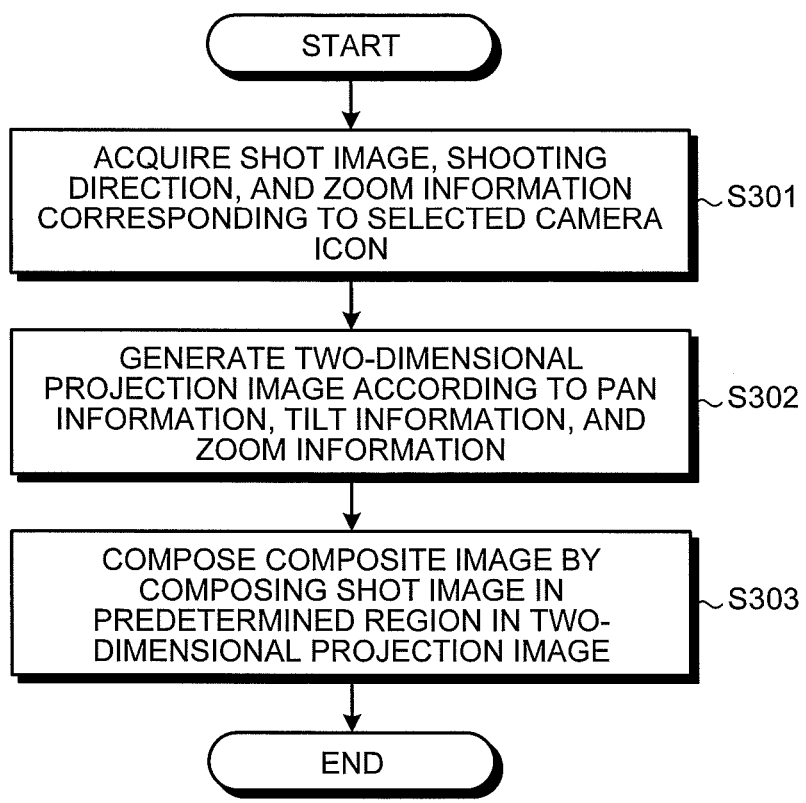
FIG. 10 is a flowchart of an exemplary image process flow according to the first embodiment.

Next, the image process flow according to the first embodiment will be described with reference to FIG. 10. FIG. 10 is a flowchart of an exemplary image process flow according to the first embodiment. It is noted that the image process according to the first embodiment is the process in Step S105.

For example, in the case where a camera icon is selected in the initial image by a user manipulation at the manipulating unit 121, the acquiring unit 123 acquires a shot image taken at the imaging device 20 corresponding to the camera icon, the shooting direction when shooting (pan information and tilt information), and zoom information (Step S301). Moreover, the composing unit 125 acquires the shot image, the pan information, the tilt information, and the zoom information acquired at the acquiring unit 123 through the control unit 124, and acquires a three-dimensional model, an icon, and an icon position (a camera position) from the three-dimensional model storage unit 111. The composing unit 125 then determines the view point, fixation point, and angle of view of the three-dimensional model based on the camera position, the pan information, the tilt information, and the zoom information. The composing unit 125 then generates a two-dimensional projection image from the three-dimensional model data based on the determined view point, the fixation point, and the angle of view (Step S302).

At this time, the composing unit 125 disposes the icons in the two-dimensional projection image based on the icon positions, and composes the shot image taken at the imaging device 20 corresponding to the camera icon on a pop-up set near the camera icon.

Figure 11:
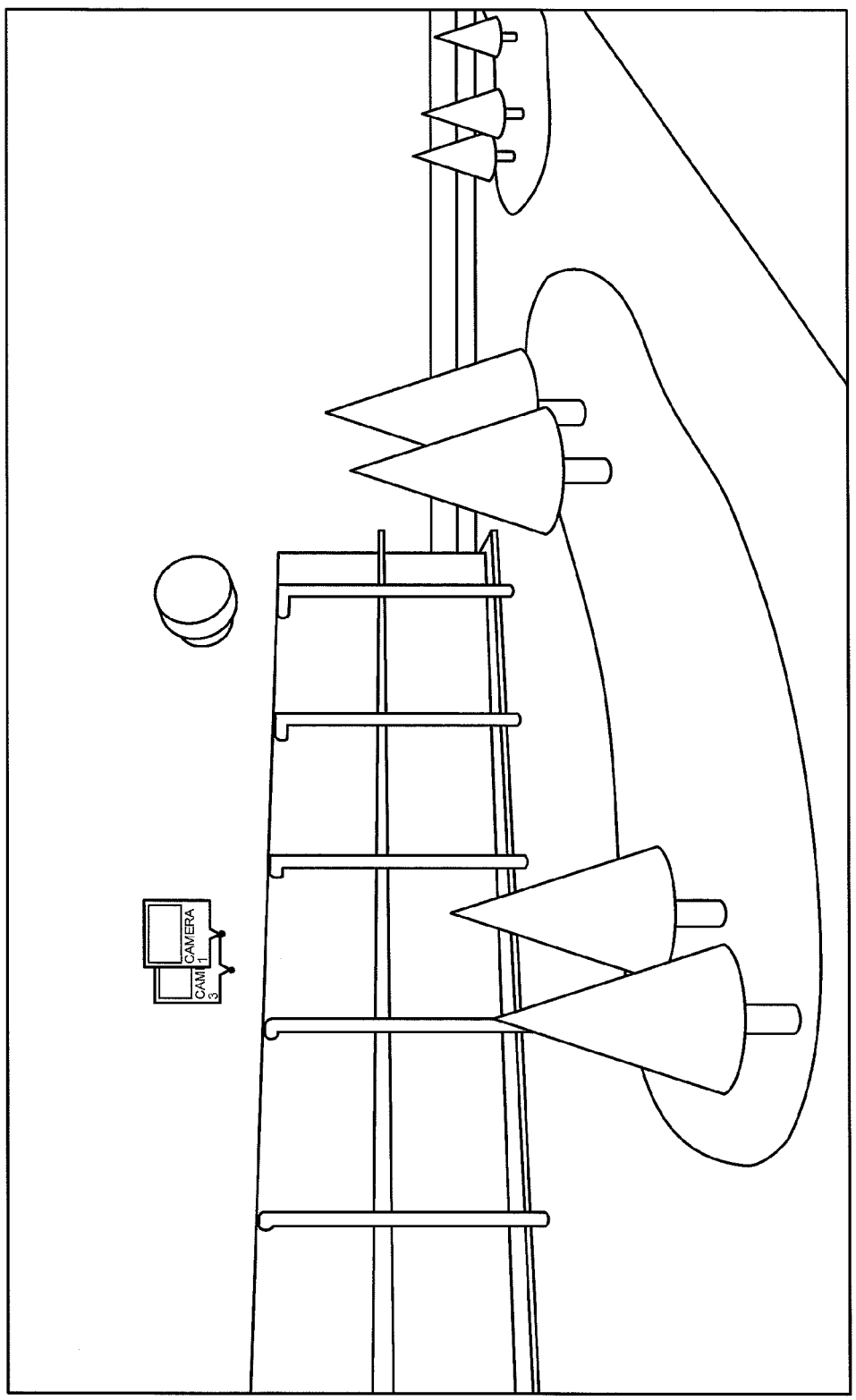
FIG. 11 is a diagram of an exemplary two-dimensional projection image.

FIG. 11 is a diagram of an exemplary two-dimensional projection image generated in the process in Step S302. As described above, the two-dimensional projection image includes camera icons disposed in the three-dimensional model and images taken at the imaging devices 20 corresponding to the camera icons.

Again referring to FIG. 10, the composing unit 125 generates a composite image by composing the shot image on a predetermined region in the two-dimensional projection image generated in Step S302 (Step S303).

Figure 12:
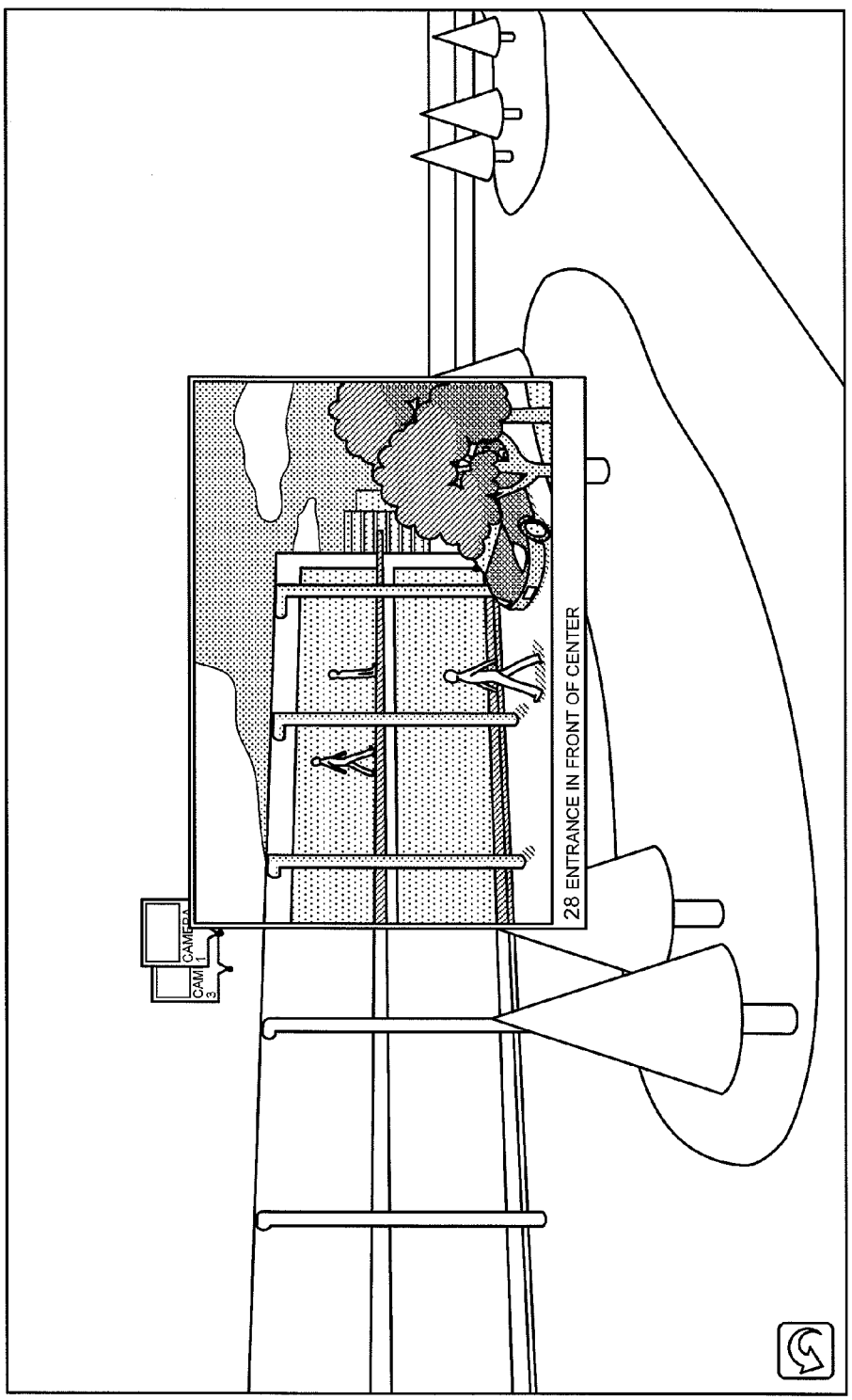
FIG. 12 is a diagram of an exemplary composite image.

FIG. 12 is a diagram of an exemplary composite image generated in the process in Step S303. As described above, in the composite image, a shot image actually taken at the imaging device 20 is superposed on the two-dimensional projection image. Here, the process in Step S303 will be described in detail with reference to FIG. 12. The composing unit 125 superposes the shot image on the two-dimensional projection image in such a way that the center position of the shot image is matched with the fixation point of the two-dimensional projection image in composing the shot image in the two-dimensional projection image. In the example illustrated in FIG. 12, both of the center position of the shot image and the fixation point of the two-dimensional projection image are matched with the center position of the composite image.

Moreover, in the composite image illustrated in FIG. 12, the shot image and the two-dimensional projection image are displayed at the same scaling factor in the composite image. As described above, the composing unit 125 adjusts the angle of view in generating the two-dimensional projection image according to zoom information in such a way that the shot image and the two-dimensional projection image are displayed at the same scaling factor. Thus, the person seeing the composite image can intuitively grasp which area in the entire monitor area is taken on the shot image in the composite image.

It is noted that in the embodiment, the composing unit 125 matches the center position of the shot image with the fixation point of the two-dimensional projection image in the composite image, and adjusts the angle of view the two-dimensional projection image in such a way that the shot image and the two-dimensional projection image are displayed at the same scaling factor. However, it may be fine that at least the shooting direction of the shot image is matched with the direction connecting the view point to the fixation point of the two-dimensional projection image (the observation direction). Namely, in another example, the composing unit 125 may generate a composite image in which the center position of the shot image is not matched with the fixation point of the two-dimensional projection image. For example, in the composite image illustrated in FIG. 12, the shot image is disposed in the center of the composite image. However, the shot image may be disposed at a lower right position instead of disposing the shot image in the center. Moreover, the scaling factors of the shot image and the two-dimensional projection image may be different. As described above, the viewer can intuitively grasp the correspondence between the shot image and the two-dimensional projection image as long as the shooting direction is matched with the observation direction; even though the shooting direction of the shot image is not matched with the fixation point of the two-dimensional projection image, or the scaling factors of the shot image and the two-dimensional projection image are different.

A button-like image (a button image) is further displayed at the lower left in the composite image illustrated in FIG. 12. This button image is provided for "returning to a previous image". In the case where the button-like image is selected by a user manipulation, the screen is returned to a selected screen such as the initial image.

It is noted that the acquiring unit 123 according to the embodiment acquires a shooting direction and zoom information from the imaging device 20 corresponding to the selected camera icon every time when a camera icon is selected. In another example, it may be fine that the acquiring unit 123 acquires a shooting direction or zoom information after changed from the imaging device 20 every time when the direction or zooming of the camera is changed in the imaging device 20, and stores them. In this case, since the acquiring unit 123 always stores the shooting direction and zoom information corresponding to the state of the actual imaging device 20, the shooting direction and the zoom information stored into the acquiring unit 123 are to be used in Step S302.

As described above, the image processing apparatus 10 acquires the image taken at the imaging device 20 and the shooting direction when shooting; generates a two-dimensional projection image based on the view point and the shooting direction of the three-dimensional model; composes the shot image in a predetermined region in the generated two-dimensional projection image; and outputs the image. As a result, the person seeing the composite image can intuitively grasp the region taken at the camera. In other words, the image processing apparatus 10 generates a two-dimensional projection image as matched with a shot image actually taken at the imaging device 20 and the shooting direction when shooting, and composes the shot image in a predetermined region of the two-dimensional projection image, so that the person seeing the composite image can intuitively grasp the region taken at the camera as compared with the previously existing technique in which the view point position and line-of-sight direction of the three-dimensional model are not matched with the view point position and line-of-sight direction of the actual camera image.

An Exemplary Modification According to the First Embodiment

Figure 13:
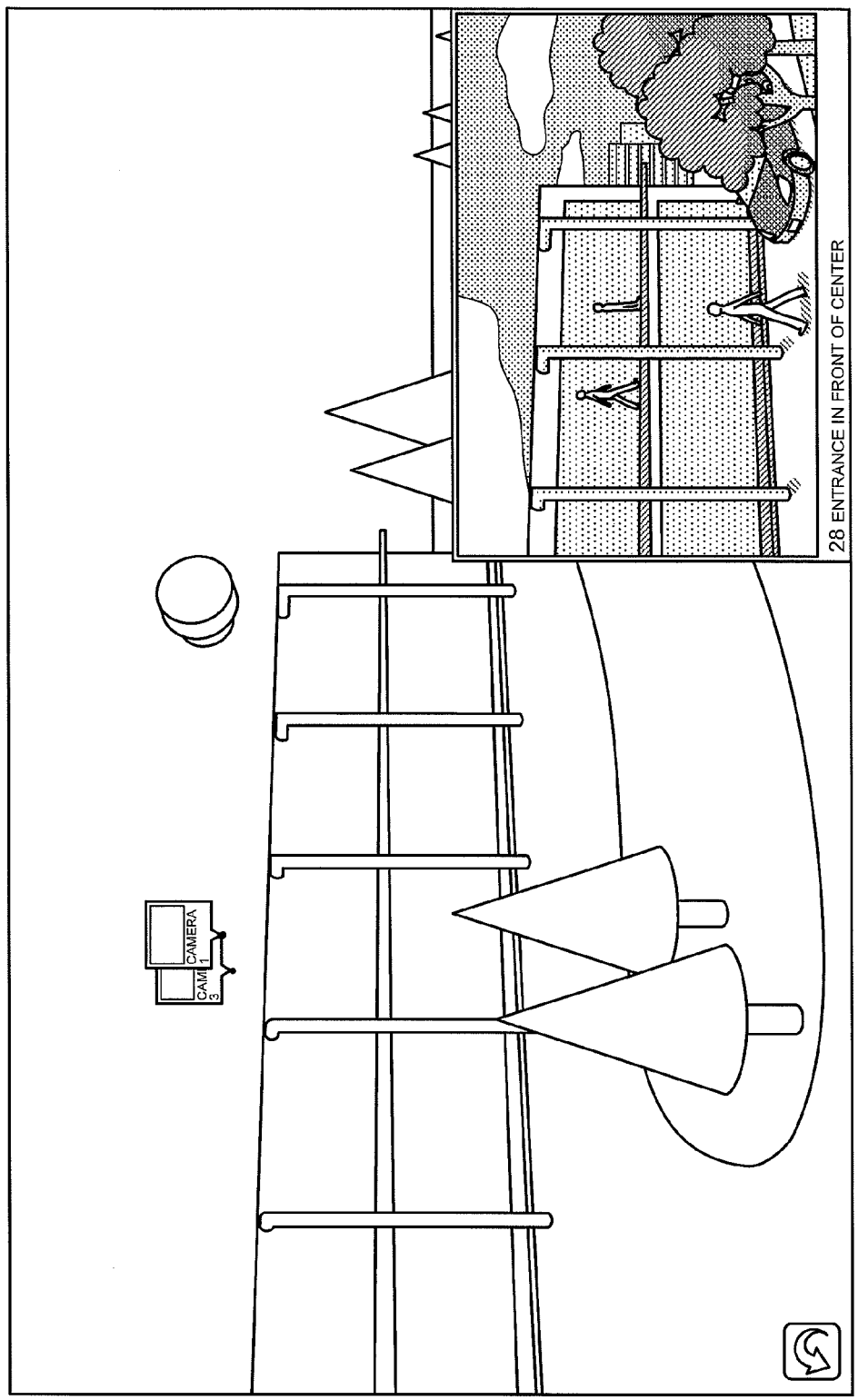
FIG. 13 is a diagram of an example in which the position of a predetermined region is changed.

In the first embodiment, the case is described where a predetermined region is superposed near the center of the two-dimensional projection image. However, the position of a predetermined region can be freely changed. FIG. 13 is a diagram of an example in which the position of a predetermined region is changed. For example, as illustrated in FIG. 13, the position of a predetermined region in the two-dimensional projection image may be disposed at a position at the lower right of the screen. As described above, a predetermined region is disposed at a place different from a place near the center, and thus the corresponding camera icon appears, and the orientation of the camera is known. Therefore, it is also possible to maintain the effect that the region taken at the camera can be intuitively grasped.

Second Embodiment

Making a Predetermined Object Transparent

In the first embodiment, the case is described where models of buildings and trees, various device icons, the shot image of a predetermined region, and pop-ups, for example, are composed and displayed on a two-dimensional projection image. It may be fine that a predetermined object is made transparent and displayed among them.

Figure 14A:
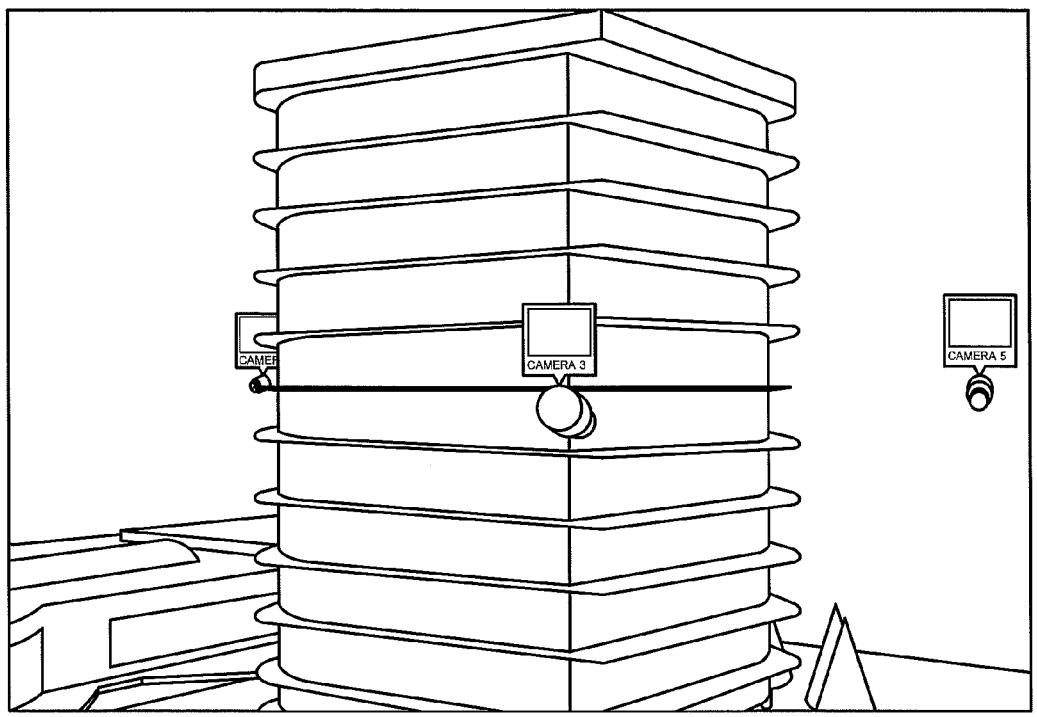
FIG. 14A is a diagram of an exemplary two-dimensional projection image before making a predetermined object transparent.
Figure 14B:
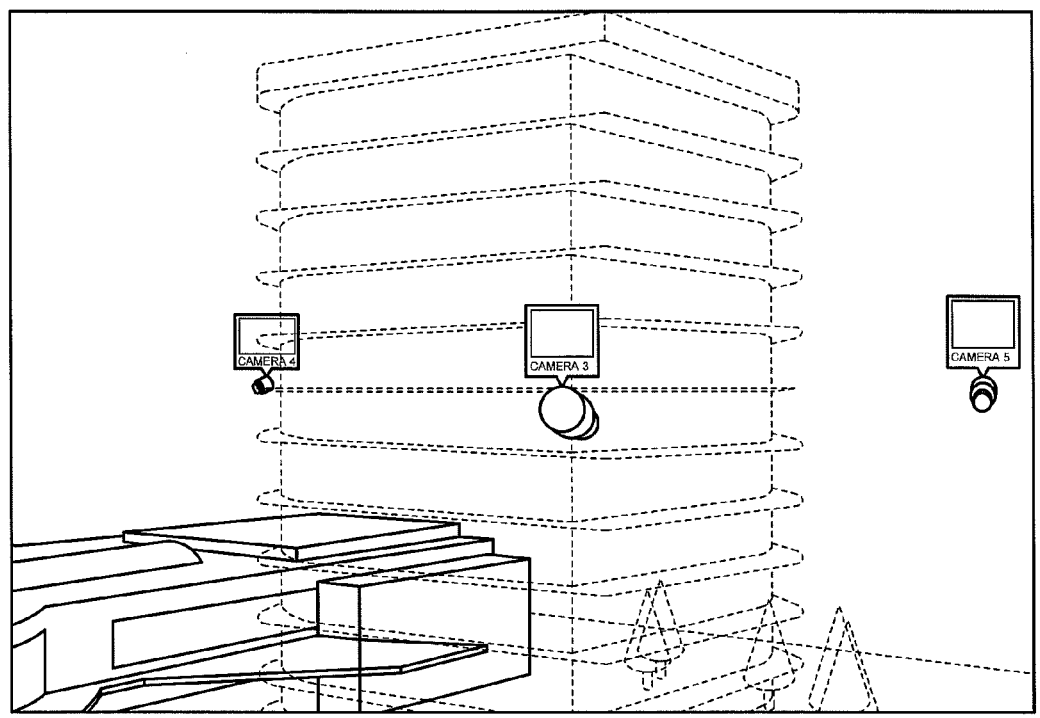
FIG. 14B is a diagram of an exemplary two-dimensional projection image after making a predetermined object transparent.

FIG. 14A is a diagram of an exemplary two-dimensional projection image before making a predetermined object transparent. FIG. 14B is a diagram of an exemplary two-dimensional projection image after making a predetermined object transparent. For example, in a two-dimensional projection image illustrated in FIG. 14A, the camera icon "camera 4" and the pop-up of the camera icon are hidden behind a building located near the center. In this state, in the case where the user selects an icon, it is likely that it is difficult for the user to make a selection, or sometimes the user can hardly make a selection.

Therefore, as illustrated in FIG. 14B, the composing unit 125 makes models transparent such as buildings, trees, and the ground, which are not to be selected, for facilitating a selection of the camera icon "camera 4". Moreover, a predetermined object may also be made transparent in the initial image. Furthermore, targets to be transparent are not limited to the description above. For example, pop-ups or a predetermined region in the two-dimensional projection image may be made transparent. Therefore, it is possible to improve the visibility of icons and pop-ups, for example, which are possibly hidden behind buildings or a predetermined region, for example, and to improve the operability of selecting camera icons.

Third Embodiment

Adjustment of the Size of the Pop-Up

In the first embodiment, the case is described where icons are composed in the two-dimensional projection image according to the icon positions of the icons. The size of the pop-up set near the icon composed in the two-dimensional projection image may be adjusted according to the icon position. More specifically, since icons and pop-ups are composed in the two-dimensional projection image according to the icon positions of the icons, the sizes of icons and pop-ups located in the back of the two-dimensional projection image become smaller. Thus, the visibility and operability of small icons and pop-ups are sometimes degraded. Therefore, the size of the pop-up set near the icon composed in the two-dimensional projection image is to be adjusted according to the icon position.

Figure 15A:
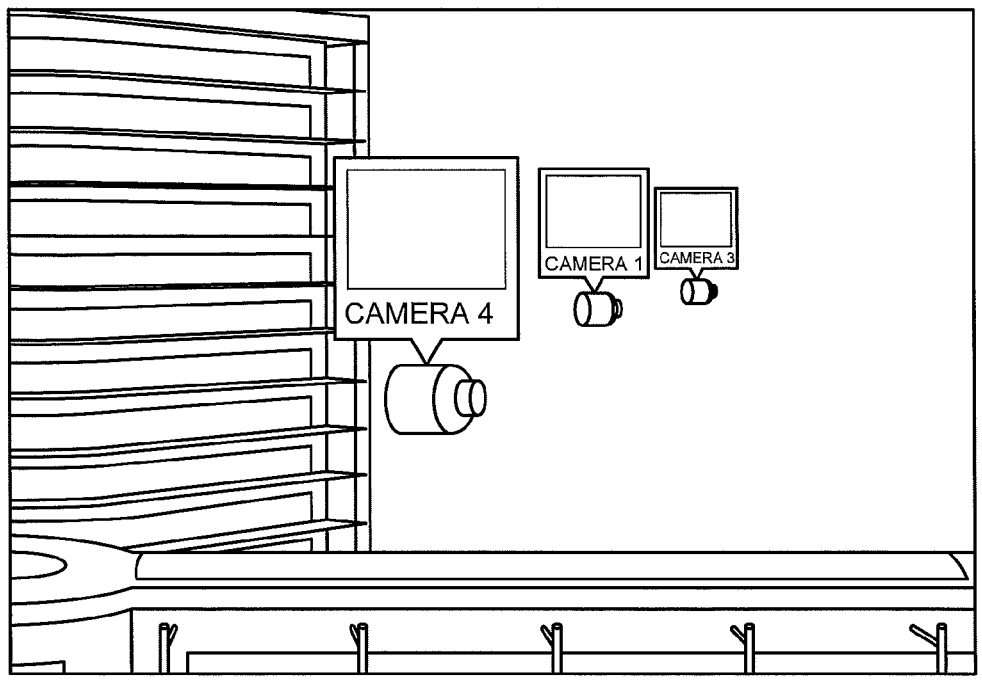
FIG. 15A is a diagram of an exemplary two-dimensional projection image before adjusting the sizes of pop-ups.
Figure 15B:
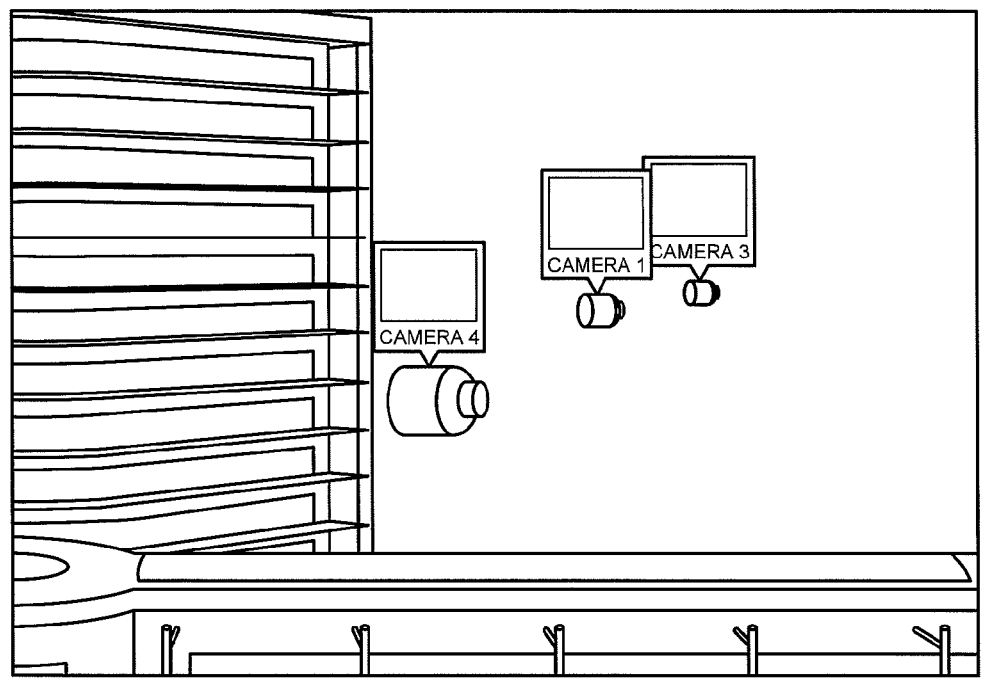
FIG. 15B is a diagram of an exemplary two-dimensional projection image after adjusting the sizes of pop-ups.

FIG. 15A is a diagram of an exemplary two-dimensional projection image before adjusting the sizes of pop-ups. Moreover, FIG. 15B is a diagram of an exemplary two-dimensional projection image after adjusting the sizes of pop-ups. For example, in a two-dimensional projection image illustrated in FIG. 15A, since icons are composed in the two-dimensional projection image according to icon positions, the pop-up of the camera icon "camera 3" is displayed particularly in a small size. Although an image taken at the imaging device 20 corresponding to "camera 3" is displayed on this pop-up, this is not preferable on visibility because the pop-up is displayed in a considerably small size.

Therefore, as illustrated in FIG. 15B, the composing unit 125 adjusts the sizes of the pop-ups of the camera icons "camera 3" and "camera 4" to the sizes that can secure visibility to some extent by adjusting the sizes as matched with the pop-up of the camera icon "camera 1". In addition to this, it may be fine that the size of the pop-up is adjusted as matched with the size of the pop-up positioned on the most front side in the two-dimensional projection image, or the size is adjusted as matched with the size appropriately determined according to the display screen size. Moreover, the size of the pop-up may be adjusted in the initial image as well. It is noted that although the size of the camera icon may be adjusted as well, it is unnecessary to adjust the camera icon in order to show the position relation between the cameras in the two-dimensional projection image. Accordingly, it is possible to improve the visibility of the pop-ups.

Fourth Embodiment

In the first embodiment, the case is described where a composite image is generated based on the shot image taken at the imaging device 20 and the shooting direction. However, it is also possible in which the shooting direction of the imaging device 20 is instructed according to a user's predetermined manipulation on a composite image; and a composite image is generated based on the shot image taken at the imaging device 20 and the shooting direction according to the received instruction. Therefore, in a fourth embodiment, the case will be described where the shooting direction of the imaging device 20 is instructed according to a user's predetermined manipulation on a composite image; and a composite image is generated based on the shot image taken at the imaging device 20 and the shooting direction received according to the instruction.

Figure 16:
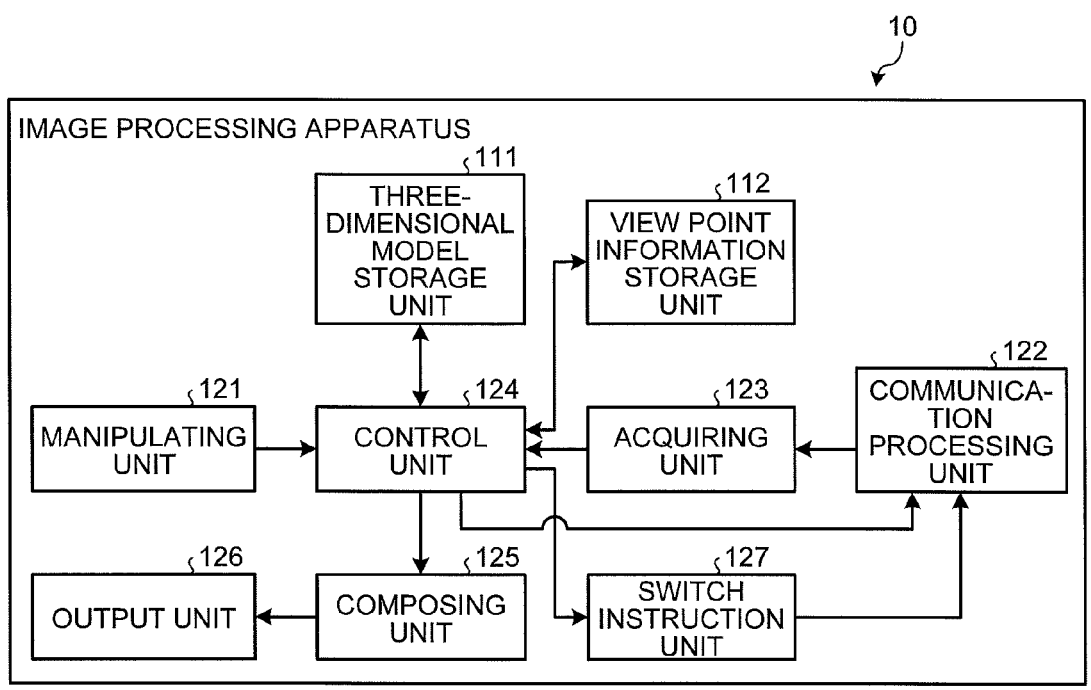
FIG. 16 is a diagram of an exemplary configuration of an image processing apparatus according to a fourth embodiment.

The Configuration of an Image Processing Apparatus According to a Fourth Embodiment The configuration of an image processing apparatus according the fourth embodiment will be described with reference to FIG. 16. FIG. 16 is a diagram of an exemplary configuration of the image processing apparatus according to the fourth embodiment. It is noted that in FIG. 16, for configurations including functions similar to the functions of the image processing apparatus 10 according to the first embodiment, the detailed description is sometimes omitted.

For example, as illustrated in FIG. 16, an image processing apparatus 10 includes a three-dimensional model storage unit 111, a view point information storage unit 112, a manipulating unit 121, a communication processing unit 122, an acquiring unit 123, a control unit 124, a composing unit 125, an output unit 126, and a switch instruction unit 127.

The switch instruction unit 127 calculates a shooting direction or a zoom lens focal length according to a predetermined user manipulation on a composite image, and instructs the imaging device 20 to switch the shooting direction or the zoom lens focal length to the calculated shooting direction or the calculated zoom lens focal length. Here, in order to describe processes performed at the switch instruction unit 127, processes will be described together with processes performed at the manipulating unit 121 and the control unit 124 involved in the processes performed at the switch instruction unit 127.

The manipulating unit 121 accepts a drag through a mouse or a touch panel in the state in which a camera icon is selected by a user manipulation, that is, in the state in which a composite image is displayed. For example, a drag means a drag using a mouse as a pointing device and a wheel using a mouse wheel on a two-dimensional projection image or from a given position in a predetermined region of the two-dimensional projection image. Alternatively, a drag means a drag and a pinch on a touch panel on a two-dimensional projection image or from a given position in a predetermined region of the two-dimensional projection image. Moreover, the control unit 124 outputs a drag direction and a distance accepted at the manipulating unit 121 to the switch instruction unit 127.

The switch instruction unit 127 calculates the zoom lens focal length of the imaging device 20 corresponding to the selected camera icon and the moving direction and the moving angle of the shooting direction based on the drag direction and the distance output from the control unit 124. The moving direction of the shooting direction is a drag direction on the composite image. Moreover, the zoom lens focal length is the length that a wheel or a pinch on the composite image is converted into the zoom lens focal length. Furthermore, the moving angle of the shooting direction is an angle that the drag distance (pixels) on the composite image is converted into the moving angle (degrees) of the shooting direction. For example, the moving angle of the shooting direction is 0.05 degrees when one pixel of a composite image is converted into the moving angle of the shooting direction.

The switch instruction unit 127 then instructs the imaging device 20 corresponding to the selected camera icon to switch the zoom lens focal length, the moving direction, and the moving angle according to the calculated zoom lens focal length and the moving direction and the moving angle of the shooting direction through the communication processing unit 122. After the instruction from the switch instruction unit 127, a two-dimensional projection image, which corresponds to pan information, tilt information, and zoom information received from the imaging device 20, is generated as similar to the first embodiment; and then a composite image is generated by composing a shot image in a predetermined region of a two-dimensional projection image.

Screen Transition According to the Fourth Embodiment

Figure 17A:
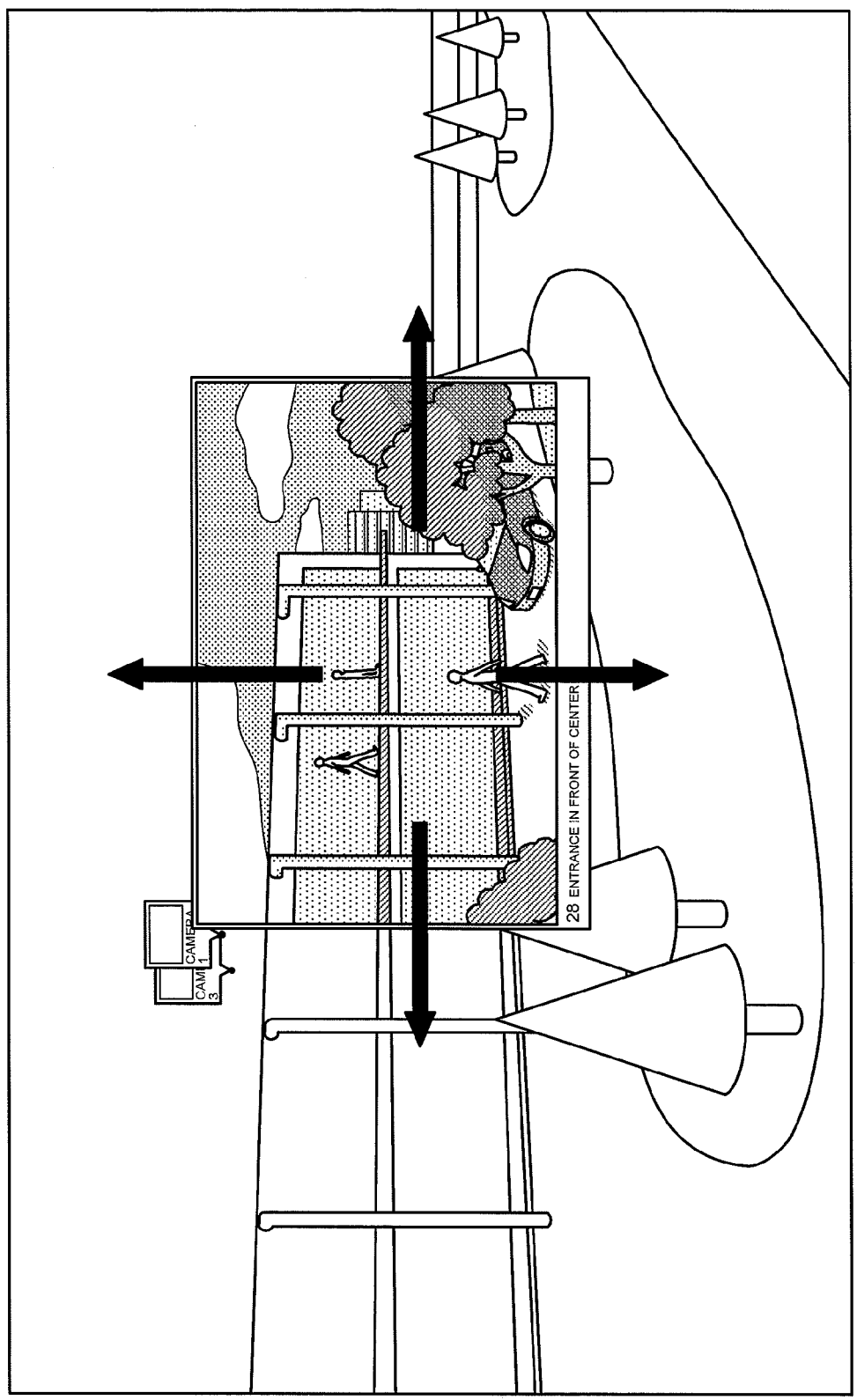
FIG. 17A is a diagram of an exemplary composite image before dragged.
Figure 17B:
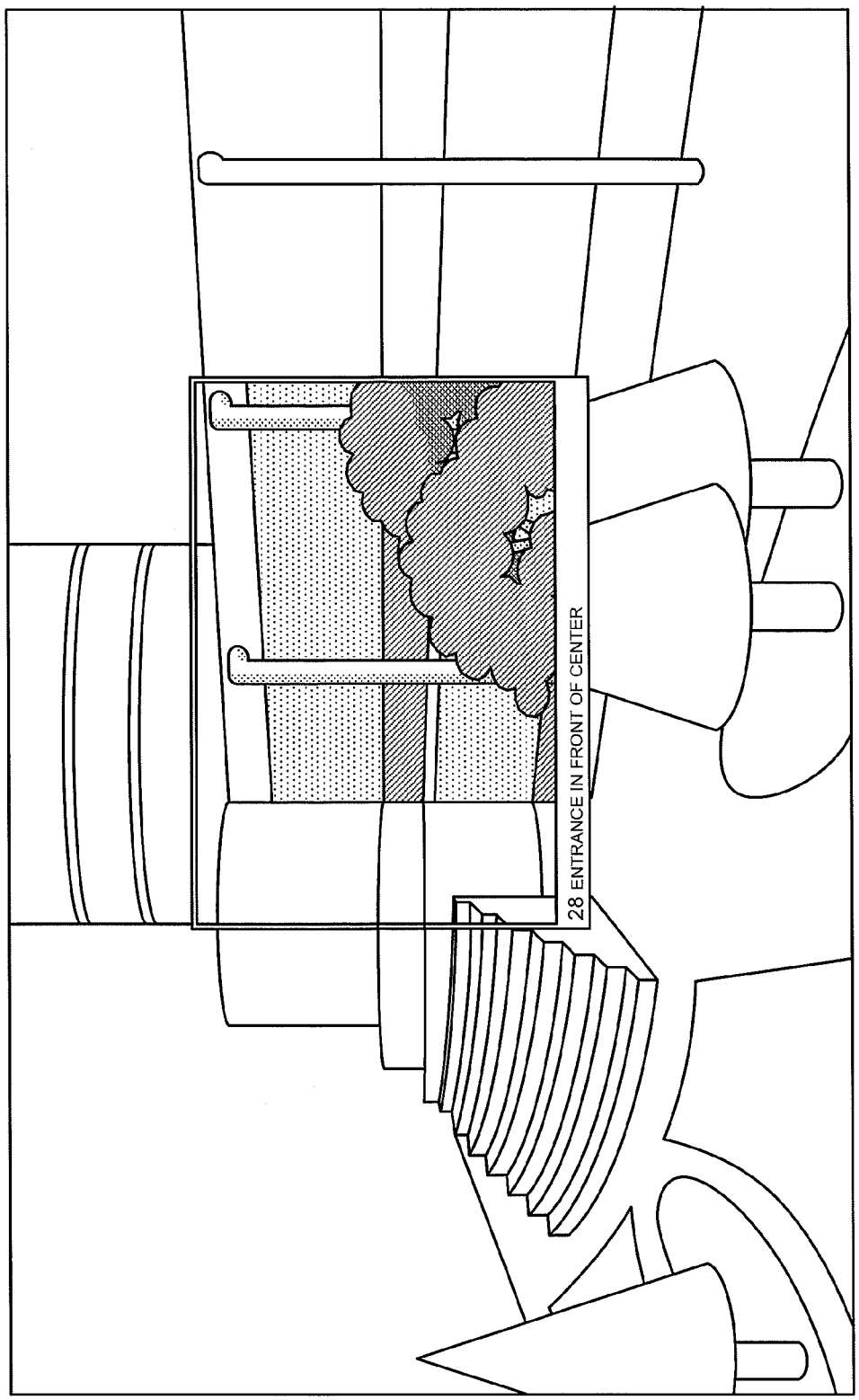
FIG. 17B is a diagram of an exemplary composite image when dragged rightward.
Figure 17C:
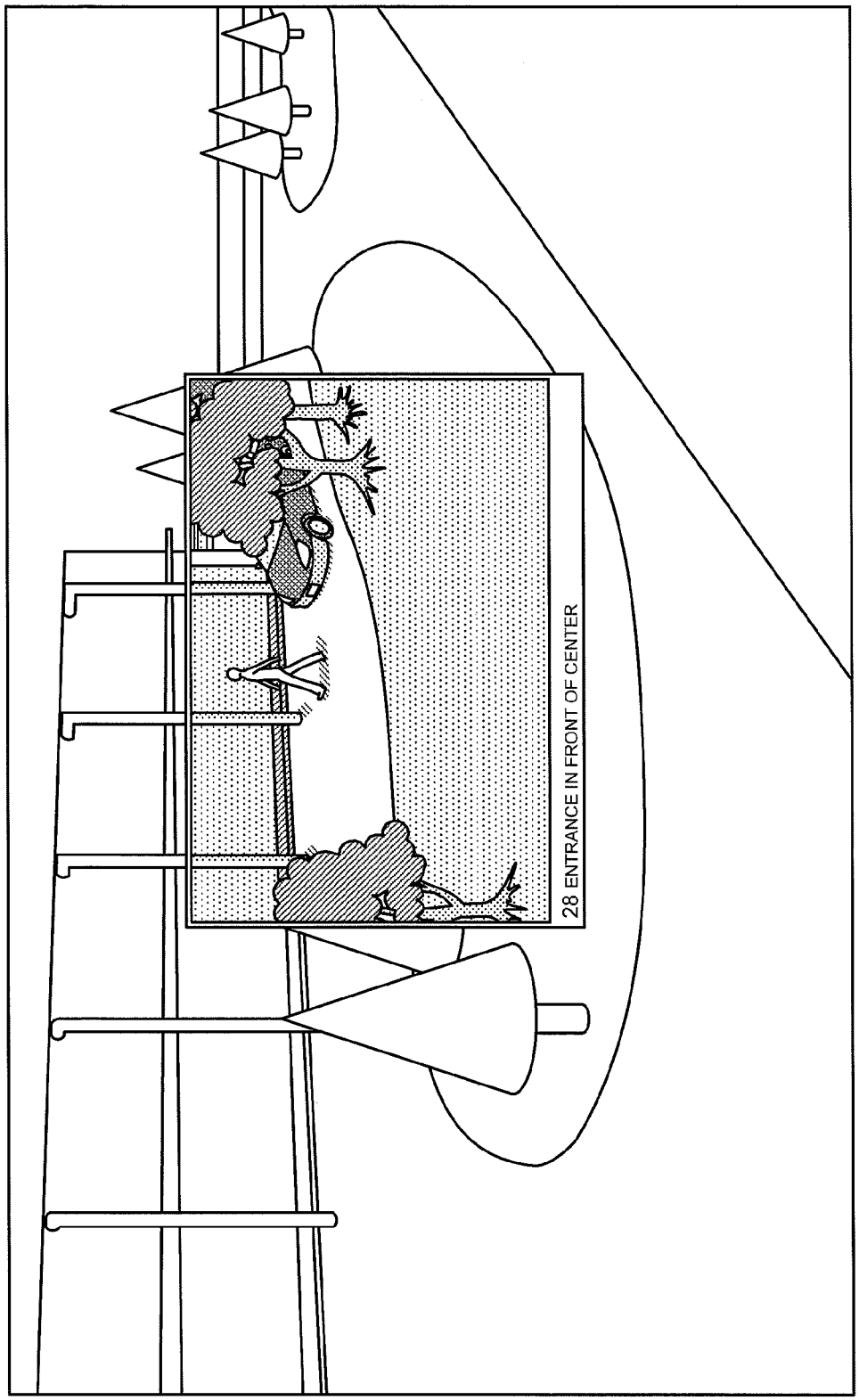
FIG. 17C is a diagram of an exemplary composite image when dragged upward.

Next, screen transition by dragging according to the fourth embodiment will be described with reference to FIGS. 17A to 17C. FIG. 17A is a diagram of an exemplary composite image before dragged. Moreover, FIG. 17B is a diagram of an exemplary composite image when dragged rightward. Furthermore, FIG. 17C is a diagram of an exemplary composite image when dragged upward.

For example, as illustrated in FIG. 17A, a composite image before dragged is a composite image, in which a shot image taken at the imaging device 20 corresponding to the camera icon "camera 2" described in the first embodiment, is composed in a predetermined region of the two-dimensional projection image. In the following, the screen transition when a shot image is dragged rightward on the composite image illustrated in FIG. 17A by a user manipulation is illustrated in FIG. 17B; and the screen transition when dragged upward by a user manipulation is illustrated in FIG. 17C.

In FIG. 17A, in the case where a shot image is dragged rightward, the switch instruction unit 127 calculates the zoom lens focal length of the imaging device 20 corresponding to the camera icon "camera 2" and the moving direction and the moving angle of the shooting direction based on the drag direction (the right direction) and the distance, and instructs the moving angle, for example, to the imaging device 20 to change the zoom lens focal length of the camera and the orientation of the camera in the left direction. The zoom lens focal length, the moving direction, and the moving angle are found by converting the direction and the distance for a drag, a wheel, or a pinch as described above. The drag direction is a direction opposite to the camera moving direction. After the converting, the composing unit 125 generates a two-dimensional projection image according to new pan information, tilt information, and zoom information received from the imaging device 20, and generates a composite image illustrated in FIG. 17B by composing a shot image this time on a predetermined region in the generated two-dimensional projection image.

Moreover, in FIG. 17A, in the case where a shot image is dragged upward, the switch instruction unit 127 calculates the moving direction and the moving angle of the shooting direction of the imaging device 20 corresponding to the camera icon "camera 2" based on the drag direction (in the upward direction) and the distance, and instructs the moving angle, for example, to the imaging device 20 so as to change the orientation of the camera to the downward direction. In this case, since there is no manipulation related to the zoom lens focal length, no instruction is told about changing the zoom lens focal length. The moving direction and the moving angle are found by respectively converting the direction and the distance for a drag, a wheel, or a pinch as described above. After the converting, the composing unit 125 generates a two-dimensional projection image according to new pan information, tilt information, and zoom information received from the imaging device 20, and generates a composite image illustrated in FIG. 17C by composing a shot image this time on a predetermined region in the generated two-dimensional projection image.

The Overall Process Flow According to the Fourth Embodiment

Figure 18:
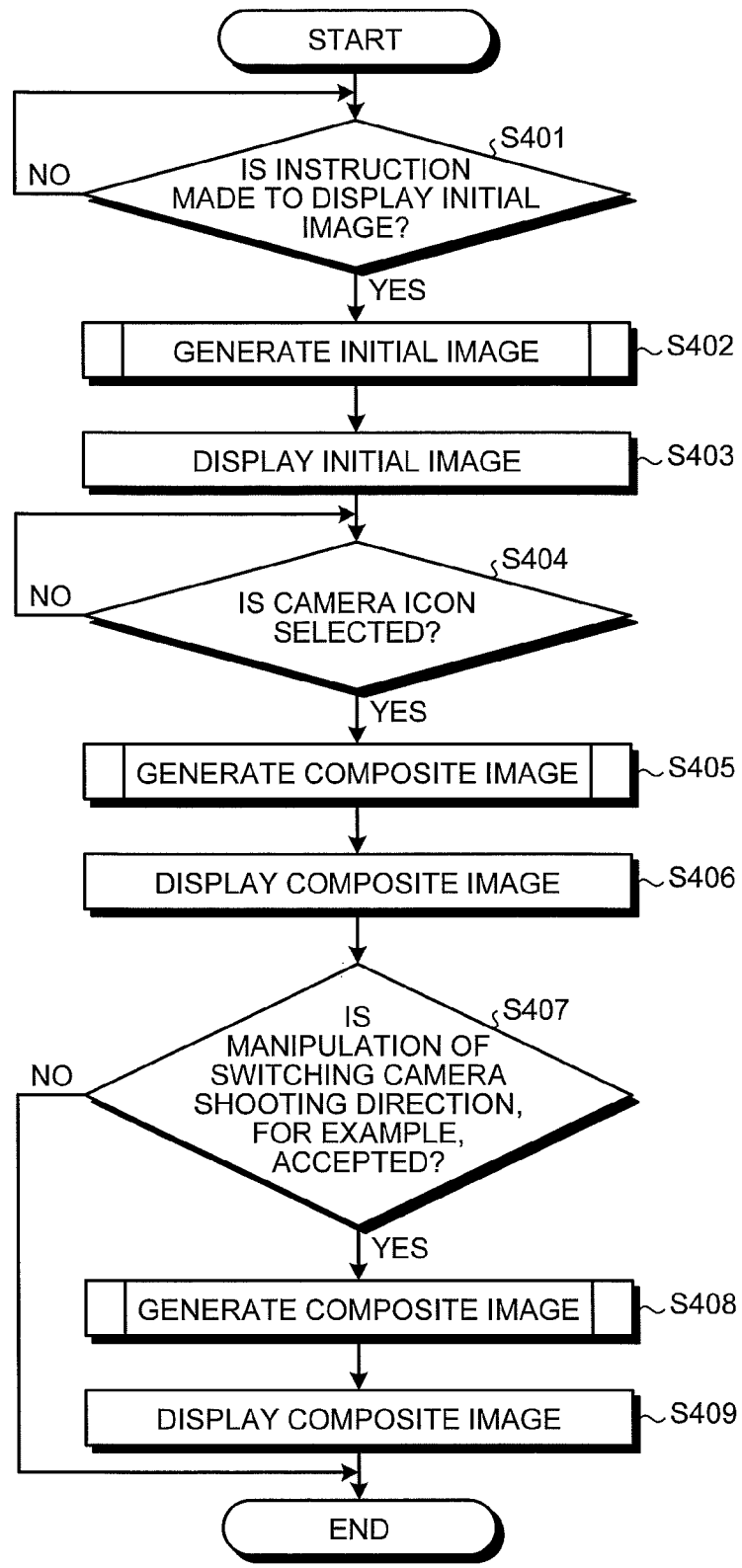
FIG. 18 is a flowchart of an exemplary overall process flow according to the fourth embodiment.

Next, the overall process flow according to the fourth embodiment will be described with reference to FIG. 18. FIG. 18 is a flowchart of an exemplary overall process flow according to the fourth embodiment. It is noted that in FIG. 18, the description of processes similar to the overall process according to the first embodiment illustrated in FIG. 7 is sometimes omitted. More specifically, processes in Step S401 to Step S406 are similar to the processes in Step S101 to Step S106.

For example, as illustrated in FIG. 18, in the case where the manipulating unit 121 of the image processing apparatus 10 accepts a manipulation of switching the camera shooting direction, for example, on the composite image (YES in Step S407), the moving direction of the shooting direction, the zoom lens focal length, and the moving angle of the shooting direction calculated at the switch instruction unit 127 according to a drag are sent to the imaging device 20; and then the composing unit 125 generates a two-dimensional projection image based on pan information, tilt information, and zoom information received from the imaging device 20 so as to generate a composite image in which an image taken at the imaging device 20 corresponding to the selected camera icon is composed in a predetermined region of the generated two-dimensional image (Step S408). The output unit 126 then displays the composite image on the display screen (Step S409). On the other hand, in the case where the manipulating unit 121 does not accept a manipulation of switching the camera shooting direction, for example, on the composite image (NO in Step S407), the process is terminated.

The Image Process Flow According to the Fourth Embodiment

Figure 19:
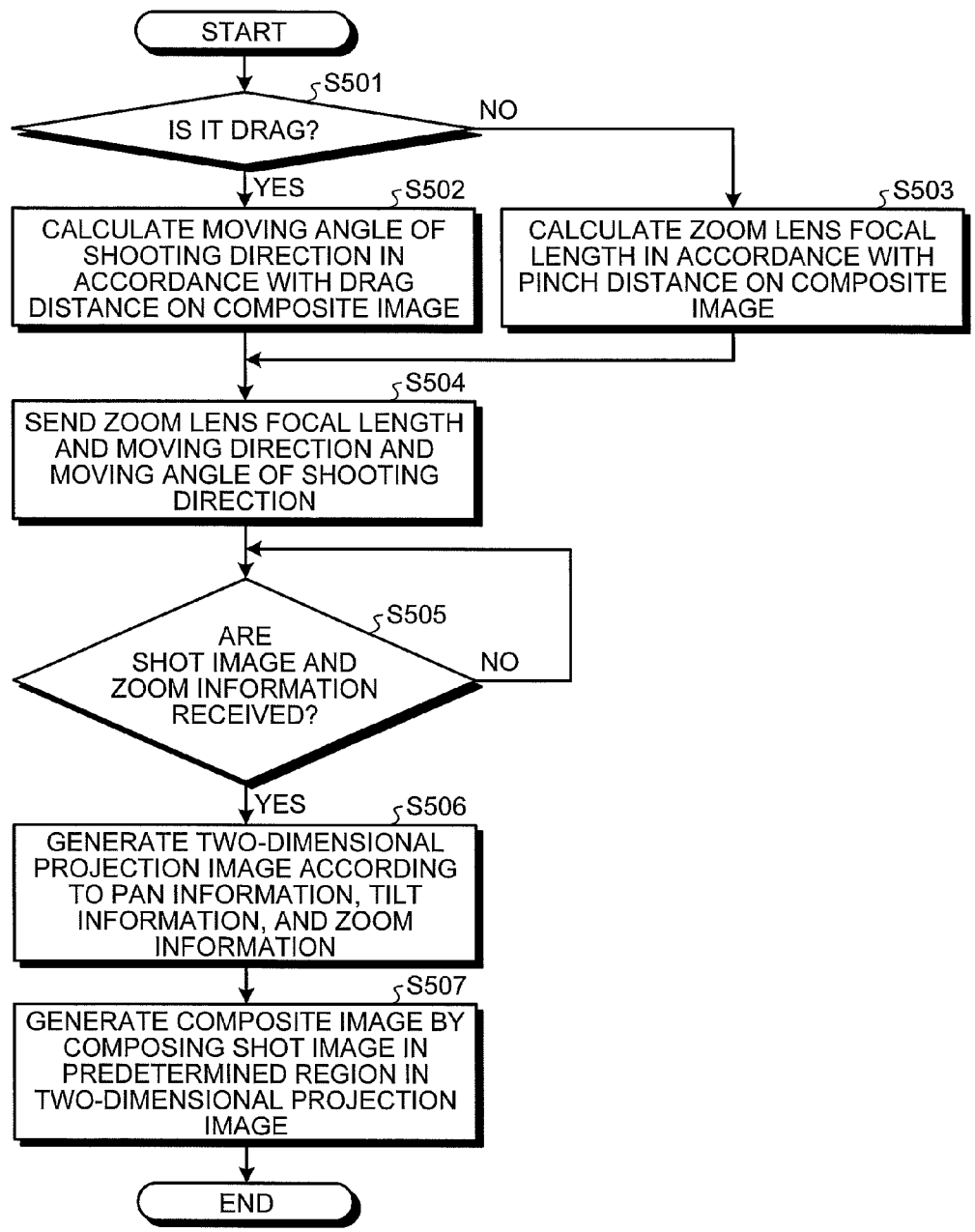
FIG. 19 is a flowchart of an exemplary image process flow according to the fourth embodiment.

Next, the image process flow according to the fourth embodiment will be described with reference to FIG. 19. FIG. 19 is a flowchart of an exemplary image process flow according to the fourth embodiment. It is noted that the image process according to the fourth embodiment is mainly the process in Step S408.

For example, as illustrated in FIG. 19, when a drag or a pinch (a wheel) manipulation is accepted in the state in which a camera icon is selected by a user manipulation at the manipulating unit 121, the switch instruction unit 127 determines whether it is a drag (Step S501). At this time, in the case where it is a drag (YES in Step S501), the switch instruction unit 127 calculates the moving direction and the moving angle of the shooting direction for the imaging device 20 in accordance with a drag distance on the composite image (Step S502). On the other hand, in the case where it is a pinch (NO in Step S501), the switch instruction unit 127 calculates a zoom lens focal length for the imaging device 20 in accordance with a pinch distance on the composite image (Step S503). The moving direction of the shooting direction is a direction opposite to the drag direction. The moving angle of the shooting direction is found by converting the drag distance (pixels) into the moving angle (degrees) of the shooting direction, as an aspect. Moreover, the zoom lens focal length is found by converting a pinch or a wheel into the zoom lens focal length, as an aspect.

The switch instruction unit 127 then sends the zoom lens focal length and the moving direction and the moving angle of the shooting direction, for example, as control signals to the imaging device 20 through the communication processing unit 122, and instructs the imaging device 20 to switch the zoom lens focal length and the shooting direction (Step S504). After the sending, in the case where the communication processing unit 122 receives the shot image, the pan information, the tilt information, and the zoom information from the imaging device 20 corresponding to the selected camera icon (YES in Step S505), the composing unit 125 acquires the shot image, the pan information, the tilt information, and the zoom information acquired at the acquiring unit 123 through the control unit 124, and acquires a three-dimensional model, an icon, and an icon position (a camera position) from the three-dimensional model storage unit 111. On the other hand, in the case where the communication processing unit 122 does not receive the shot image, the pan information, the tilt information, and the zoom information from the imaging device 20 (NO in Step S505), the communication processing unit 122 is in the state waiting for receiving the shot image, the pan information, the tilt information, and the zoom information.

The composing unit 125 then determines the view point, the fixation point, and the angle of view for the three-dimensional model based on the camera position, the pan information, the tilt information, and the zoom information. Subsequently, the composing unit 125 generates a two-dimensional projection image from the three-dimensional model data based on the determined view point, the fixation point, and the angle of view (Step S506). At this time, the composing unit 125 disposes the icons in the two-dimensional projection image based on the icon positions; and composes the shot image taken at the imaging device 20 corresponding to the camera icon on a pop-up set near the camera icon. After the composing, the composing unit 125 generates a composite image by composing the shot image in a predetermined region in the generated two-dimensional projection image (Step S507).

As described above, the image processing apparatus 10 instructs the zoom lens focal length and the shooting direction of the imaging device 20 by a user drag manipulation on the composite image; generates a two-dimensional projection image according to the zoom lens focal length and the shooting direction of the shot image taken at the imaging device 20 according to the instruction; composes the shot image in a predetermined region in the generated two-dimensional projection image; and outputs the image. As a result, the person seeing the composite image can switch the camera of the imaging device 20 through a simple user manipulation, and can intuitively grasp the region taken at the camera.

An Exemplary Modification of the Fourth Embodiment

In the fourth embodiment, the case is described where the shooting direction of the imaging device 20, for example, is instructed according to a user drag manipulation on the composite image and a composite image is generated based on the shooting direction, for example, received from the imaging device 20. However, it is also possible in which a two-dimensional projection image is generated according to a user drag manipulation on the composite image and the two-dimensional projection image is displayed prior to receiving the shooting direction, for example, from the imaging device 20. More specifically, a two-dimensional projection image is generated according to a user drag manipulation on the composite image; the generated two-dimensional projection image is displayed; and then a shot image is composed in a predetermined region in the generated two-dimensional projection image according to the shooting direction, for example, received from the imaging device 20 for display.

Figure 20:
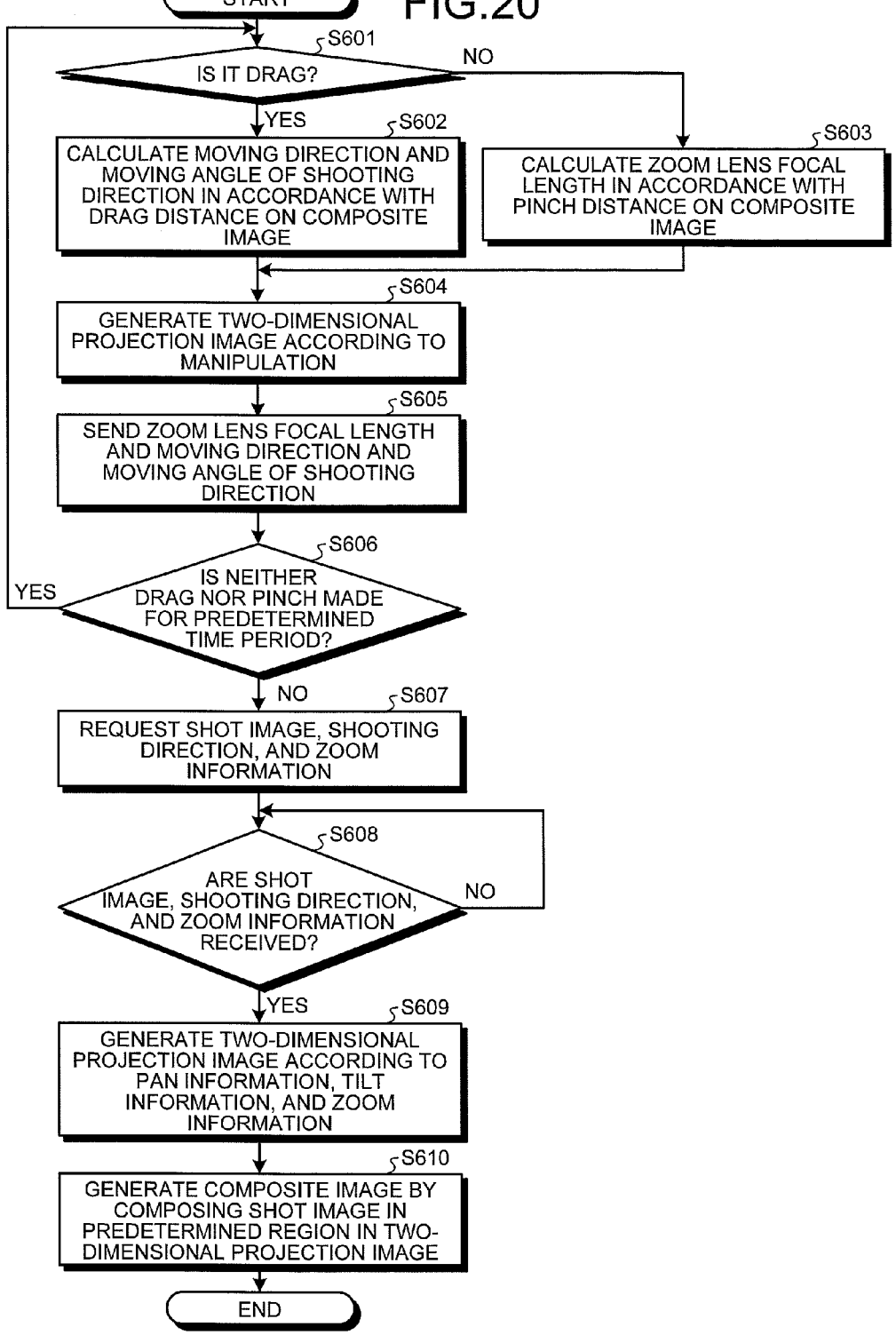
FIG. 20 is a flowchart of an exemplary image process flow according to an exemplary modification of the fourth embodiment.

FIG. 20 is a flowchart of an exemplary image process flow according to an exemplary modification of the fourth embodiment. For example, as illustrated in FIG. 20, when a drag or a pinch (a wheel) is accepted in the state in which a camera icon is selected by a user manipulation at the manipulating unit 121, the switch instruction unit 127 determines whether it is a drag (Step S601). At this time, in the case where it is a drag (YES in Step S601), the switch instruction unit 127 calculates the moving direction and the moving angle of the shooting direction for the imaging device 20 in accordance with a drag distance on the composite image (Step S602). On the other hand, in the case where it is a pinch (NO in Step S601), the switch instruction unit 127 calculates a zoom lens focal length for the imaging device 20 in accordance with a pinch distance on the composite image (Step S603). The moving direction of the shooting direction is a direction opposite to the drag direction. The distance in the shooting direction is found by converting the drag distance (pixels) into the moving angle (degrees) of the shooting direction, as an aspect. Moreover, the zoom lens focal length is found by converting a pinch or a wheel into the zoom lens focal length, as an aspect.

Here, the switch instruction unit 127 instructs the composing unit 125 to generate a two-dimensional projection image according to the calculated zoom lens focal length and the moving direction and the moving angle of the shooting direction. Thus, the composing unit 125 generates a two-dimensional projection image according to the zoom lens focal length and the moving direction and the moving angle of the shooting direction (Step S604). At this point in time, the output unit 126 displays the two-dimensional projection image generated at the composing unit 125 on the screen.

The switch instruction unit 127 then sends the zoom lens focal length and the moving direction and the moving angle of the shooting direction, for example, as control signals to the imaging device 20 through the communication processing unit 122, and instructs the imaging device 20 to switch the shooting direction and the zoom lens focal length (Step S605). Moreover, in the case where a drag or a pinch is not made for a predetermined time period by a user manipulation at the manipulating unit 121 (NO in Step S606), the switch instruction unit 127 requests the imaging device 20 to send a shot image, pan information, tilt information, and zoom information through the communication processing unit 122 (Step S607). On the other hand, in the case where a user manipulation (a drag or a pinch) at the manipulating unit 121 is made within a predetermined time period (YES in Step S606), the process in Step S601 is again performed. Since fine adjustment is sometimes performed in a user manipulation such as a drag or a pinch by the user, in the case where a drag is not continuously performed after a lapse of a predetermined time period, the process in the subsequent stage is performed because it is considered that the adjustment is determined at the point in time. In other words, since the user does not determine in which direction the user desires monitoring during the user manipulation for a drag or a pinch. Therefore, it is considered that the user desires monitoring in the present direction when no user manipulation is made after a lapse of a predetermined time period, and the process in the subsequent stage is performed.

Subsequently, the switch instruction unit 127 requests the imaging device 20 corresponding to the selected camera icon to send a shot image, pan information, tilt information, and zoom information (Step S607). At this point in time, the imaging device 20 is operating based on the information sent in Step S605. After the requesting, in the case where the communication processing unit 122 receives the shot image, the pan information, the tilt information, and the zoom information from the imaging device 20 corresponding to the selected camera icon (YES in Step S608), the composing unit 125 acquires the shot image, the pan information, the tilt information, and the zoom information acquired at the acquiring unit 123 through the control unit 124, and acquires a three-dimensional model, an icon, and an icon position (a camera position) from the three-dimensional model storage unit 111. On the other hand, in the case where the communication processing unit 122 does not receive the shot image, the pan information, the tilt information, and the zoom information from the imaging device 20 (NO in Step S608), the communication processing unit 122 is in the state waiting for receiving the shot image, the pan information, the tilt information, and the zoom information.

The composing unit 125 then determines the view point, fixation point, and angle of view of the three-dimensional model based on the camera position, the pan information, the tilt information, and the zoom information. Subsequently, the composing unit 125 generates a two-dimensional projection image from the three-dimensional model data based on the determined view point, the fixation point, and the angle of view (Step S609). At this time, the composing unit 125 disposes the icons in the two-dimensional projection image based on the icon positions, and composes the shot image taken at the imaging device 20 corresponding to the camera icon on a pop-up set near the camera icon. After that, the composing unit 125 generates a composite image by composing the shot image in a predetermined region in the generated two-dimensional projection image (Step S610).

In other words, the image processing apparatus 10 generates and displays a two-dimensional projection image according to a user drag manipulation on the composite image before generating a two-dimensional projection image based on the information from the imaging device 20, so that the switching position of the camera of the imaging device 20 can be matched with a position desired by the user to some extent, and the operability of switching the camera can be improved.

Fifth Embodiment

In the second embodiment, the case is described where a predetermined object is made transparent and a camera icon, for example, hidden behind a building, for example, can be selected. However, a case is also possible in which when a camera icon, for example, is selected and when a composite image is rotated about an axis of the selected camera icon, other camera icons may appear by the rotation. The camera icon that appears by the rotation can be selected. Therefore, in a fifth embodiment, the case will be described where a camera icon, for example, can be selected, which appears by rotating a composite image about a selected camera icon in the state in which the camera icon is selected.

The Image Process Flow According to a Fifth Embodiment

Figure 21:
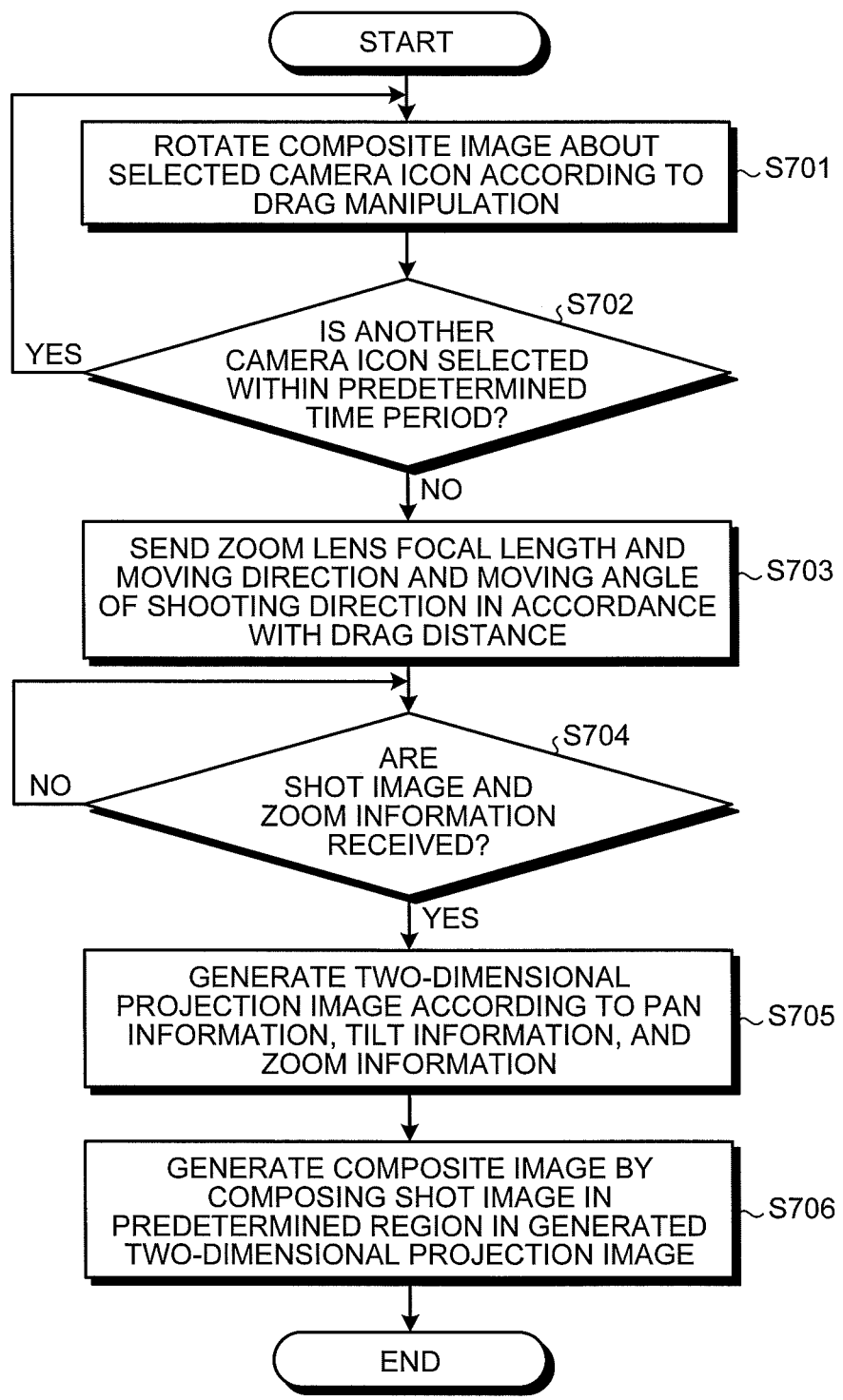
FIG. 21 is a flowchart of an exemplary image process flow according to a fifth embodiment.

FIG. 21 is a flowchart of an exemplary image process flow according to a fifth embodiment. It is noted that the image process according to the fifth embodiment is mainly the process in Step S408.

For example, as illustrated in FIG. 21, the composing unit 125 rotates a composite image about an axis including a selected camera icon according to a user drag manipulation at the manipulating unit 121 (Step S701). However, a limitation is sometimes imposed on the range of rotating the composite image. Moreover, the composite image for rotation is appropriately generated and displayed according to a drag direction and a drag distance, for example. Furthermore, in the case where a camera icon different from the presently selected camera icon is not selected within a predetermined time period by a user manipulation at the manipulating unit 121 (NO in Step S702), the switch instruction unit 127 calculates a distance in the shooting direction for the imaging device 20 in accordance with a drag distance on the composite image. In addition, also in the case where a pinch (a wheel) is made, the switch instruction unit 127 calculates a zoom lens focal length for the imaging device 20 in accordance with a pinch distance on the composite image. It is fine that the distance in the shooting direction and the zoom lens focal length are calculated similarly in the fourth embodiment, and the detailed description thereabout is omitted here. However, since limitations are imposed on the distance in the shooting direction and the zoom lens focal length, for example, in the actual camera (the imaging device 20), the values are changed to preferable values according to limitations.

The switch instruction unit 127 then sends the zoom lens focal length and the moving direction and the moving angle of the shooting direction, for example, as control signals to the imaging device 20 through the communication processing unit 122, and instructs the imaging device 20 to switch the shooting direction and the zoom lens focal length (Step S703). On the other hand, in the case where a camera icon different from the presently selected camera icon is selected at the manipulating unit 121 within a predetermined time period (YES in Step S702), the process in Step S701 is again performed.

After the instructing, in the case where the communication processing unit 122 receives the shot image, the pan information, the tilt information, and the zoom information from the imaging device 20 corresponding to the selected camera icon (YES in Step S704), the composing unit 125 acquires the shot image, the pan information, the tilt information, and the zoom information acquired at the acquiring unit 123 through the control unit 124, and acquires a three-dimensional model, an icon, and an icon position (a camera position) from the three-dimensional model storage unit 111. On the other hand, in the case where the communication processing unit 122 does not receive the shot image, the pan information, the tilt information, and the zoom information from the imaging device 20 (NO in Step S704), the communication processing unit 122 is in the state waiting for receiving the shot image, the pan information, the tilt information, and the zoom information.

The composing unit 125 then determines the view point, fixation point, and angle of view of the three-dimensional model based on the camera position, the pan information, the tilt information, and the zoom information. Subsequently, the composing unit 125 generates a two-dimensional projection image from the three-dimensional model data based on the determined view point, the fixation point, and the angle of view (Step S705). At this time, the composing unit 125 disposes the icons in the two-dimensional projection image based on the icon positions, and composes the shot image taken at the imaging device 20 corresponding to the camera icon on a pop-up set near the camera icon. After the composing, the composing unit 125 generates a composite image by composing the shot image in a predetermined region in the generated two-dimensional projection image (Step S706).

As described above, the image processing apparatus 10 rotates the composite image about the camera icon on the composite image according to a drag, so that the person seeing the composite image can easily select a camera icon that was not seen on the composite image before rotated. Moreover, the image processing apparatus 10 instructs switching the shooting direction and the zoom lens focal length of the camera similarly in the fourth embodiment in the case where another camera icon is not selected even though a predetermined time period elapses in rotating the composite image, so that the person seeing the composite image can intuitively grasp the region taken at the camera.

Sixth Embodiment

In the fourth embodiment, the case is described where the shooting direction and the zoom lens focal length of the imaging device 20 set by dragging. However, it is also possible to further set the operating speed of the camera toward the shooting direction at the speed corresponding to a drag distance. Therefore, in a sixth embodiment, the case will be described where the operating speed of the camera toward the shooting direction is further set at the speed corresponding to a drag distance.

Screen Transition According to the Sixth Embodiment

Figure 22:
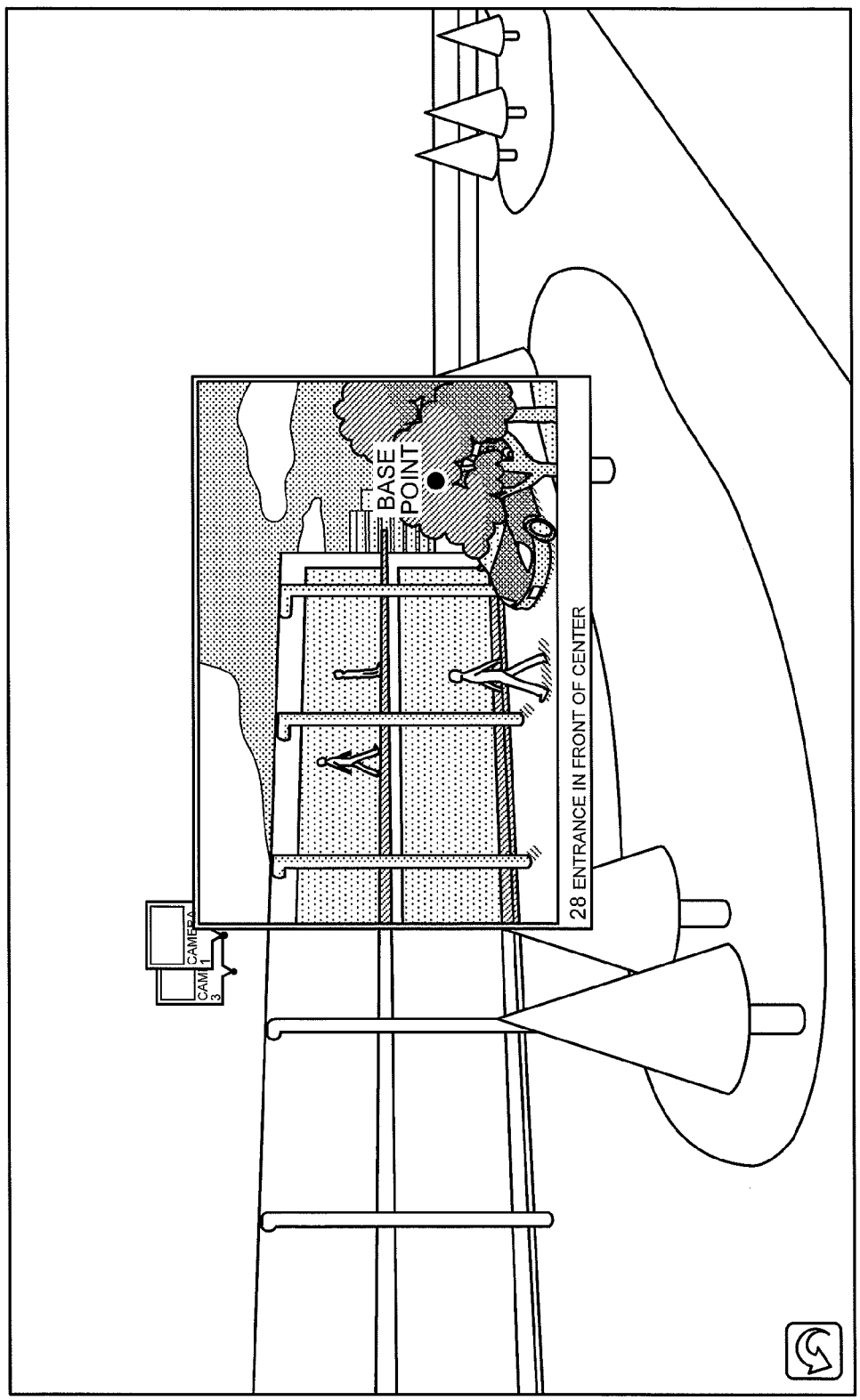
FIG. 22 is an image diagram of an example of determining a base point according to a sixth embodiment.
Figure 23:
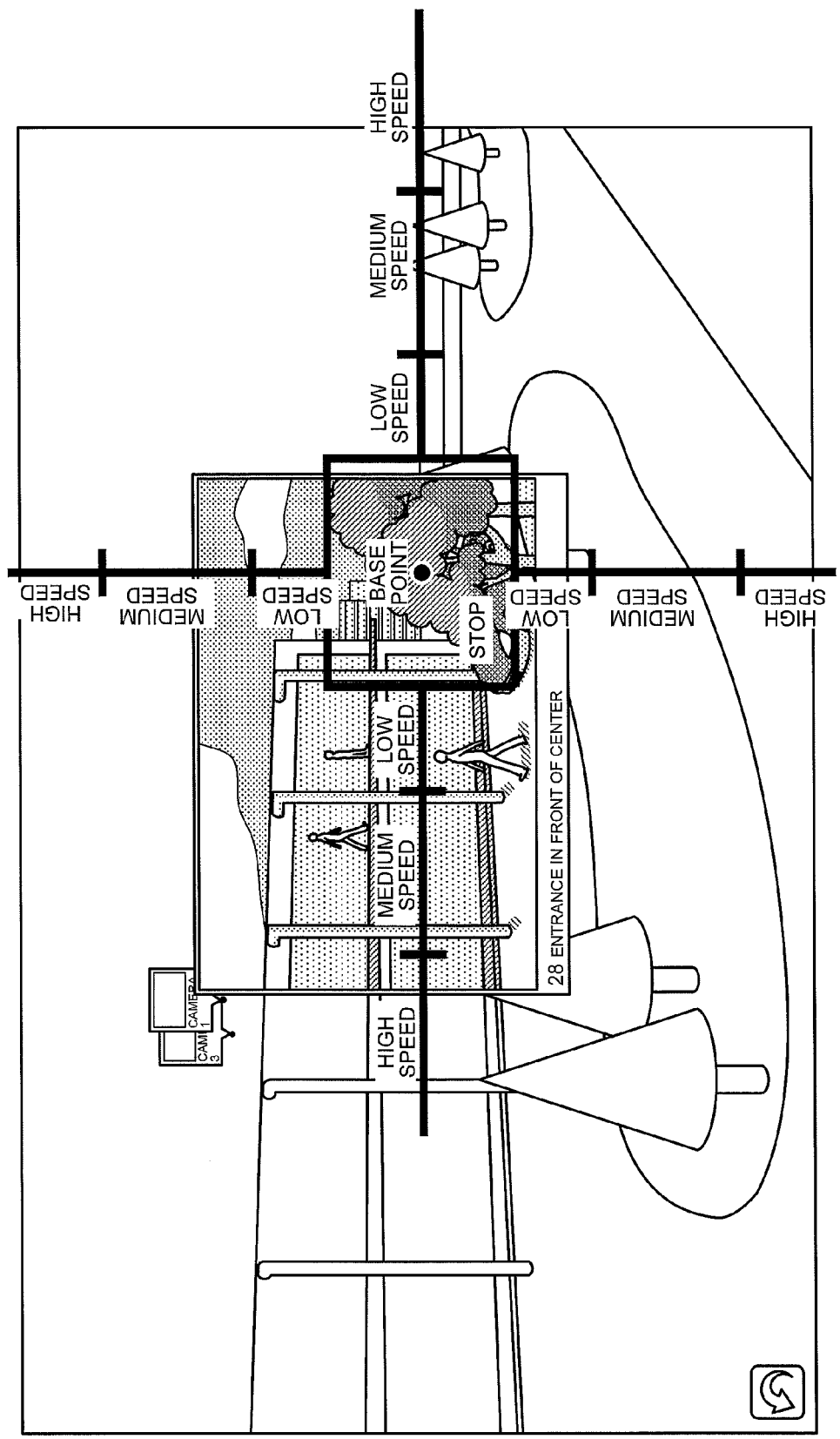
FIG. 23 is an image diagram of an example of setting a camera operating speed corresponding to a drag distance according to the sixth embodiment.

Screen transition according to the sixth embodiment will be described with reference to FIGS. 22 and 23. FIG. 22 is an image diagram of an example of determining a base point according to the sixth embodiment. FIG. 23 is an image diagram of an example of setting a camera operating speed corresponding to a drag distance according to the sixth embodiment.

As illustrated in FIG. 22, in the case where a mouse button is pressed down or a screen is touched down on a composite image by a user manipulation at the manipulating unit 121, the switch instruction unit 127 determines that the position on the composite image at which the mouse button is pressed down or the screen is touched down is a base point. After the mouse button is pressed down or the screen is touched down, in the case where a shot image is dragged by a user manipulation at the manipulating unit 121, as illustrated in FIG. 23, the switch instruction unit 127 considers a direction opposite to the drag direction as the moving direction of the shooting direction, and sets a rate of travel, when operating the camera in the moving direction of the shooting direction, to the speed corresponding to a drag distance.

For example, as illustrated in FIG. 23, a range is preset in which the speed of the pan and tilt operations of the camera is increased step by step according to a distance from the base point. The switch instruction unit 127 then sets a rate of travel when operating the camera in the moving direction of the shooting direction based on the speed set step by step corresponding to a drag distance from the base point determined by mouse down or touch down. In the example illustrated in FIG. 23, the range of a rate of travel is set as "zero" when located near the base point, and the speed is changed step by step as "low speed", "medium speed", and "high speed" out of the range near the base point. The rates of travel of the camera corresponding to "low speed", "medium speed", and "high speed" may be set freely. Moreover, the speed ranges illustrated in FIG. 23 can be freely changed, and the speed ranges may not be displayed.

The Image Process Flow According to the Sixth Embodiment

Figure 24:
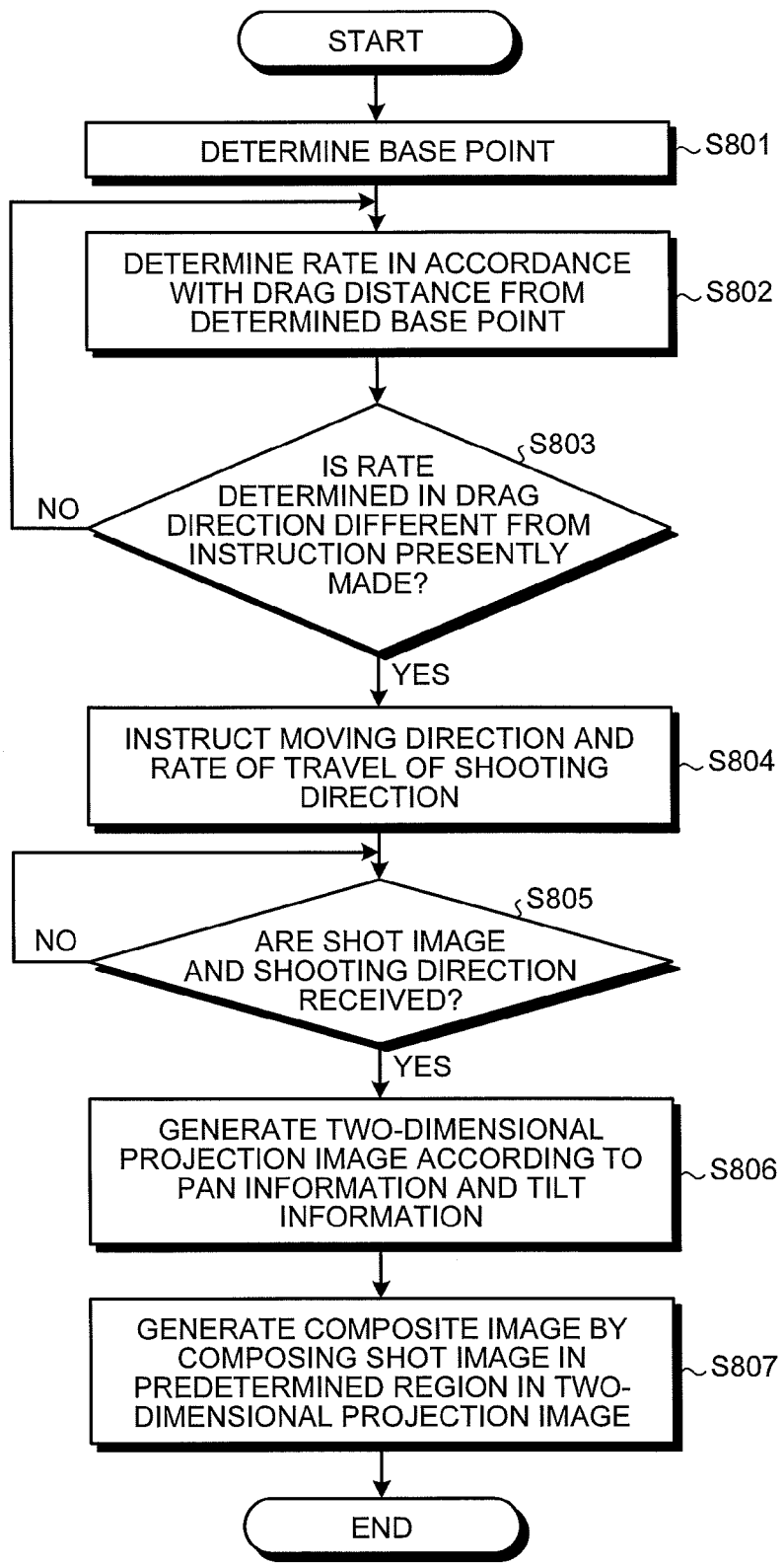
FIG. 24 is a flowchart of an exemplary image process flow according to the sixth embodiment.

Next, the image process flow according to the sixth embodiment will be described with reference to FIG. 24. FIG. 24 is a flowchart of an exemplary image process flow according to the sixth embodiment. It is noted that the image process according to the sixth embodiment is mainly the process in Step S408.

For example, as illustrated in FIG. 24, in the case where the mouse button is pressed down or the screen is touched down on a composed screen by a user manipulation at the manipulating unit 121, the switch instruction unit 127 determines that the position on the composite image at which the mouse button is pressed down or the screen is touched down is to be a base point (Step S801). When a drag is made at the manipulating unit 121, the switch instruction unit 127 determines a rate of travel corresponding to a drag distance from the determined base point (Step S802).

Here, the switch instruction unit 127 determines whether the determined moving direction and the determined rate of travel of the shooting direction are different from the instruction presently made on the imaging device 20 (Step S803). At this time, in the case where the switch instruction unit 127 determines that the determined moving direction and the determined rate of travel of the shooting direction are different from the instruction presently made (YES in Step S803), the switch instruction unit 127 sends the determined moving direction and the determined rate of travel of the shooting direction through the communication processing unit 122, and instructs the imaging device 20 to switch the shooting direction (Step S804). On the other hand, in the case where the switch instruction unit 127 determines that the determined moving direction and the determined rate of travel of the shooting direction are not deferent from the instruction presently made (NO in Step S803), the switch instruction unit 127 again performs the process in Step S802.

After the instructing, in the case where the communication processing unit 122 receives a shot image, pan information, and tilt information from the imaging device 20 corresponding to the selected camera icon (YES in Step S805), the composing unit 125 acquires the shot image, the pan information, the tilt information acquired at the acquiring unit 123 through the control unit 124, and acquires a three-dimensional model, an icon, and an icon position (a camera position) from the three-dimensional model storage unit 111. On the other hand, in the case where the communication processing unit 122 does not receive the shot image and the shooting direction from the imaging device 20 (NO in Step S805), the communication processing unit 122 is in the state waiting for the shot image and the shooting direction.

The composing unit 125 then determines the view point and the fixation point of the three-dimensional model based on the camera position, the pan information, and the tilt information. Subsequently, the composing unit 125 generates the two-dimensional projection image from three-dimensional model data based on the determined view point, the fixation point and the preset angle of view (Step S806). At this time, the composing unit 125 disposes the icons in the two-dimensional projection image based on the icon positions, and composes the shot image taken at the imaging device 20 corresponding to the camera icon on a pop-up that is set near the camera icon. After the composing, the composing unit 125 generates a composite image by composing the shot image in a predetermined region in the generated two-dimensional projection image (Step S807).

As described above, the image processing apparatus 10 instructs the shooting direction and the camera operation speed of the imaging device 20 by a user drag manipulation on the composite image; generates a two-dimensional projection image according to the instructed shooting direction of the imaging device 20; composes the shot image in a predetermined region in the generated two-dimensional projection image; and outputs the image. As a result, the person seeing the composite image can switch the camera of the imaging device 20 through a simple user manipulation, and can intuitively grasp the region taken at the camera.

Seventh Embodiment

In the fourth embodiment, the case is described where the zoom lens focal length and the moving direction and rate of travel of the shooting direction of the imaging device 20 are set by dragging. However, it is also possible to further set a rate of travel of the camera toward the moving direction of the shooting direction in accordance with the speed corresponding to the drag speed. Therefore, in a seventh embodiment, the case will be described where a rate of travel of the camera toward the moving direction of the shooting direction is further set in accordance with the drag speed.

Image Processing According to the Seventh Embodiment

Figure 25:
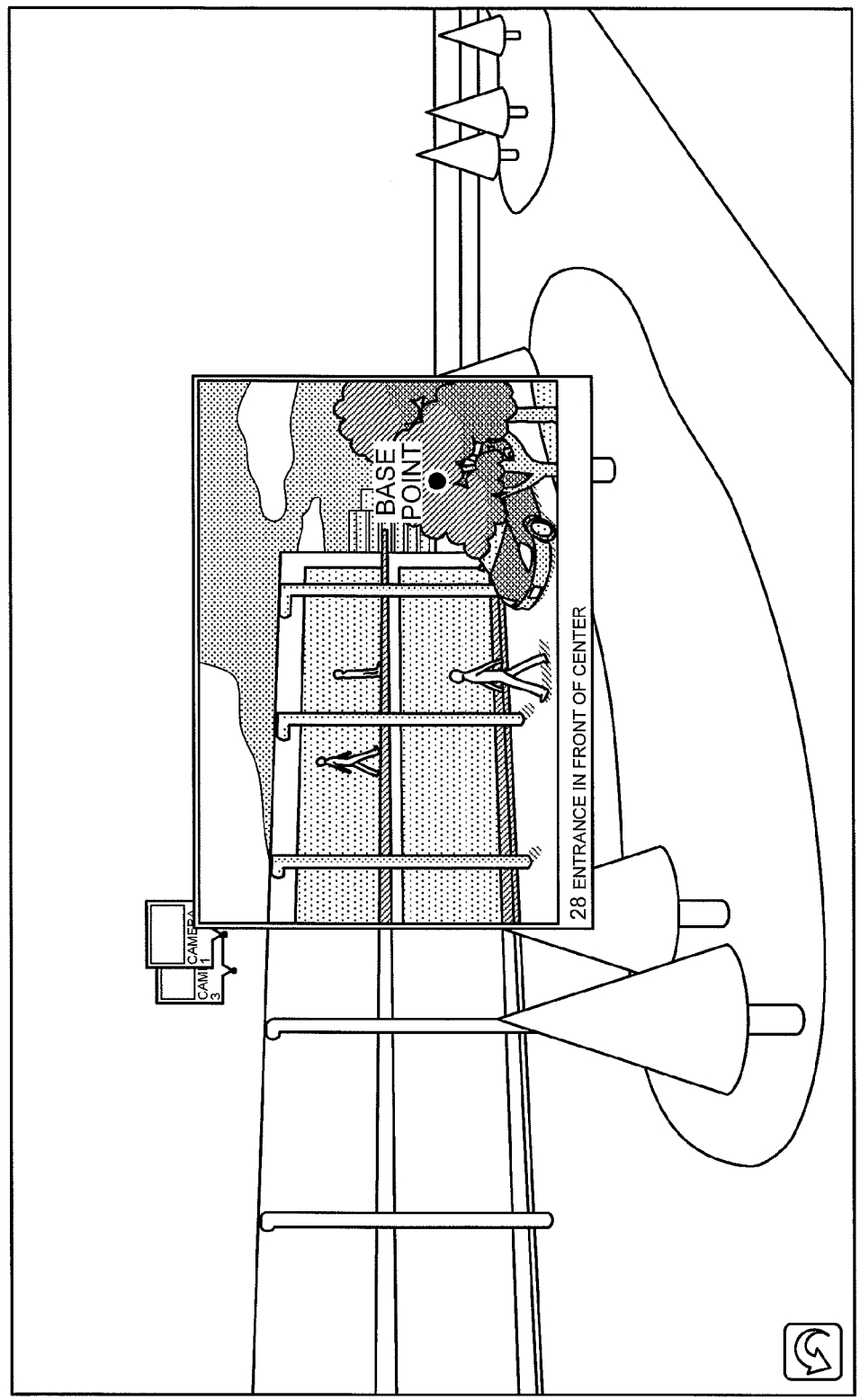
FIG. 25 is an image diagram of an example of determining a base point according to a seventh embodiment.
Figure 26:
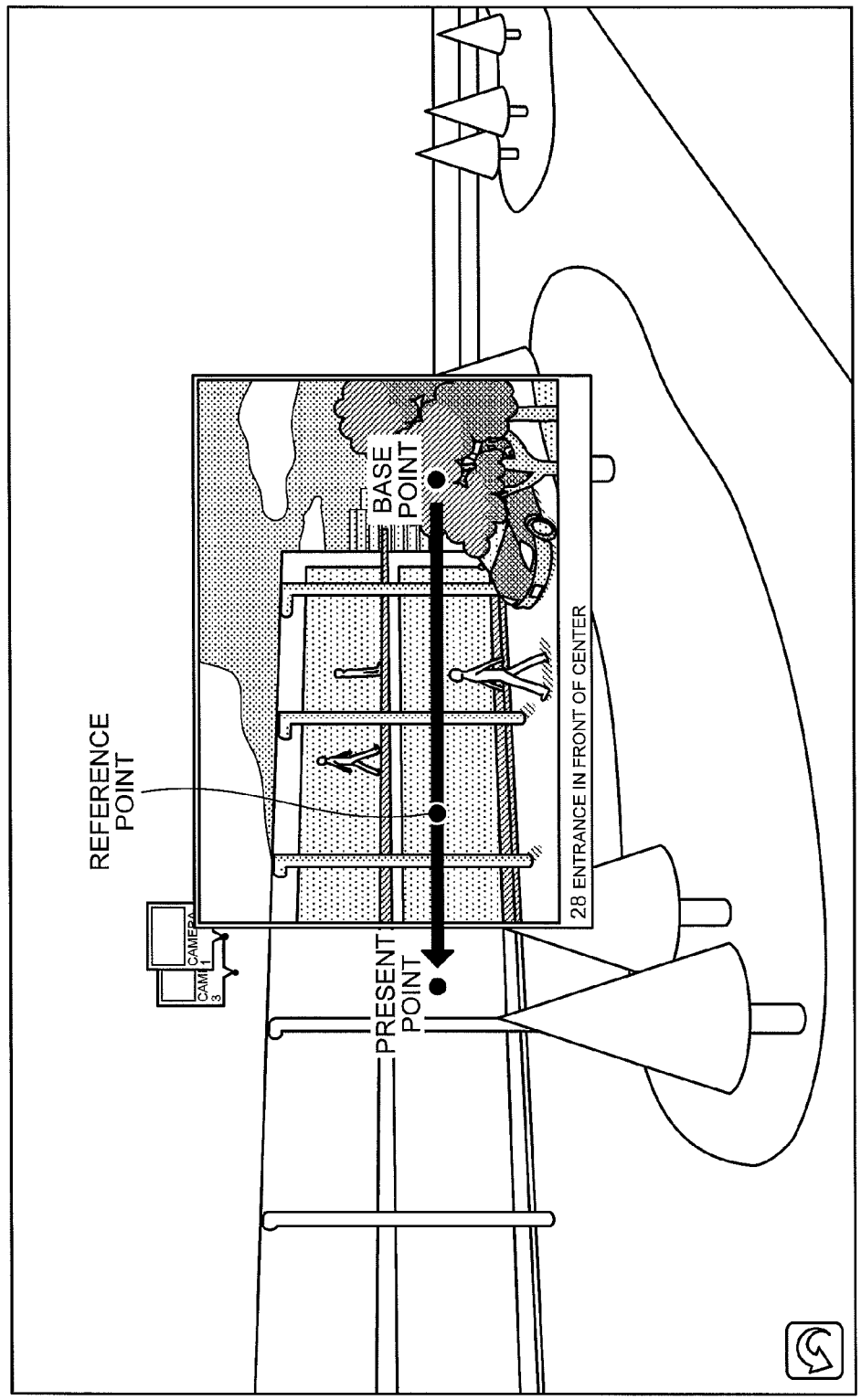
FIG. 26 is an image diagram of an example of setting a camera operating speed corresponding to the drag speed according to the seventh embodiment.

Image processing according to the seventh embodiment will be described with reference to FIGS. 25 and 26. FIG. 25 is an image diagram of an example of determining a base point according to the seventh embodiment. FIG. 26 is an image diagram of an example of setting a camera operating speed corresponding to the drag speed according to the seventh embodiment.

As illustrated in FIG. 25, in the case where a mouse button is pressed down or a screen is touched down on a composite image by a user manipulation at the manipulating unit 121, the switch instruction unit 127 determines that the position on the composite image at which the mouse button is pressed down or the screen is touched down to be as a base point. After the mouse button is pressed down or the screen is touched down, in the case where a shot image is dragged by a user manipulation at the manipulating unit 121, the switch instruction unit 127 considers a direction opposite to the drag direction as the moving direction of the shooting direction, and sets a rate of travel when operating the camera in the moving direction of the shooting direction to be the speed corresponding to the drag speed. For example, as illustrated in FIG. 26, in the case where a drag is made as indicated by an arrow, "a base point", "a reference point", and "a present point" in a drag are set as illustrated in FIG. 26. In the case where a drag is made, the switch instruction unit 127 sets the moving direction of the shooting direction based on the direction from the base point to the present point; and sets a rate of travel when operating the camera in the moving direction of the shooting direction based on the drag speed calculated from a distance between the reference point to the present point.

The Image Process Flow According to the Seventh Embodiment

Figure 27:
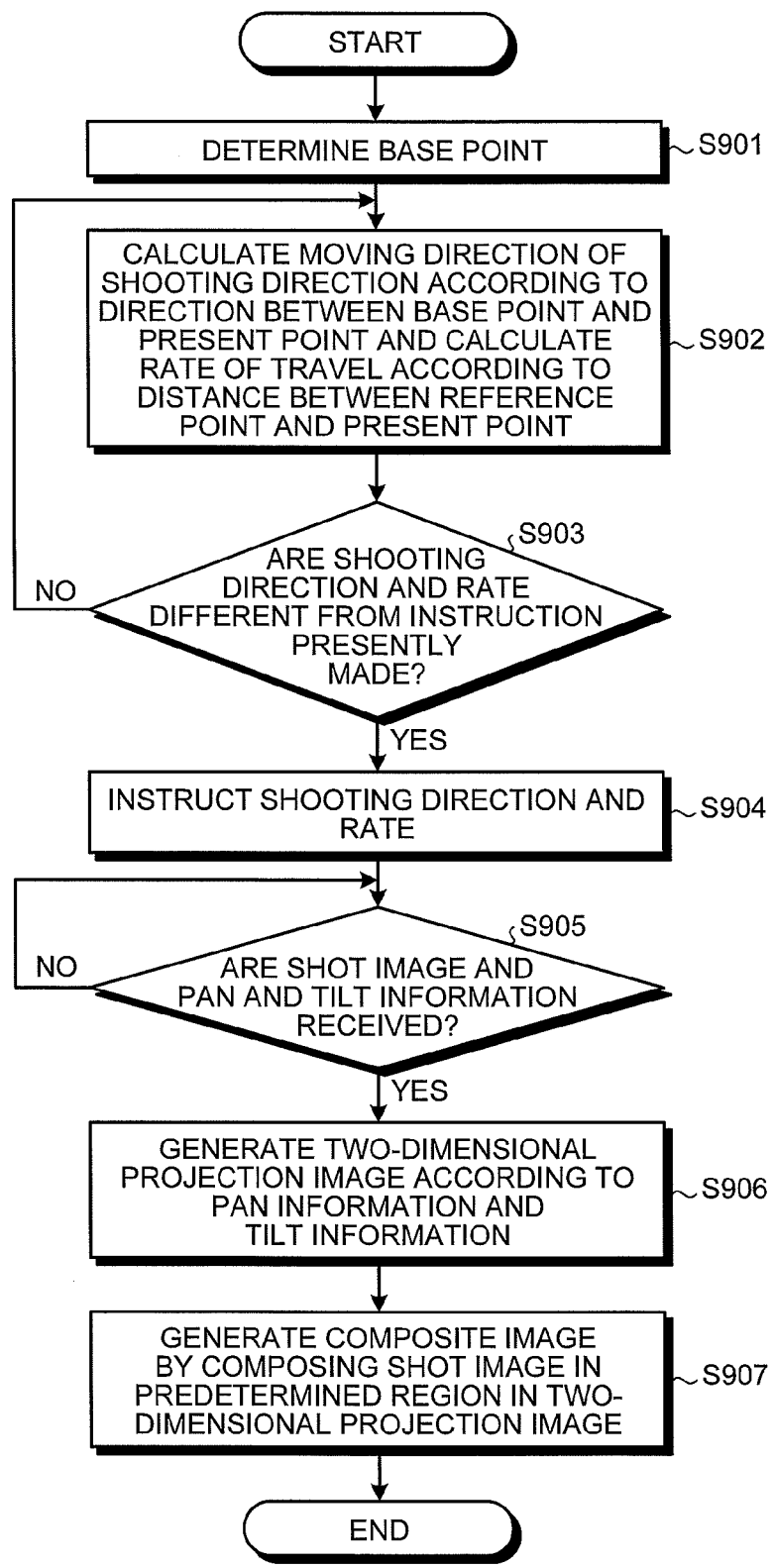
FIG. 27 is a flowchart of an exemplary image process flow according to the seventh embodiment.

Next, the image process flow according to the seventh embodiment will be described with reference to FIG. 27. FIG. 27 is a flowchart of an exemplary image process flow according to the seventh embodiment. It is noted that the image process according to the seventh embodiment is mainly the process in Step S408.

For example, as illustrated in FIG. 27, in the case where the mouse button is pressed down or the screen is touched down on a composed screen by a user manipulation at the manipulating unit 121, the switch instruction unit 127 determines that the position on the composite image, at which the mouse button is pressed down or the screen is touched down, to be a base point (Step S901). Moreover, the switch instruction unit 127 calculates positions on the composite image for every predetermined time period, and sets the latest position to be the present point and the previous position to be the reference point. The switch instruction unit 127 then determines the moving direction of the shooting direction according to the direction from the base point to the present point. Furthermore, the switch instruction unit 127 calculates the drag speed by dividing the distance between the reference point and the present point by a predetermined time period, and sets a rate of travel corresponding to be the drag speed (Step S902).

Here, the switch instruction unit 127 determines whether the determined moving direction and the determined rate of travel of the shooting direction are different from the instruction presently made on the imaging device 20 (Step S903). At this time, in the case where the switch instruction unit 127 determines that the set moving direction and rate of travel of the shooting direction are different from the instruction presently made (YES in Step S903), the switch instruction unit 127 instructs the imaging device 20 to switch the shooting direction by sending the set moving direction and rate of travel of the shooting direction through the communication processing unit 122 (Step S904). On the other hand, in the case where the switch instruction unit 127 determines that the set moving direction and rate of travel of the shooting direction are the same as the instruction presently made (NO in Step S903), the switch instruction unit 127 again performs the process in Step S902.

After the instructing, in the case where the communication processing unit 122 receives a shot image, pan information, and tilt information from the imaging device 20 corresponding to the selected camera icon (YES in Step S905), the composing unit 125 acquires the shot image, the pan information, the tilt information acquired at the acquiring unit 123 through the control unit 124; and acquires a three-dimensional model, an icon, and an icon position (a camera position) from the three-dimensional model storage unit 111. On the other hand, in the case where the communication processing unit 122 does not receive the shot image, the pan information, and the tilt information from the imaging device 20 (NO in Step S905), the communication processing unit 122 is in the state waiting for the shot image, the pan information, and the tilt information.

The composing unit 125 then determines the view point and the fixation point of the three-dimensional model based on the camera position, the pan information, and the tilt information. Subsequently, the composing unit 125 generates the two-dimensional projection image from three-dimensional model data based on the determined view point, the fixation point and the preset angle of view (Step S906). At this time, the composing unit 125 disposes the icons in the two-dimensional projection image based on the icon positions; and composes the shot image taken at the imaging device 20 corresponding to the camera icon on a pop-up set near the camera icon. After the composing, the composing unit 125 generates a composite image by composing the shot image in a predetermined region in the generated two-dimensional projection image (Step S907).

As described above, the image processing apparatus 10 instructs the moving direction and rate of travel of the shooting direction of the imaging device 20 by a user drag manipulation on the composite image; generates a two-dimensional projection image according to the pan information and the tilt information sent from the imaging device 20 according to the instruction; composes the shot image in a predetermined region in the generated two-dimensional projection image; and outputs the image. As a result, the person seeing the composite image can switch the shooting direction of the camera of the imaging device 20 through a simple user manipulation, and can intuitively grasp the region taken at the camera.

Eighth Embodiment

In the first embodiment, in the case where a camera icon is disposed in the two-dimensional projection image of the entire monitor area and the camera icon is selected, the composite image that the shot image taken at the camera (the imaging device) corresponding to the selected camera icon is displayed. On the other hand, in this embodiment, a plurality of monitor areas are configured in a hierarchy. The monitor area of a different hierarchy can be selected from the two-dimensional projection image of any one of the monitor areas. In the case where only the camera icon of the camera in association with the monitor area is disposed in the cameras in the two-dimensional projection image of the selected monitor area and the camera icon is selected, the composite image is displayed that the shot image taken at the camera corresponding to the selected camera icon is composed. In the following, the configuration of a monitoring system and the configuration of an imaging device are as similar to the first embodiment, and therefore the description is omitted.

The Configuration of an Image Processing Apparatus According to an Eighth Embodiment Next, the configuration of an image processing apparatus 10 according to an eighth embodiment will be described with reference to FIG. 3 in the first embodiment. The image processing apparatus 10 includes a three-dimensional model storage unit 111, a view point information storage unit 112, a manipulating unit 121, a communication processing unit 122, an acquiring unit 123, a control unit 124, a composing unit 125, and an output unit 126. The image processing apparatus 10 is an information processing apparatus such as a PC connected to a network camera such as an imaging device 20 and a sensor 40 via a network 30 (see FIG. 1). Here, the communication processing unit 122 and the control unit 124 are as similar to the first embodiment, and therefore the description is omitted.

The three-dimensional model storage unit 111 stores a three-dimensional model, for example. FIG. 28 is a diagram of exemplary items of information stored into the three-dimensional model storage unit 111. As illustrated in FIG. 28, the three-dimensional model storage unit 111 stores hierarchies to which monitor areas belong, the three-dimensional model data of the monitor areas, device IDs, icon type IDs, and icon positions in association with each other. Here, the details of the device ID, the icon type ID, and the icon position are as similar to the first embodiment.

The three-dimensional model data expresses the three-dimensional models of the monitor areas (three-dimensional regions) (see FIG. 5). In the embodiment, a hierarchical structure is provided in which a plurality of the monitor areas is configured in a hierarchy, and a plurality of items of three-dimensional model data corresponding to each of the plurality of the monitor areas is stored in the hierarchical structure.

Figure 29:
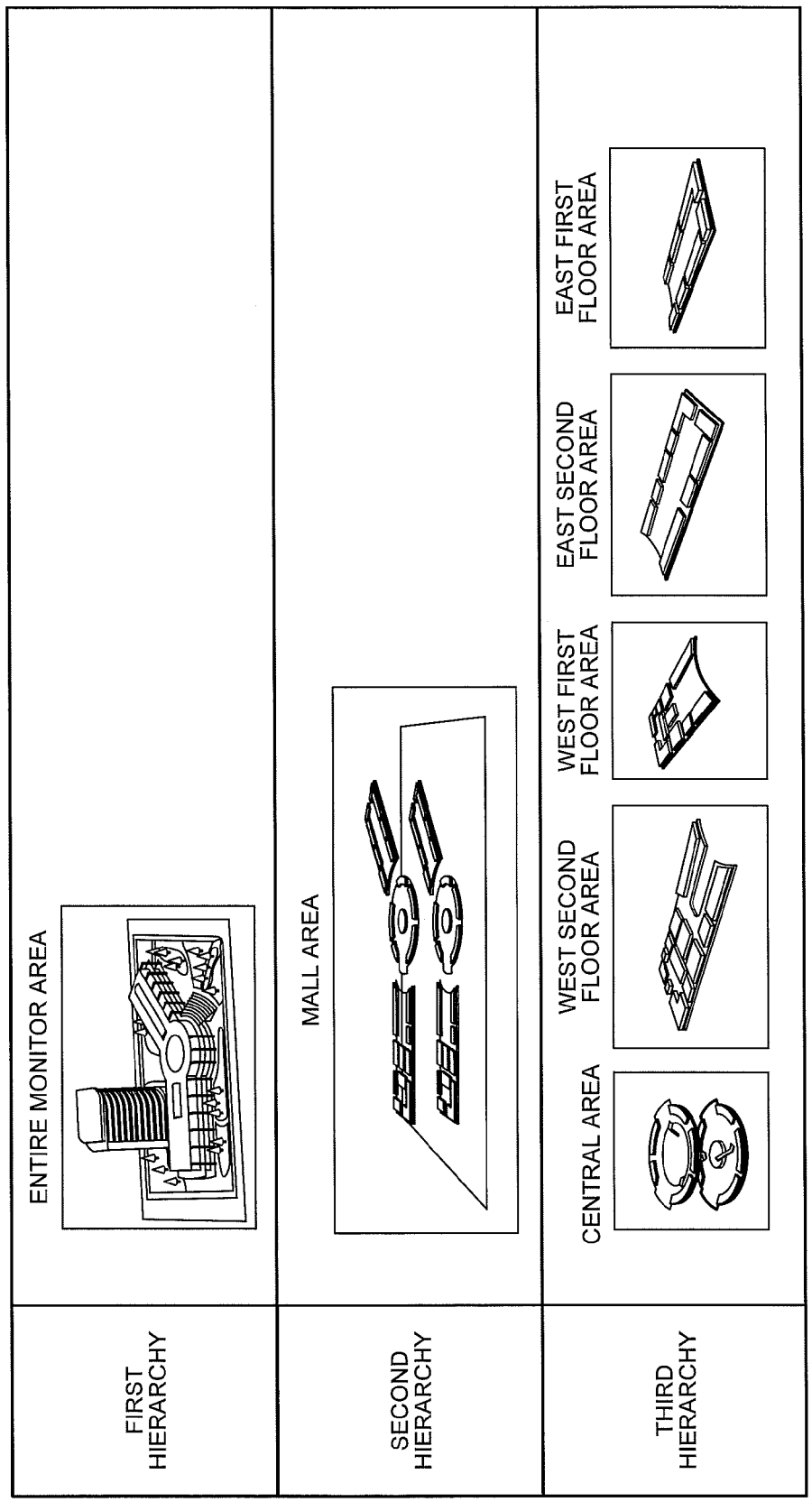
FIG. 29 is an illustration of the hierarchical structure of monitor areas.

The hierarchy means hierarchies to which the monitor areas belong. Here, the hierarchical structure of the monitor areas according to the embodiment will be described. FIG. 29 is an illustration of the hierarchical structure of monitor areas. As illustrated in FIG. 29, in the embodiment, the following area is provided as monitor areas, including the entire monitor area expressing all of monitoring areas, a mall area expressing a mall region that is a building in the entire monitor area, and a central area, a west second floor area, a west first floor area, an east second floor area, and an east first floor area expressing the regions of floors in the mall. Moreover, these monitor areas are configured of three hierarchies. The entire monitor area belongs to a first hierarchy, the mall area belongs to a second hierarchy that is the hierarchy right below the first hierarchy, and the central area, the west second floor area, the west first floor area, the east second floor area, and the east first floor area belong to a third hierarchy that is the hierarchy right below the second hierarchy.

Again referring to FIG. 28, for example, the three-dimensional model storage unit 111 stores the hierarchy "first hierarchy", the three-dimensional model data "entire monitor area", device ID "#01" expressing camera 1, icon type ID "A001" expressing a camera as an icon type, and icon position "(x1, y1, z1)" in association with each other. Therefore, the positions at which devices are disposed can be identified by making reference to the three-dimensional model storage unit 111, as similar to the first embodiment. Furthermore, in the embodiment, it can be determined that to which hierarchy the monitor areas belong by making reference to the three-dimensional model storage unit 111.

Moreover, as illustrated in FIG. 28, the three-dimensional model storage unit 111 stores the three-dimensional parts models of various icons in association with the icon type IDs. The detail is as similar to the first embodiment, and so the description is omitted.

The view point information storage unit 112 stores view point positions for use in generating a two-dimensional projection image from three-dimensional model data at the composing unit 125 and in generating select images displayed for selecting a monitor area and a camera icon, for example, by the user. FIG. 30 is a diagram of exemplary items of information stored into the view point information storage unit 112. More specifically, the view point information storage unit 112 stores view point position IDs that identify the view point positions in association with view point positions for use in generating the two-dimensional projection images of the entire monitor area, the mall area, the central area, the west second floor area, the west first floor area, the east second floor area, and the east first floor area; and view point positions for use in generating a two-dimensional projection image of the monitor area observed from a position at which the camera is disposed.

Here, the select image is a two-dimensional projection image that the three-dimensional model of any one of the monitor areas is projected onto the two-dimensional plane and an image from which a hierarchy different from the projected monitor area can be selected, that is, a monitor area belonging to a hierarchy right below or right above, for example. Moreover, in the case where cameras are installed in a monitor area, the select image is the two-dimensional projection image of the monitor area in which the camera icons corresponding to only the cameras in association with the monitor area are disposed among the cameras, and is an image in which a camera (the imaging device) can be selected by selecting a camera icon.

Again referring to FIG. 30, for example, the view point information storage unit 112 stores the view point position ID "B001" expressing the entire monitor area belonging to the first hierarchy and a view point position "(x10, y10, z10)" in association with each other. Moreover, the view point information storage unit 112 stores the central area expressing the view point position ID "B003" belonging to the third hierarchy and a view point position "(x14, y14, z14)" in association with each other. Furthermore, the view point information storage unit 112 stores the view point position ID "B011" expressing camera 1 and a view point position "(x11, y11, z11)" in association with each other.

The manipulating unit 121 includes an input device such as a mouse and a touch panel, and accepts various instructions through user manipulations from a user of the monitoring system 1. For example, the manipulating unit 121 accepts a camera select instruction from the user (a selection of the camera icon) from the select images. Moreover, when a predetermined camera (the imaging device 20) is selected by a user manipulation, the manipulating unit 121 accepts an instruction to output the shot image at the selected imaging device 20. Furthermore, the manipulating unit 121 accepts setting instructions for pan, tilt, and zoom with respect to a predetermined imaging device 20 by a user manipulation. It is noted that setting instructions for pan, tilt, and zoom are sent to the imaging device 20 as control signals related to pan, tilt, and zoom through the control unit 124 and the communication processing unit 122. In addition, the manipulating unit 121 receives a finish instruction expressing that the process is finished from the user.

Moreover, the manipulating unit 121 accepts a selection of a monitor area belonging to a hierarchy (a different hierarchy) different from the monitor area displayed on the select image, through the select image on which the monitor areas are displayed. More specifically, the manipulating unit 121 accepts a selection of a monitor area belonging to a hierarchy right below or right above the hierarchy to which the monitor area displayed on the select image belongs, through the select image on which the monitor areas are displayed. Furthermore, the manipulating unit 121 accepts a selection of a monitor area belonging to the under layer or the upper layer of the hierarchy to which the monitor area displayed on the select image belongs, through the select image on which the monitor areas are displayed.

In addition, in the case where camera icons are displayed on the select image, the manipulating unit 121 accepts a selection of a camera icon through the select image. For example, in the case where the select image that is a two-dimensional projection image of the entire monitor area is displayed, the manipulating unit 121 accepts a selection of the camera icon of the camera in association with the mall area belonging to the under layer right below, the central area and the west second floor area belonging to the under layer, and the entire monitor area. It is noted that the manipulating unit 121 corresponds to a region selection accepting unit and a camera selection accepting unit.

Figure 31:
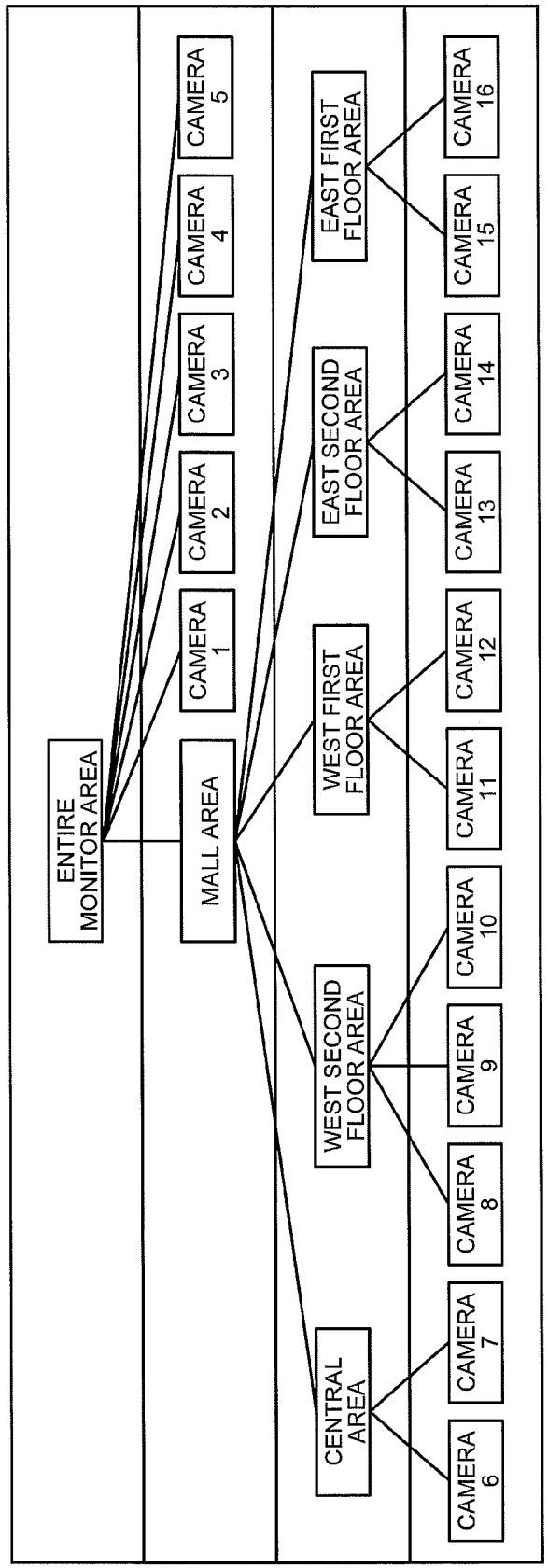
FIG. 31 is an illustration of monitor areas or camera icons selectable from select images.

FIG. 31 is an illustration of monitor areas or camera icons selectable from select images. As illustrated in FIG. 31, in the case where the entire monitor area includes the mall area, and cameras 1 to 5 are associated in the area; the mall area and the camera icons of cameras 1 to 5 can be selected through the select image that is a two-dimensional projection image of the entire monitor area. Moreover, in the case where the mall area includes the central area, the west second floor area, the west first floor area, the east second floor area, and the east first floor area, and the cameras are not associated in the areas; the central area, the west second floor area, the west first floor area, the east second floor area, and the east first floor area can be selected through the select image that is a two-dimensional projection image of the mall area.

Furthermore, in the case where cameras 6 and 7 are associated in the central area, the camera icons of cameras 6 and 7 can be selected through the select image that is a two-dimensional projection image of the central area. The same thing is applied to the west second floor area, the west first floor area, the east second floor area, and the east first floor area that are the other monitor areas.

In the case where the acquiring unit 123 accepts a selection of a camera icon from the select image through the manipulating unit 121, the acquiring unit 123 acquires a shot image taken at the camera corresponding to the selected camera icon (the imaging device 20) and pan information and tilt information about the shooting direction and zoom information from the imaging device 20 through the communication processing unit 122. In addition, the acquiring unit 123 acquires detected data from the sensor 40. It is noted that detected data may include information (pan information and tilt information, for example) related to the detection direction of the sensor 40, for example.

In the case where the composing unit 125 accepts a selection of a camera icon from the select image through the manipulating unit 121, the composing unit 125 generates a two-dimensional projection image according to the view point of the three-dimensional model of the monitor area projected onto the select image and the shooting direction of the camera corresponding to the selected camera icon (the imaging device 20). The composing unit 125 then composes the shot image that is a two-dimensional image taken at the camera corresponding to the selected camera icon (the imaging device 20) in the two-dimensional image region of the generated two-dimensional projection image. At this time, the composing unit 125 also disposes the icons such as camera icons and sensor icons output from the control unit 124 in the two-dimensional projection image based on the icon positions. It is noted that the detail of composing the shot image and disposing the icon are as similar to the first embodiment.

Moreover, in the case where the composing unit 125 accepts a selection of the monitor area from the select image at the manipulating unit 121, the composing unit 125 disposes camera icons and sensor icons at the icon positions such as camera icons and sensor icons (the camera positions of the cameras and the sensor positions of the sensors disposed on the selected monitor area) in the three-dimensional model of the selected monitor area. The composing unit 125 then acquires the view points (the view point positions) of the three-dimensional model of the monitor area (the selected monitor area) stored into the view point information storage unit 112; and generates the select image that is the two-dimensional projection image in which the three-dimensional model of the monitor area (the selected monitor area), on which the camera icons and sensor icons are disposed, is projected onto the two-dimensional plane according to the view point. At this time, in the case where cameras and sensors are not associated in the selected monitor area, camera icons and sensor icons are not disposed.

The output unit 126 outputs the composite image generated at the composing unit 125. For example, the output unit 126 outputs the composite image including various icons composed in the two-dimensional projection image, the shot image composed in the region near the camera icon, or the shot image composed in the superposed two-dimensional image region, for example, composed at the composing unit 125. Moreover, the output unit 126 outputs the select image generated at the composing unit 125. It is noted that the output unit 126 may be a display device that displays the composite image and the select image, or the output unit 126 may output the composite image and the select image to a display device connected to the image processing apparatus 10.

The Overall Process Flow According to the Eighth Embodiment

Figure 32:
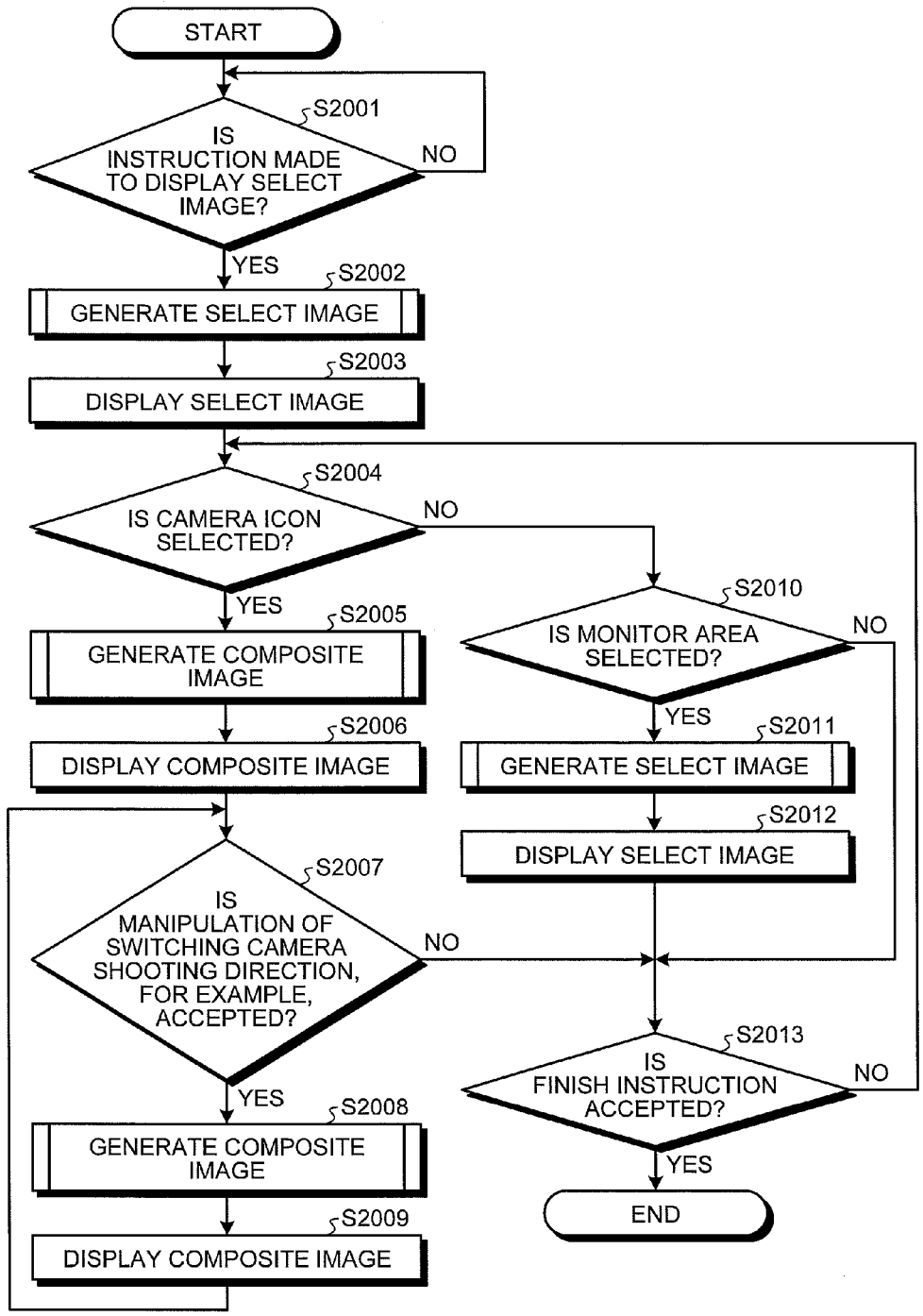
FIG. 32 is a flowchart of an exemplary overall process flow according to an eighth embodiment.

Next, the overall process flow according to the eighth embodiment will be described with reference to FIG. 32. FIG. 32 is a flowchart of an exemplary overall process flow according to the eighth embodiment.

Here, processes Step S2001 to Step S2009 are as similar to the processes in FIG. 18 in the fourth embodiment, and therefore the description is omitted (see Step S401 to Step S409). In the processes, the initial image in the fourth embodiment is replaced with the select image in Step S2001 to Step S2003. Moreover, in the case where the determination in Step S2007 is negative, the process goes to the process in Step S2013.

In Step S2004, in the case where a selection of the camera icon from the select image is not accepted at the manipulating unit 121 (NO in Step S2004), the control unit 124 determines whether to accept a selection of the monitor area from the select image at the manipulating unit 121 (Step S2010).

In the case where a selection of the monitor area from the select image is accepted (YES in Step S2010), the composing unit 125 generates the select image that is a two-dimensional projection image of the selected monitor area (Step S2011). The output unit 126 then displays the select image on the display screen (Step S2012). On the other hand, in the case where a selection of the monitor area from the select image is not accepted (NO in Step S2010), the process goes to the process in Step S2013.

Subsequently, the control unit 124 determines whether to accept a finish instruction expressing that the process is finished at the manipulating unit 121 (Step S2013). In the case where a finish instruction is received (YES in Step S2013), the process is finished. On the other hand, in the case where a finish instruction is not accepted (NO in Step S2013), the process is returned to the process in Step S2004. It is noted that an icon for inputting a finish instruction by the user, for example, is displayed in advance on the select image.

Moreover, the initial image described in the fourth embodiment is one image among the select images. In the case where the user selects the entire monitor area as a monitor area in Step S2010, a select image that is a two-dimensional projection image of the entire monitor area corresponding to the initial image is displayed in Step S2011. A selection of the monitor area is repeated as described above, so that it is possible to display the monitor areas in the hierarchical structure as in turn switched.

Furthermore, a selectable icon, for example expressing that the process is returned to the select image in the previous process, is displayed in the select image, and the select image in the previous process is displayed (returned) in the case where a selection of the icon is accepted. In addition, selectable icons, for example, expressing the monitor areas are displayed at the corners of the display screen on which the select image is displayed, for example, and in the case where a selection of any one of the icons of the displayed monitor areas is accepted, a select image that is a two-dimensional projection image of the monitor area corresponding to the selected icon is generated, and the generated select image is displayed. Thus, it is possible to select the monitor area right above, and monitor areas in the upper layer and the lower layer as well as the monitor area right below the monitor area displayed on the select image.

The Select Image Generating Process Flow According to the Eighth Embodiment

Figure 33:
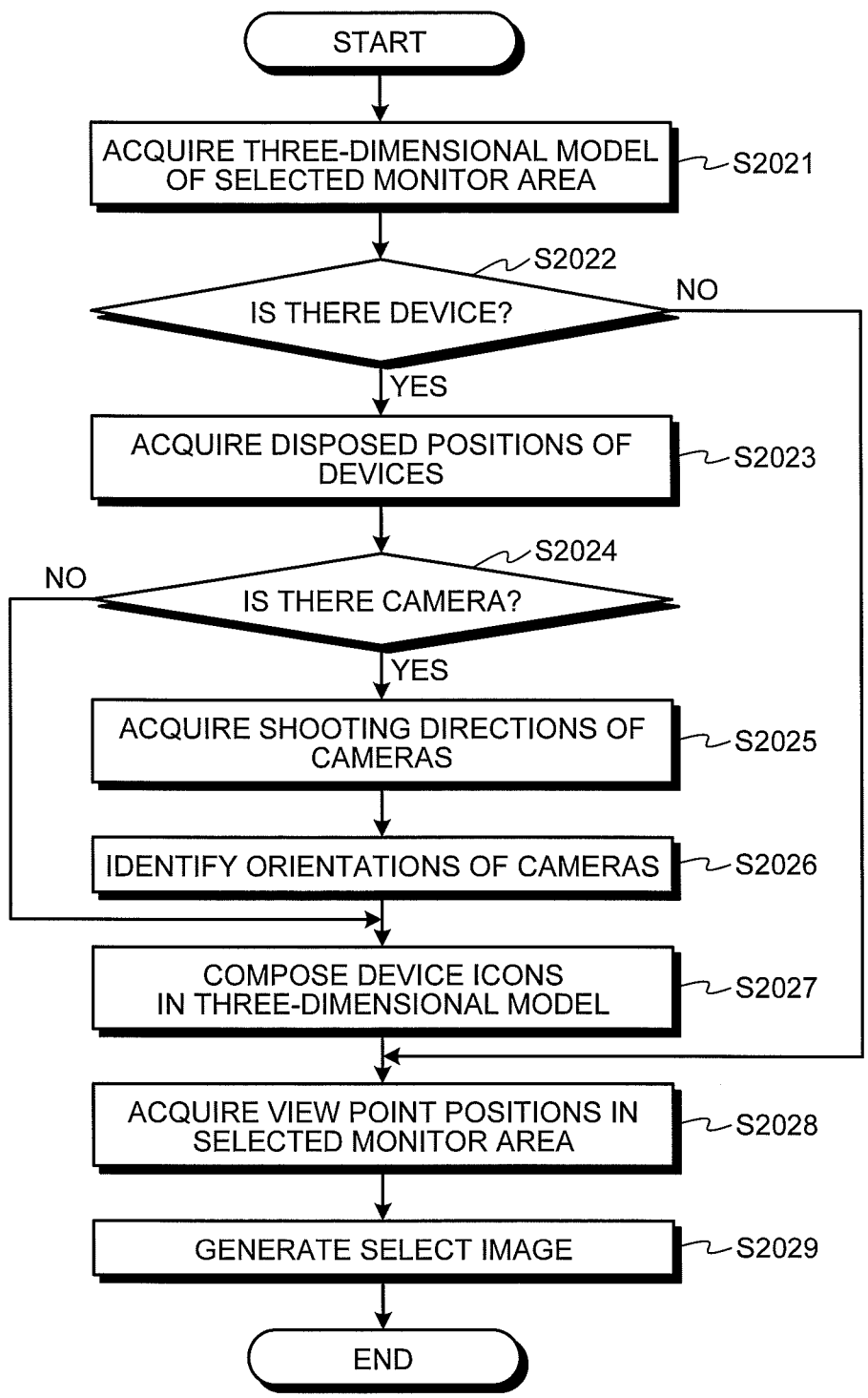
FIG. 33 is a flowchart of an exemplary select image generating process flow according to the eighth embodiment.

Next, the select image generating process flow according to the eighth embodiment will be described with reference to FIG. 33. FIG. 33 is a flowchart of an exemplary select image generating process flow according to the eighth embodiment. It is noted that the select image generating process according to the eighth embodiment is the process in Step S2011.

As illustrated in FIG. 33, the composing unit 125 of the image processing apparatus 10 acquires the three-dimensional model of the selected monitor area data from the three-dimensional model storage unit 111 (Step S2021). The composing unit 125 makes reference to the three-dimensional model storage unit 111, and determines whether there is a device (a camera or a sensor) associated with the three-dimensional model of the selected monitor area (Step S2022). In the case where there is no associated device (NO in Step S2022), the icon is not composed, and the process goes to the process in Step S2028.

On the other hand, in the case where there is an associated device (YES in Step S2022), the composing unit 125 makes reference to the three-dimensional model storage unit 111, and acquires the disposed positions of the devices associated with the three-dimensional model of the selected monitor area, that is, icons and the icon positions of the icons (Step S2023).

Subsequently, the composing unit 125 determines whether the associated devices include a camera (the imaging device 20) (Step S2024). In the case where the associated devices include no camera (NO in Step S2024), the process goes to the process in Step S2027.

On the other hand, in the case where the associated devices include a camera (YES in Step S2024), the composing unit 125 acquires the shooting directions of the cameras sent from the imaging devices 20 through the communication processing unit 122, the acquiring unit 123, and the control unit 124 (Step S2025).

After the acquiring, the composing unit 125 identifies the orientations of the camera icons from the acquired shooting directions (Step S2026). For the camera icons, the composing unit 125 then composes the icons of the devices (only the cameras, or the cameras and the sensors) at the icon positions in the three-dimensional model (Step S2027). At this time, the composing unit 125 disposes the camera icons in the three-dimensional model in the state in which the lenses of the camera icons are directed in the orientations identified in Step S2026. However, for the devices such as the sensors 40 without orientations, the icons are composed at the corresponding icon positions in the three-dimensional model in no consideration of the orientations particularly.

The composing unit 125 then acquires the view point positions associated with the view point position IDs of the selected monitor area from the view point information storage unit 112 (Step S2028). Subsequently, the composing unit 125 generates the two-dimensional projection image by rendering using a given method as by projecting the three-dimensional model onto the projection plane (the two-dimensional plane) based on the acquired view point positions, the preset fixation points, and the angles of view; and sets the generated two-dimensional projection image to the select image (Step S2029). It is noted that as illustrated in FIG. 9, this select image is composed with the shot images taken at the imaging devices 20 corresponding to the camera icons in pop-up regions set near the camera icons in the two-dimensional projection image.

As described above, the image processing apparatus according to the eighth embodiment includes the monitor areas configured in a hierarchy, in which the monitor area of a different hierarchy can be selected from the select image that is a two-dimensional projection image of any one of the monitor areas. Moreover, since only the camera icons of the cameras in association with the selected monitor area are displayed, many camera icons are not displayed at a same time. Furthermore, in the case where a camera icon is selected from the select image that is a two-dimensional projection image of the selected monitor area, the composite image is displayed so that the shot image taken at the camera corresponding to the selected camera icon is composed. Accordingly, it is possible to facilitate intuitively grasping the position of the camera disposed in the monitor area, which is a three-dimensional space, in the two-dimensional image, and to improve operability.

Ninth Embodiment

Next, an image processing apparatus 10 according to a ninth embodiment will be described. The foregoing image processing apparatus 10 according to the first embodiment to the eighth embodiment identifies the view point position in association with the monitor area for processing at the view point information storage unit 112 in generating the two-dimensional projection image as the select image (the initial image); and generates the two-dimensional projection image based on the three-dimensional model data of the monitor area to be processed according to the view point position, the preset fixation point, and the angle of view. However, the image processing apparatus 10 according to the embodiment can appropriately change view point positions for use in generating the two-dimensional projection image from the three-dimensional model data of the monitor area to be processed according further to an instruction from the user.

Figure 34:
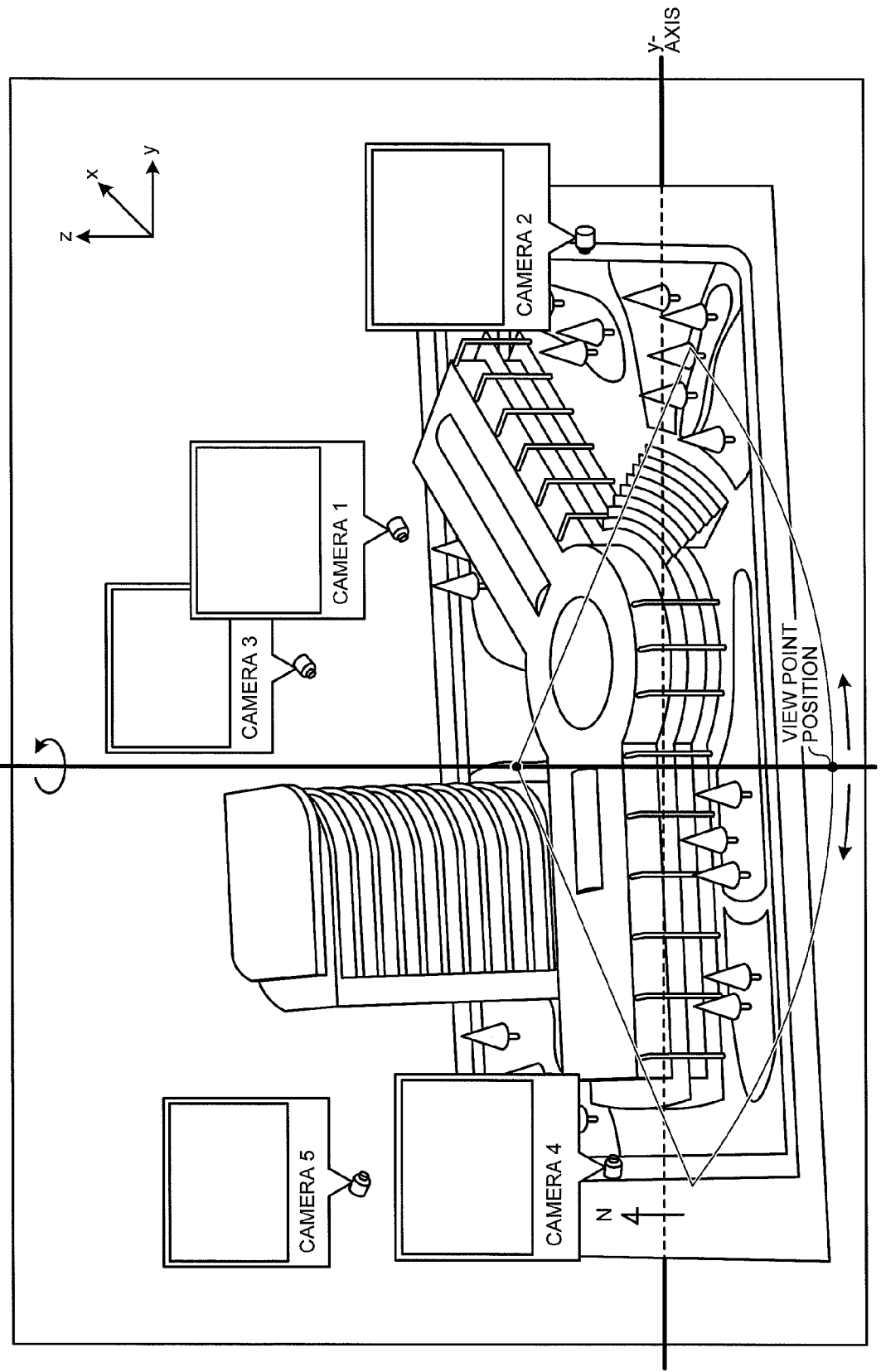
FIG. 34 is a diagram illustrative of a process of an image processing apparatus according to a ninth embodiment.

FIG. 34 is a diagram illustrative of a process of the image processing apparatus 10 according to the ninth embodiment. FIG. 34 is a two-dimensional projection image of the entire monitor area corresponding to the initial image. Here, the vertical direction of the three-dimensional model of the entire monitor area is defined as the z-axis, a predetermined direction of a horizontal plane that is a plane horizontal to the vertical direction is the x-axis, and the direction vertical to the x-axis is the y-axis.

The positions of the view point and the fixation point with respect to the three-dimensional model can be freely set. However, in the image processing apparatus 10 according to the ninth embodiment, the view point range, which is the range of positions that can be set, is preset on the three-dimensional model storage unit 111 in order to limit the range of positions that can be set as view points. The view point range set in the image processing apparatus 10 according to the embodiment is a circular arc range corresponding to a predetermined rotation angle range in which the rotation axis disposed on the three-dimensional model is the center and the radius has a predetermined value.

For example, as illustrated in FIG. 34, for the entire monitor area, the image processing apparatus 10 can generate and output a two-dimensional projection image in the state in which the z-axis is the rotation axis and the view point position is changed along the circular arc in a predetermined rotation angle range; and moreover can generate and output a two-dimensional projection image in the state in which the y-axis is the rotation axis and the view point position is similarly changed along the circular arc in a predetermined rotation angle range.

In the image processing apparatus 10 according to the ninth embodiment, a manipulating unit 121 accepts a view point position change instruction according to a user manipulation. Namely, the manipulating unit 121 functions as a change instruction accepting unit. The composing unit 125 changes the view point position based on the view point position shown in the change instruction accepted at the manipulating unit 121 based on the three-dimensional model stored into the three-dimensional model storage unit 111 and the view point position stored into the view point information storage unit 112, for example; and generates the two-dimensional projection image on which the three-dimensional model is formed based on the changed view point. Namely, the composing unit 125 functions as a view point position changing unit and a generating unit.

FIG. 35 is a diagram of exemplary items of information stored into the three-dimensional model storage unit 111 of the image processing apparatus 10. As illustrated in FIG. 35, the three-dimensional model storage unit 111 according to the embodiment further stores the view point range in association with the three-dimensional model data. Namely, the three-dimensional model storage unit 111 corresponds to a three-dimensional model storage unit and a view point range storage unit. Here, the view point range includes the rotation axis position, the radius, and the rotation angle range for the z-axis and the y-axis. The rotation axis position is the rotation axis position in the three-dimensional model. The radius is a value corresponding to a distance between the view point and the fixation point. The rotation angle range is a rotation angle about the rotation axis corresponding to the view point range. In the embodiment, the rotation angle range is set in the positive direction and in the negative direction respectively with respect to the view point positions associated with the monitor areas on the view point information storage unit 112 described using FIG. 30 in the eighth embodiment.

As described above, the view point range can be identified based on the rotation axis position, the radius, the rotation angle range, and the view point position. Namely, the three-dimensional model storage unit 111 stores the rotation axis position, the radius, and the rotation angle range as the view point range.

It is noted that in another example, the three-dimensional model storage unit 111 may store a plurality of coordinates of view point positions that can be set in the view point range instead of storing coefficients for defining the view point range as described above. In the case where a change in the distance between the view point position and the original point is permitted by a pinch at the manipulating unit 121 in the state in which no camera is selected, it may be fine that the three-dimensional model storage unit 111 changes the radius about the rotation axis, and further stores the range of the radius as the view point range. As described above, the three-dimensional model storage unit 111 may store information that can identify coordinates which can be set as the view point position as the view point range. The specific information about the view point range is not limited to the embodiment.

The rotation axis positions stored into the view point information storage unit 112 are values that do not generate or display a two-dimensional projection image expressing a three-dimensional model hardly grasped by the user such as a two-dimensional projection image including a blank region where no three-dimensional model exists. The rotation axis position is predetermined by a designer, for example based on this view point, and registered in the view point information storage unit 112.

Moreover, the rotation angle range stored in the view point information storage unit 112 is a range not including a rotation angle that generates and displays a two-dimensional projection image observed from an unexpected position at which the user is not expected to view the image like the back of the ground of the three-dimensional model of the entire monitor area, for example. The rotation angle range is predetermined by a designer, for example, and registered in the view point information storage unit 112.

As described above, in the image processing apparatus 10 according to the embodiment, the view point range is preset so as not to generate a two-dimensional projection image projected to the observation direction in which the user is not expected to view the image by the designer, for example, of the three-dimensional model, so that only two-dimensional projection images expected by the designer, for example, can be provided for the user.

Figure 36B:
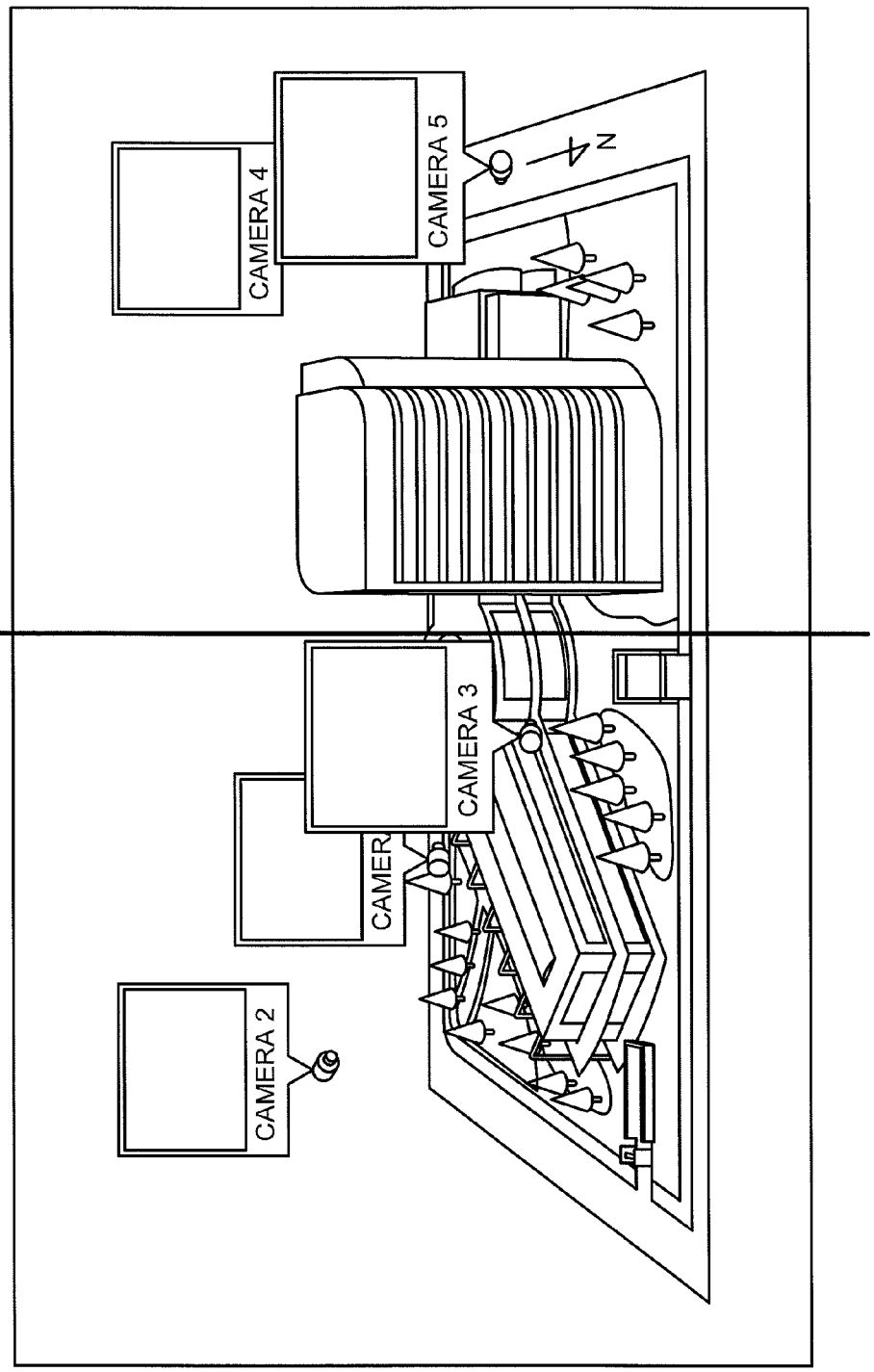
FIG. 36B is a diagram of a two-dimensional projection image formed when a view point position is changed.
Figure 36C:
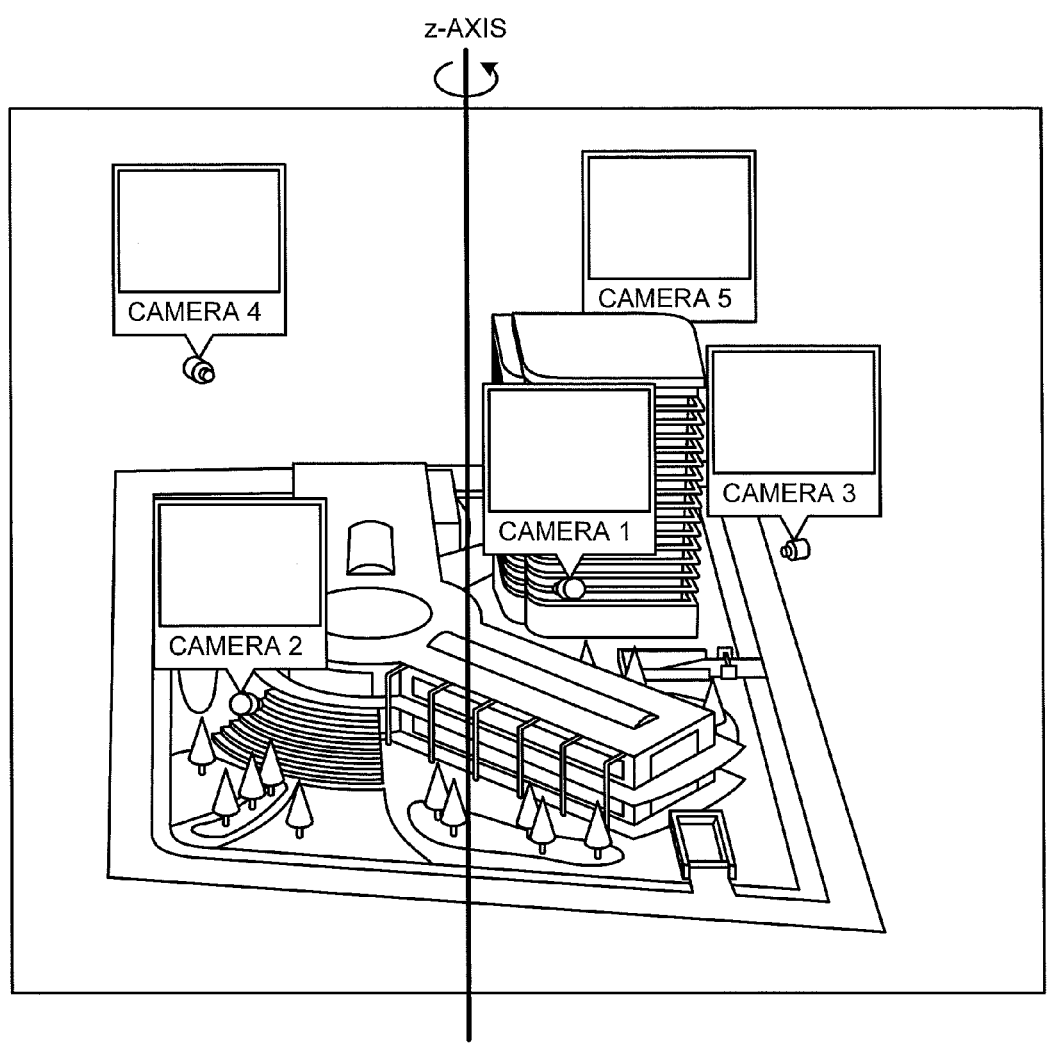
FIG. 36C is a diagram of a two-dimensional projection image formed when a view point position is changed.

FIGS. 36A to 36C are diagrams of a two-dimensional projection image formed when a view point position is changed. FIGS. 36A to 36C are two-dimensional projection images formed based on the view point position in the two-dimensional projection image of the entire monitor area illustrated in FIG. 34 at a view point position in a view point range with respect to the z-axis stored in association with the entire monitor area in the three-dimensional model storage unit 111.

FIG. 36A is a two-dimensional projection image in which a three-dimensional model is formed at a view point position after rotating the view point position in the two-dimensional projection image illustrated in FIG. 34 at an angle of 90° about the z-axis clockwise in the state in which the three-dimensional model is seen in the z-axis direction from above the three-dimensional model. FIG. 36B is a two-dimensional projection image in which a three-dimensional model is formed at a view point position after further rotating the view point position of the two-dimensional projection image illustrated in FIG. 36A at an angle of 90° clockwise. FIG. 36C is a two-dimensional projection image in which a three-dimensional model is formed at a view point position after similarly rotating the two-dimensional projection image illustrated in FIG. 36B at an angle of 90°.

Figure 37:
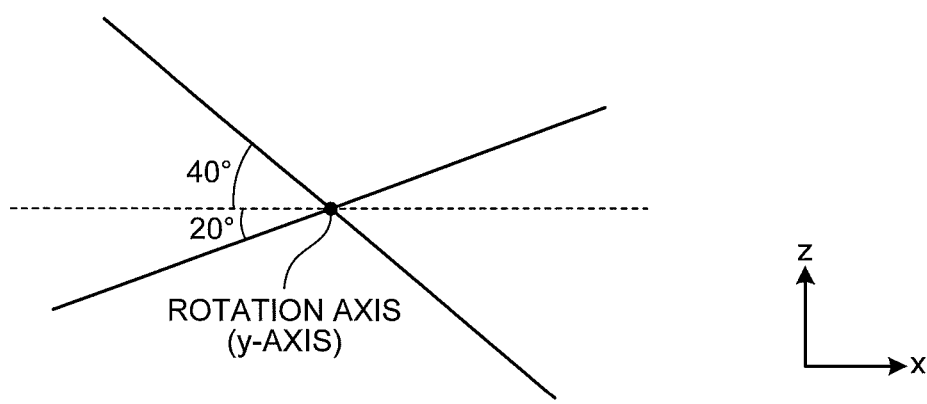
FIG. 37 is a diagram illustrative of a view point range where a y-axis is a rotation axis in an entire monitor area.

FIG. 37 is a diagram illustrative of a view point range where the y-axis is a rotation axis in an entire monitor area. As illustrated in FIG. 37, the rotation angle range corresponding to the view point range of the y-axis is set between the upper limit at an angle of 40° in a positive direction of the z-axis of the three-dimensional model and the lower limit at an angle of 20° in a negative direction of the z-axis. The view point position is sometimes rotated in the negative direction about the y-axis because the position relation between the monitor areas is grasped as seen from the lower side. However, when the view point position is rotated greatly in the negative direction, the image is seen as if it is seen from underground, and it becomes difficult to grasp the positional relation contrarily. Therefore, the rotation angle range in the negative direction is set to a value smaller than the rotation angle range in the positive direction.

Figure 38A:
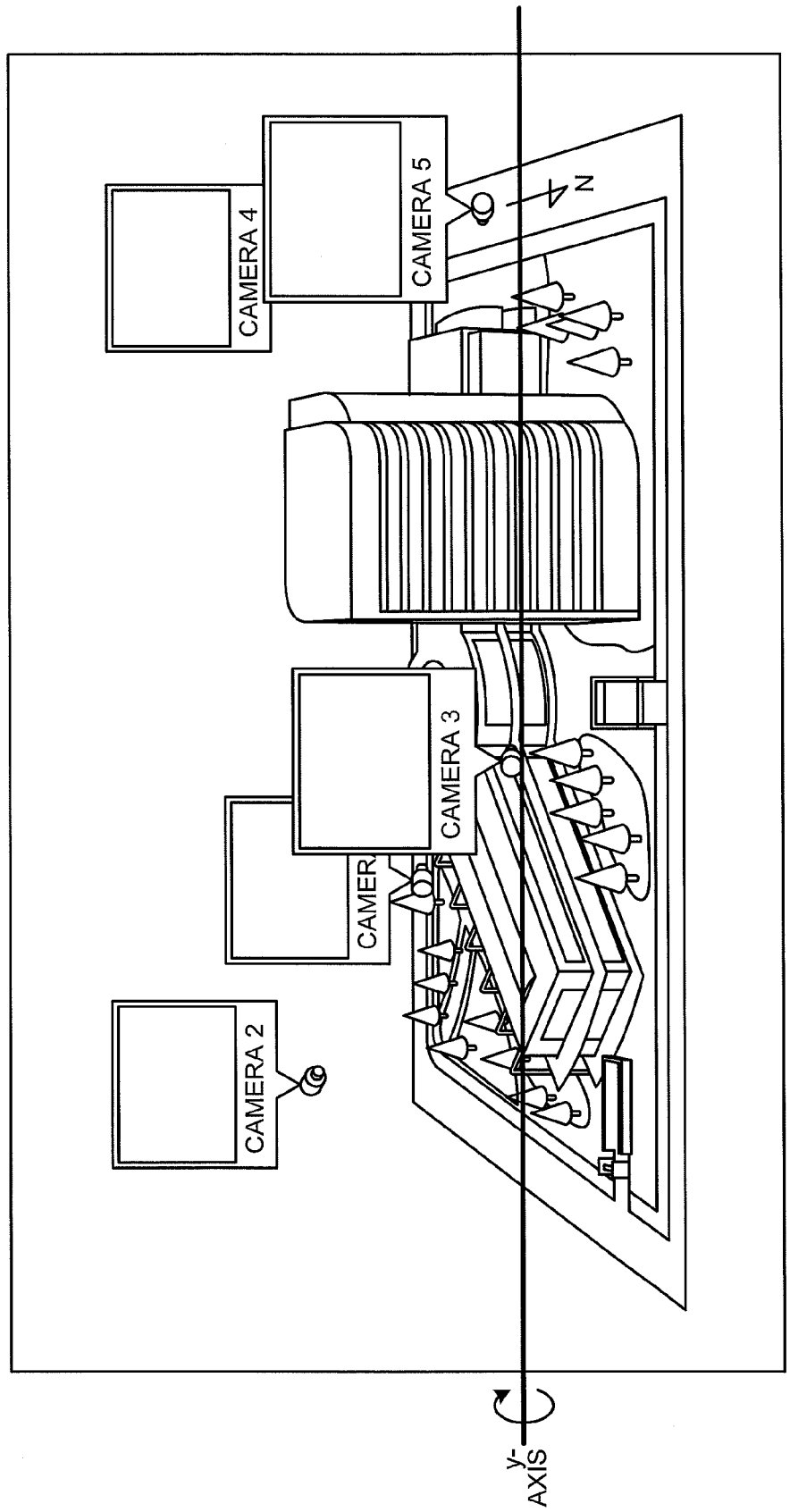
FIG. 38A is a diagram of a two-dimensional projection image formed when a view point position is changed.
Figure 38B:
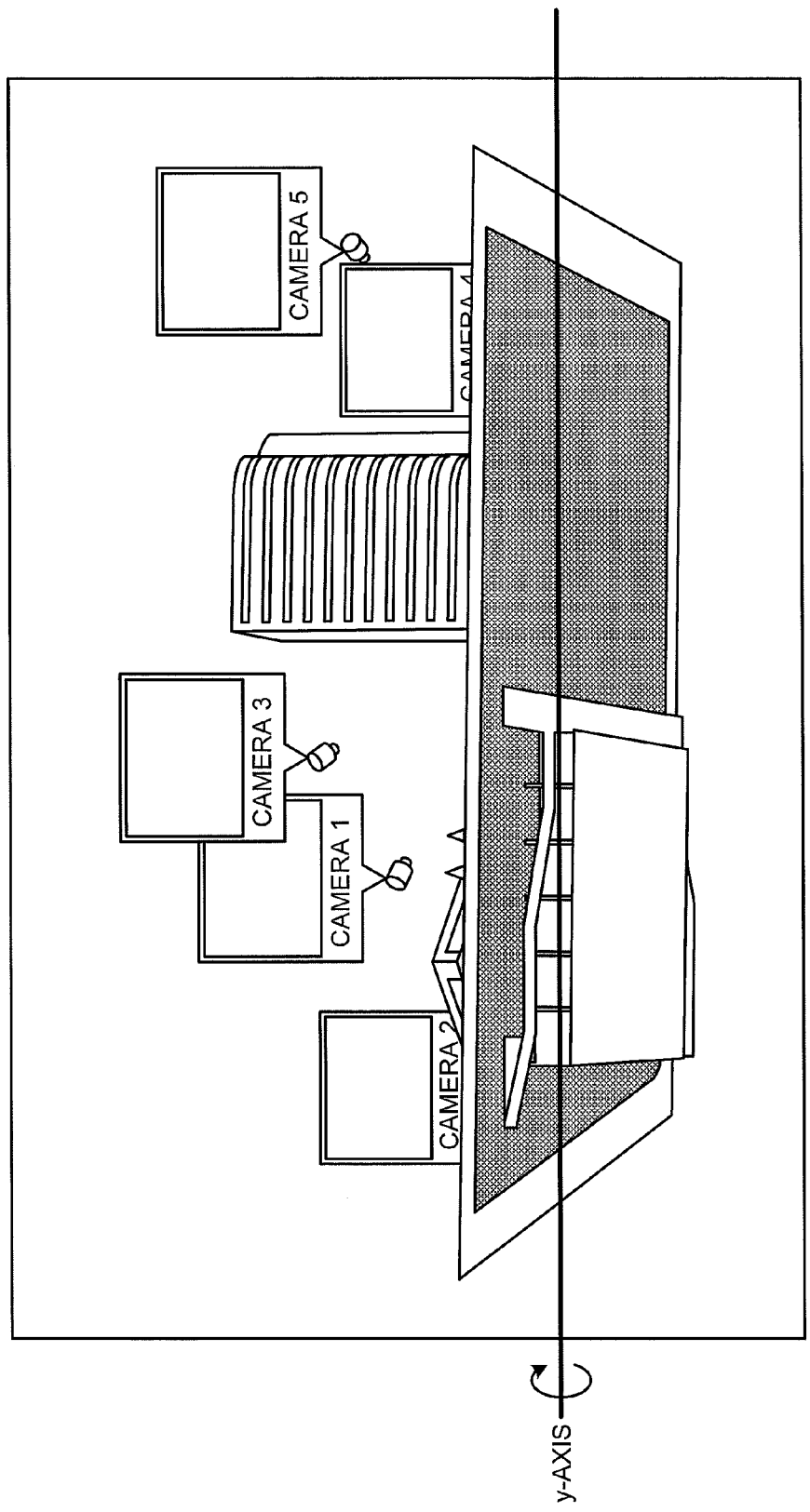
FIG. 38B is a diagram of a two-dimensional projection image formed when a view point position is changed.

FIGS. 38A and 38B are diagrams of a two-dimensional projection image formed in the case where the view point position is changed in the view point range as the y-axis is the rotation axis. In the case where two-dimensional projection image is rotated at an angle of 20° in the negative direction as the y-axis illustrated in FIG. 38A being the rotation axis, a two-dimensional projection image as illustrated in FIG. 38B is obtained.

It is noted that in the image processing apparatus 10 according to the embodiment, for convenience of explanation, the view point ranges for any of the monitor areas are the range where the z-axis and the y-axis are the rotation axis. However, the directions, positions, and numbers of the rotation axes to be the base of the view point range are not limited to the embodiment. For example, it may be fine that a rotation axis extending in the direction other than the x-, y-, and z-axes is set. Moreover, the number of the rotation axes may be one, or may be three or more.

Figure 39:
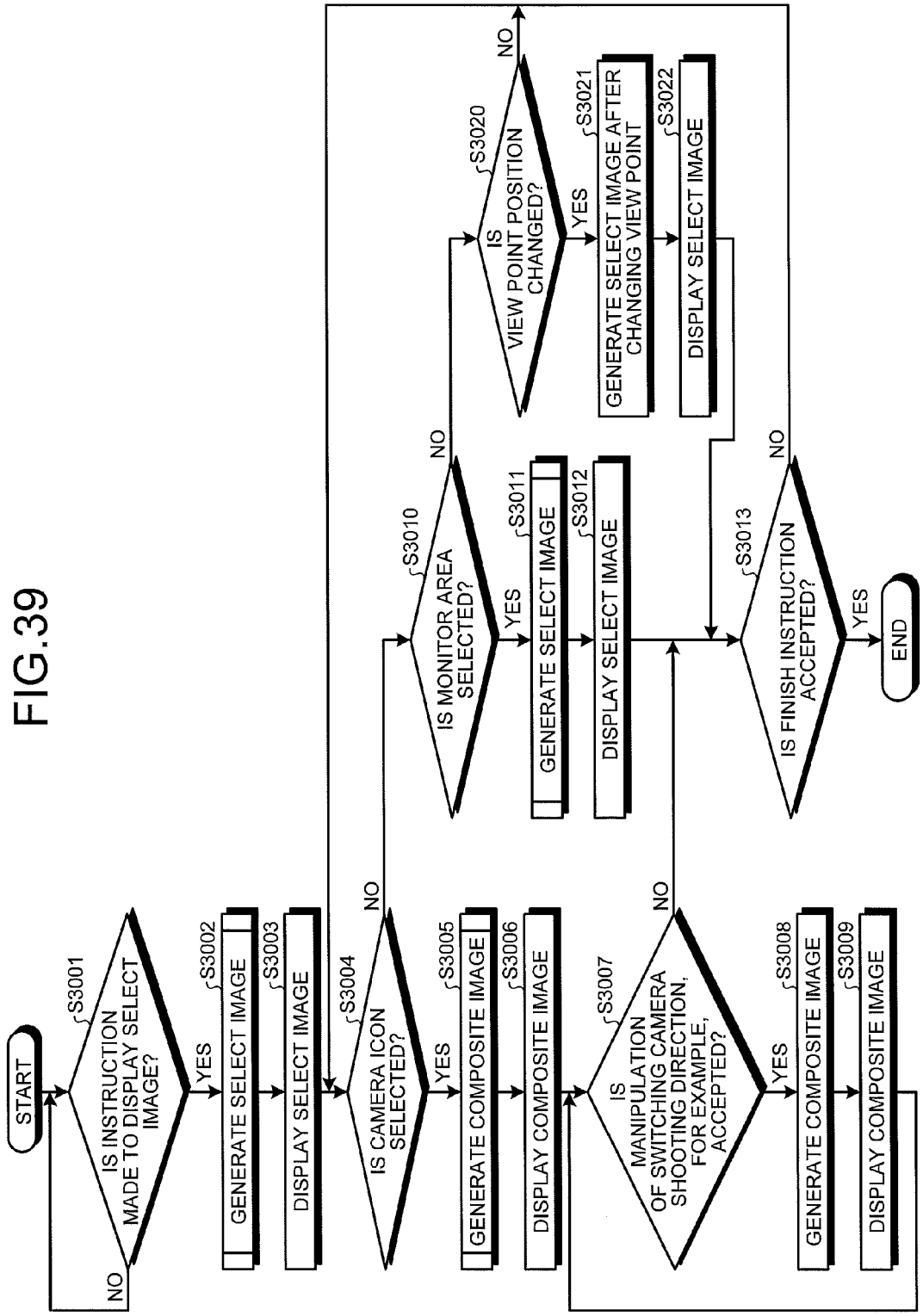
FIG. 39 is a flowchart of an image processing apparatus.

FIG. 39 is a flowchart of the image processing apparatus 10 according to the ninth embodiment. It is noted that the processes in Step S3001 to Step S3013 illustrated in FIG. 39 are as similar to the processes in Step S2001 to Step S2013 according to the eighth embodiment.

In the image processing apparatus 10 according to the ninth embodiment, the user can input a change of the view point position by manipulating the manipulating unit 121 in the state in which the select image is displayed such as the two-dimensional projection image of the entire monitor area illustrated in FIG. 34, for example. More specifically, for example, the direction of changing the view point position is specified by moving a cursor displayed on the display screen using a mouse. Moreover, the distance of moving the view point position is specified at speed corresponding to a rate of travel.

When the manipulating unit 121 accepts a view point position change instruction according to a user manipulation (NO in Step S3004, NO in Step S3010, and YES in Step S3020), the composing unit 125 first identifies the view point position in the view point range according to the change instruction. More specifically, for example, when the user moves the cursor on the display screen, the composing unit 125 specifies an amount of the view point position changed in the view point range from an amount of the cursor moved, and identifies the changed view point position based on the specified amount changed. It is noted that it is fine that the relation between the input method for the change instruction, input information that is input, and the view point position determined from the input information is determined. The processes of identifying the view point position from the input method and the input information are not limited to the embodiment.

The composing unit 125 further generates a two-dimensional projection image, that is, a select image after changing the view point from the three-dimensional model data of the three-dimensional model corresponding to the displayed select image that is displayed when accepting the change instruction based on the changed view point position (Step S3021). It is noted that in the case where devices are associated in the three-dimensional model of the displayed select image at the three-dimensional model storage unit 111 in Step S3021, the composing unit 125 extracts the icon of the associated device, disposes the extracted icon in the three-dimensional model, and generates the select image from the three-dimensional model data of the three-dimensional model after disposed. Subsequently, the output unit 126 outputs the select image after the view point is changed, and the select image which is output on the display screen is displayed (Step S3022), and the process goes to Step S3013. Namely, in the case where the camera icon is selected in the select image displayed in Step S3022, the composite image, in which the shot image taken at the imaging device 20 corresponding to the selected camera icon is composed, can be generated and displayed in the processes from Step S3004 to Step S3006.

In the image processing apparatus 10 according to the embodiment, the view point position can be changed according to the preset rotation axis and the rotation angle range in changing the view point position based on the change instruction from the user. Thus, two-dimensional projection images unnecessary for the user are not displayed, and the user can display a two-dimensional projection image in which a desired area can be observed with a simple manipulation.

It is noted that the other configurations and processes of the image processing apparatus 10 according to the ninth embodiment other than ones described above are as similar to the configurations and processes of the image processing apparatus 10 according to the embodiment.

The image processing apparatus 10 according to the embodiment stores pluralities of the monitor areas and the view point ranges for use in displaying the select screen in association with each other, and permits the view point position on the select screen to be changeable. However, in another example, it may be fine that the image processing apparatus 10 stores the view point ranges and the view point positions for generating a confirmation image for confirming a selection of the camera and the direction of the camera lens by the user in association with the three-dimensional model, so that the view point position of the confirmation image is changeably displayed.

Thus, it is possible to generate and display the two-dimensional projection image that is observed of the three-dimensional model from the view point at which the direction of the camera lens can be easily confirmed as the confirmation image and to display the two-dimensional projection image (the confirmation image) in the state in which the three-dimensional model expressed in the two-dimensional projection image is rotated according to the instruction from the user.

Tenth Embodiment

In the embodiments described above, the shot image acquired at the imaging device 20 (in the following, also referred to as a monitor image) is live-displayed on the image processing apparatus 10 using the live streaming technique, for example, (in the following, referred to as live streaming reproduction). However, the embodiment is not limited to this form. For example, it may be fine that imaging information and event information acquired at the image processing apparatus 10 from the imaging device 20 and the sensor 40, for example, via the network 30 are recorded on a storage device provided on the image processing apparatus 10 or a storage device disposed on the network 30 and used for reproducing monitor images later (in the following, referred to as recording and reproduction for distinguishing this form from live streaming reproduction). Here, the embodiment in which the image processing apparatus 10 includes a storage device that stores imaging information and event information will be described as a tenth embodiment.

Figures 40, 41:
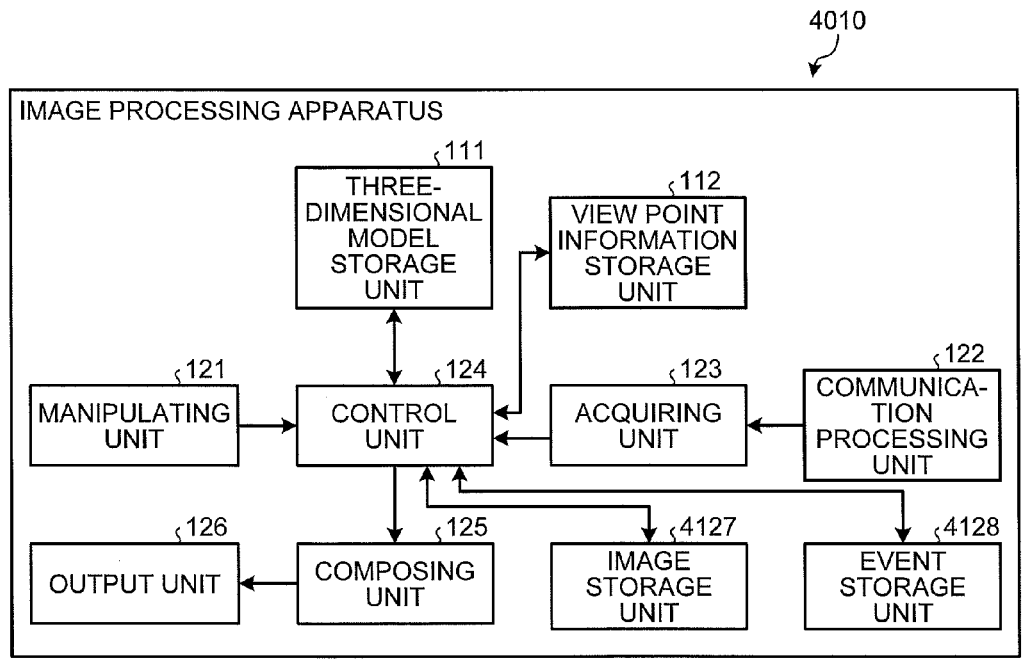
FIG. 40 is a diagram of an exemplary configuration of an image processing apparatus according to a tenth embodiment.
FIG. 41 is a diagram of an exemplary shot image management table held on an image storage unit illustrated in FIG. 40.

FIG. 40 is a diagram of an exemplary configuration of an image processing apparatus 4010 according to the tenth embodiment. As illustrated in FIG. 40, the image processing apparatus 4010 includes an image storage unit 4127 and an event storage unit 4128 in addition to the configuration similar to the configuration of the image processing apparatus 10 illustrated in FIG. 3. For the image storage unit 4127 and the event storage unit 4128, various storage devices may be used such as a hard disk that is built in a personal computer that implements the image processing apparatus 4010 or a hard disk that is externally mounted on a personal computer respectively.

Imaging information sent from the imaging device 20 includes the device ID of the imaging device 20 that acquires a shot image and shooting time at which the shot image is acquired in addition to the shot image, pan information, tilt information, and zoom information described above. The device ID and the shooting time are sent from the control unit 204 to the compression unit 202 of the imaging device 20, and added to the header or the footer of the shot image together with pan information, tilt information, and zoom information. It is noted that in the following description, pan information, tilt information, and zoom information are collectively referred to as PTZ information.

The acquiring unit 123 acquires imaging information through the communication processing unit 122 via the network 30; identifies the shot image, the device ID, the shooting time, and PTZ information included in the imaging information; and inputs them to the control unit 124.

The control unit 124 performs the live streaming reproduction of the monitor image as the two-dimensional projection image according to the foregoing embodiments as a background using the shot image, the device ID, the shooting time, and the PTZ information acquired at the acquiring unit 123; and stores the shot image, the device ID, the shooting time, and the PTZ information on the image storage unit 4127. It is noted that also even in the case where the live streaming reproduction of the monitor image is not performed, the shot image, the device ID, the shooting time, and the PTZ information may be stored from the control unit 124 on the image storage unit 4127.

Moreover, when storing the shot image, the device ID, the shooting time, and the PTZ information into the image storage unit 4127, the control unit 124 identifies the device ID of the imaging device 20 selected by the user. Therefore, in the case where the device ID of the imaging device 20 under selection is matched with the device ID to be stored, the control unit 124 adds a predetermined select flag to a data set to be stored (the shot image, the device ID, the shooting time, and the PTZ information), and stores them on the image storage unit 4127. A predetermined select flag is flag information expressing that the associated shot image is a shot image acquired at an imaging device 20 in the state in which the imaging device 20 is under selection. It is noted that in the case where the device ID of the imaging device 20 under selection is not matched with the device ID to be stored, it may be fine that the control unit 124 adds a select flag expressing that the shot image is a shot image acquired at the imaging device 20 that is not selected by the user to the data set to be stored; and stores them on the image storage unit 4127. The select flag in adding may be null data. In the following, for clarifying the explanation, a select flag expressing that a shot image is acquired at the imaging device 20 under selection is referred to as an under-selection flag ('1'); and a select flag expressing that a shot image is acquired at the imaging device 20 not under selection is referred to as an out-of-selection flag ('0').

The image storage unit 4127 stores the shot image, the device ID, the shooting time, the PTZ information, and the select flag as distinguished from each other for the individual imaging devices 20. The device IDs are used for distinguishing between them. Moreover, a table management method, for example, is used for managing data in the image storage unit 4127.

FIG. 41 is a diagram of an exemplary shot image management table held on the image storage unit 4127. As illustrated in FIG. 41, in the shot image management table, the shot images are individually registered in association with the device ID, shooting time, PTZ information, and select flag of the imaging device 20 (the camera) that shot the image. It is noted that in FIG. 41, an example of the shot image management table possibly for use in live streaming reproduction in the case where the monitor image (the shot image) is continuous still images. However, the shot image management table is not limited thereto. For example, in the case where the shot images are compressed in a moving picture compression format including a plurality of frames such as the MPEG-4 format, a series of shot images acquired at a single shooting is managed as a single moving picture file. In this case, PTZ information and the select flag, for example, which are changed by hours may be added to the time period corresponding to the shot image (the operation) using the metadata recording mode such as the MPEG-7 format.

On the other hand, event information sent from the sensor 40 includes the detected data of an event as well as the device ID of the sensor 40 that detects this event and the occurring time of the event. Here, FIG. 42 is an exemplary configuration of the sensor 40. As illustrated in FIG. 42, as similar to the imaging device 20 illustrated in FIG. 2, for example, the sensor 40 includes a sensor unit 4201, a pan head drive unit 4205, an angle sensor 4206, a control unit 4204, a compression unit 4202, and a communication processing unit 4203. The detected data of the event obtained at the sensor unit 4201 and the device ID and the occurring time of the event identified at the control unit 4204 are input to the compression unit 4202. Moreover, in the case where the sensor unit 4201 is a directional sensor, pan information and tilt information acquired at the angle sensor 4206 (in the following, referred to as PT information) may be input to the compression unit 4202 through the control unit 4204. The detected data, the device ID, and the occurring time that are input to the compression unit 4202 are compressed together with PT information, as necessary, and sent as event information from the communication processing unit 4203 to the image processing apparatus 4010 via the network 30.

The acquiring unit 123 acquires event information through the communication processing unit 122 via the network 30; identifies the detected data, the device ID, and the occurring time (and PT information) included in the event information; and inputs them to the control unit 124. Furthermore, the acquiring unit 123 also inputs the occurring time, which is included in the event information when the detection of the same event is finished, to the control unit 124. The control unit 124 identifies the occurring time identified from the event information when the detection of the event is finished as the finish time; and stores the finish time on the event storage unit 4128 together with the detected data, the device ID, and the occurring time (and PT information) of the corresponding event.

The control unit 124 uses the detected data, the device, the occurring time, and the finish time (and the PT information) of the event acquired at the acquiring unit 123 for the live streaming reproduction of the monitor image described above; and stores the detected data, the device, the occurring time, and the finish time (and the PT information) on the event storage unit 4128. It is noted that also in the case where the live streaming reproduction of the monitor image is not performed, the detected data, the device ID, the occurring time, and the finish time (and the PT information) may be stored from the control unit 124 into the event storage unit 4128.

Moreover, in storing the detected data, the device, the occurring time, and the finish time (and the PT information) into the event storage unit 4128, the control unit 124 generates an event ID unique to the individual events; and stores the event ID into the event storage unit 4128 together with the data set to be stored (the detected data, the device, the occurring time, and the finish time (and the PT information)).

The event storage unit 4128 stores the event ID, the device ID, the detected data, the occurring time of the event, and the finish time (and the PT information) as distinguished from each other for the individual sensors 40. The device IDs are used for distinguishing data from each other. Furthermore, a table management method is used for managing data in the event storage unit 4128.

FIG. 43 is a diagram of an exemplary event management table held in the event storage unit 4128. As illustrated in FIG. 43, in the event management table, the detected data of the event is registered in association with the device ID of the sensor 40 that detects this event, the event ID, the occurring time, and the finish time (and the PT information). Moreover, each of the records registered on the event management table may be associated with a confirmation flag expressing whether the user confirms the events. The confirmation flag may be stored in the event storage unit 4128 during recording and reproduction of the shot image and the event information stored in the image storage unit 4127 and in the event storage unit 4128 as predetermined events including a manipulation from the user and the completion of reproducing the event which are used as triggers.

Furthermore, in the tenth embodiment and in the foregoing embodiments, the sensor 40 associated with the imaging device 20 may be provided. For example, for a human body sensor, a sensor 40 may be associated with an imaging device 20 that images the human sensing range of this sensor 40. For a door opening and closing sensor, a sensor 40 may be associated with an imaging device 20 that images the door detected at this sensor 40. In addition, it may be fine that the image taken at the imaging device 20 is used for detecting a motion; and the imaging device 20 itself is used as the sensor 40.

The association between the sensor 40 and the imaging device 20 is managed at the three-dimensional model storage unit 111, for example. For the management, the table management method can be used, for example. FIG. 44 is a diagram of an exemplary sensor management table managed at the three-dimensional model storage unit 111. As illustrated in FIG. 44, the sensor management table manages the device ID of the sensor 40 corresponding to the individual device IDs and the device ID of the imaging device 20 (in the following, referred to as a cover camera ID) in association with each other. With the use of this sensor management table, the imaging device 20 can be identified, which is associated with the sensor 40, when the user selects any one of the sensors 40 registered in the sensor management table. Moreover, the sensor management table may manage the device IDs in association with the importance degree of the sensor 40 corresponding to the device IDs and the sensor type expressing sensor types (such as a human body sensor and a heat sensor).

Next, in the following, the operation of the control unit 124 in storing imaging information and event information in the image processing apparatus 4010 will be described in detail with reference to the drawings. It is noted that here, for an exemplary operation in recording, the case is exemplified where the recording operation is performed in a time period for a preset recording. However, the operation is not limited thereto. Various modifications are possible such as recording during the operation or all the time.

Figure 45:
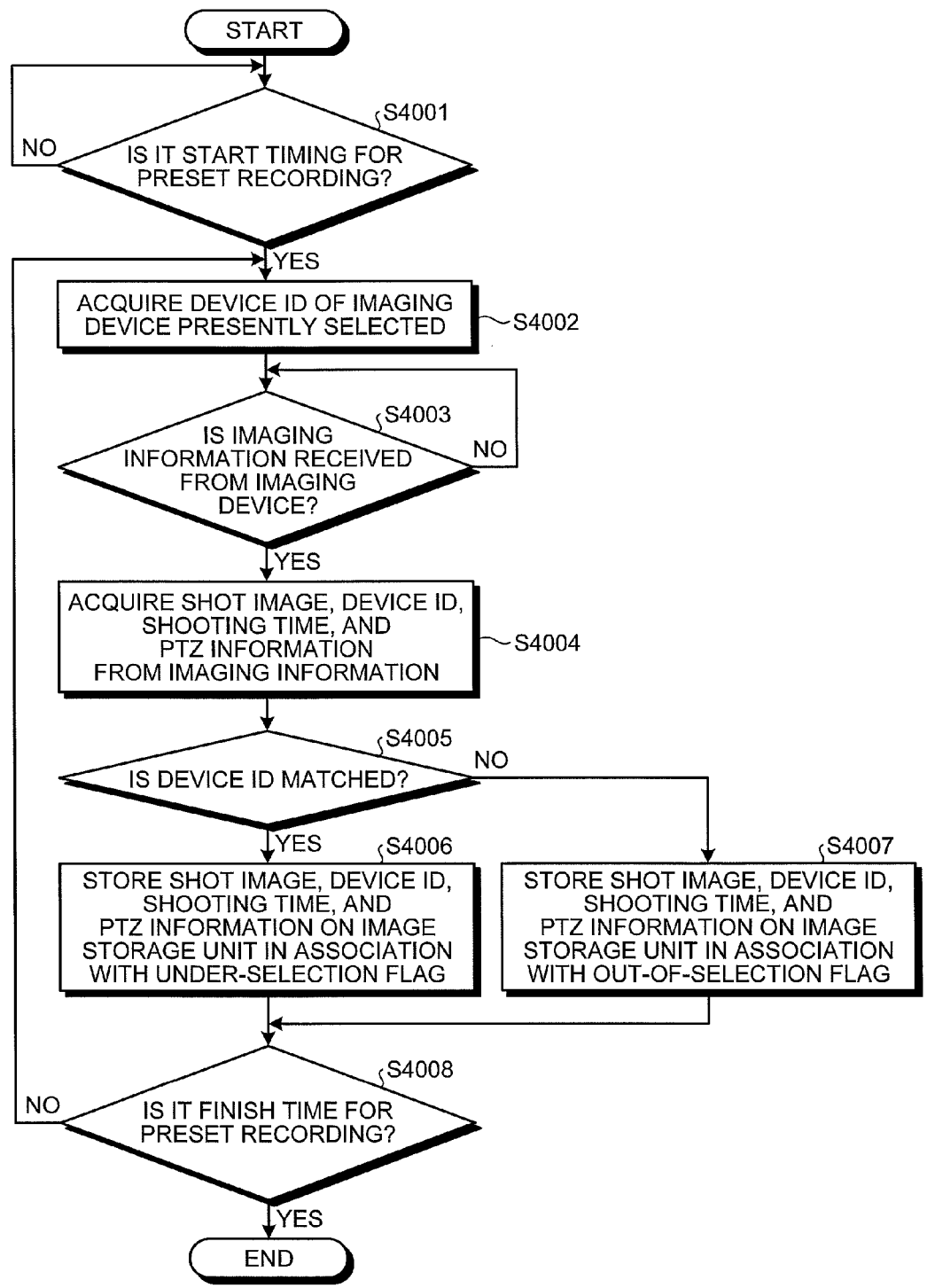
FIG. 45 is a flowchart of the recording operation of a control unit according to the tenth embodiment.

FIG. 45 is a flowchart of the recording operation of the control unit 124 according to the tenth embodiment. As illustrated in FIG. 45, after started, the control unit 124 waits for the recording operation until the start timing for recording is reached (NO in Step S4001). The start timing for recording is recording in which images are decimated in units of frames, not recording all images sent from the camera. In the recording operation, frames are counted and only necessary frames are recorded in order to record images for a long time. When the start timing for recording is reached (YES in Step S4001), the control unit 124 acquires the device ID of the imaging device 20 presently selected by the user (Step S4002). The device ID of the imaging device 20 presently selected by the user may be managed on a cache memory, for example, of a CPU (Central Processing Unit) that implements the control unit 124, for example. Moreover, in the case where there is no imaging device 20 presently selected by the user, the control unit 124 may acquire null data as a device ID, for example.

Subsequently, the control unit 124 waits until receiving imaging information from the imaging device 20 on the network 30 through the communication processing unit 122 (NO in Step S4003). When the control unit 124 receives imaging information from any one of the imaging devices 20 (YES in Step S4003), the control unit 124 identifies the shot image, the device ID, the shooting time, and the PTZ information from the received imaging information using the acquiring unit 123, and acquires them from the acquiring unit 123 (Step S4004). Subsequently, the control unit 124 determines whether the acquired device ID is matched with the device ID identified in Step S4002 (Step S4005).

As a result in determination in Step S4005, in a case where both of the device IDs are matched with each other (YES in Step S4005), the control unit 124 stores the shot image, the device ID, the shooting time, and the PTZ information identified in Step S4004 in the image storage unit 4127 in association with the under-selection flag (Step S4006). On the other hand, in a case where both of the device IDs are not matched with each other (NO in Step S4005), the control unit 124 stores the shot image, the device ID, the shooting time, and the PTZ information identified in Step S4004 on the image storage unit 4127 in association with the out-of-selection flag (Step S4007).

After the storing, the control unit 124 determines whether it is the finish time for preset recording (Step S4008). In the case where the finish time is reached (YES in Step S4008), the control unit 124 finishes the recording operation. On the other hand, in the case where the finish time is not reached (NO in Step S4008), the control unit 124 returns to Step S4002, and performs the operation subsequent to this step.

By the recording operation as described above, the shot image is stored in the image storage unit 4127 in association with the device ID, the shooting time, the PTZ information, and the select flag.

Figure 46:
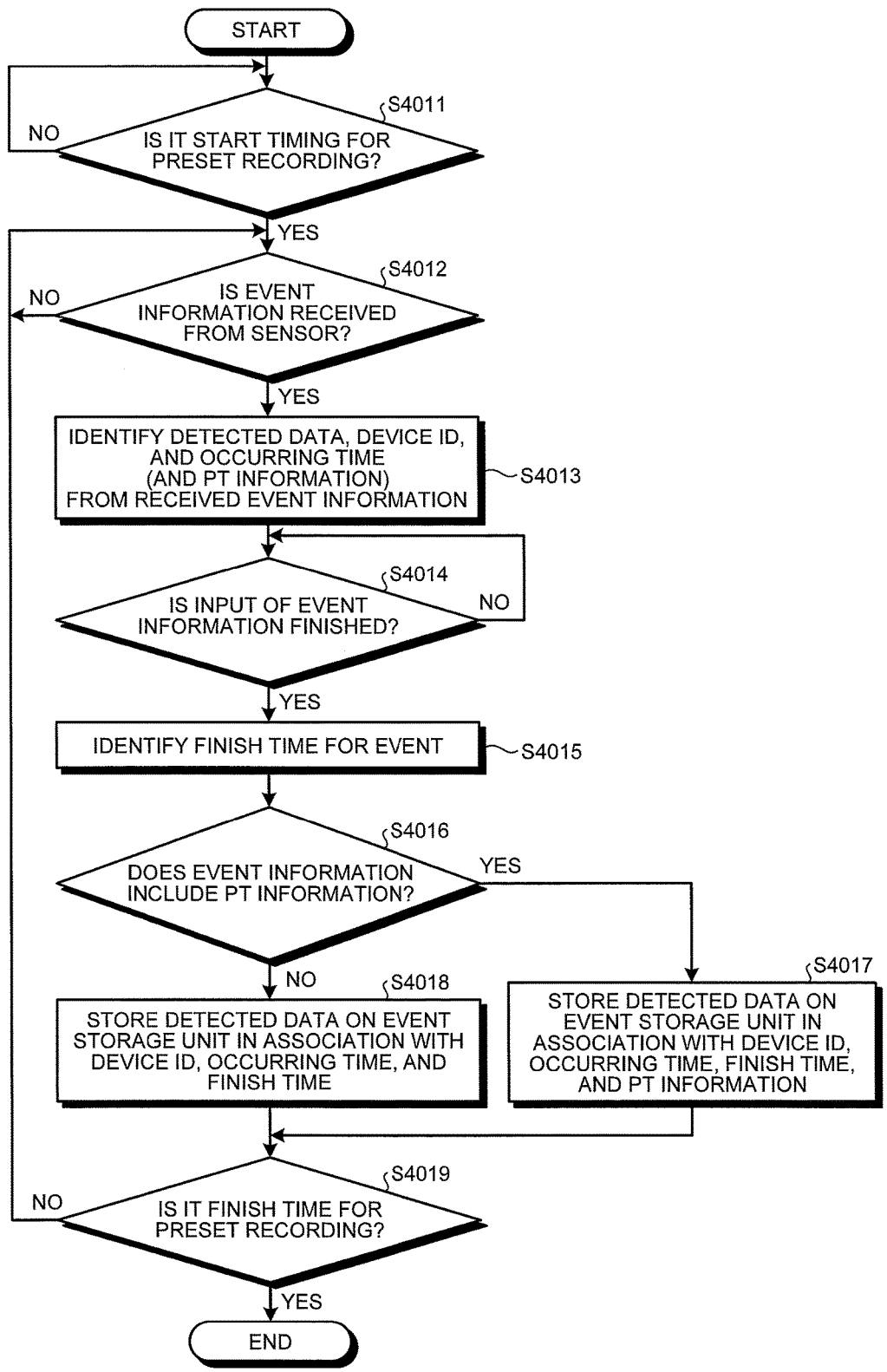
FIG. 46 is a flowchart of the event recording operation of the control unit according to the tenth embodiment.

Moreover, FIG. 46 is a flowchart of the event recording operation of the control unit 124 according to the tenth embodiment. As illustrated in FIG. 46, after started, the control unit 124 waits for the event recording operation until the start time for preset recording is reached (NO in Step S4011). When the start time for preset recording is reached (YES in Step S4011), the control unit 124 waits until receiving event information from the sensor 40 on the network 30 through the communication processing unit 122 (NO in Step S4012). When the control unit 124 receives event information from any one of the sensors 40 (YES in Step S4012), the control unit 124 identifies the detected data, the device ID, and the occurring time (and PT information) from the received event information using the acquiring unit 123; and acquires them from the acquiring unit 123 (Step S4013). Subsequently, the control unit 124 waits for finishing the input of the same event information (NO in Step S4014). When the input is finished (YES in Step S4014), the control unit 124 identifies the finish time (Step S4015).

Subsequently, the control unit 124 determines whether the event information includes PT information (Step S4016). In the case where the event information includes PT information (YES in S4016), the control unit 124 stores the detected data, the device ID, the occurring time, and the PT information identified in Step S4013 and the finish time identified in Step S4015 into the event storage unit 4128 in association with each other (Step S4017). In the storing, it may be fine that the control unit 124 generates an event ID, and stores the event ID into the event storage unit 4128 together with the detected data, the device ID, the occurring time, the finish time, and the PT information. On the other hand, in the case where the event information does not include PT information (NO in Step S4016), the control unit 124 stores the detected data, the device ID, and the occurring time identified in Step S4013 and the finish time identified in Step S4015 into the event storage unit 4128 in association with each other (Step S4018). In the storing, it may be fine that the control unit 124 generates an event ID, and stores the event ID on the event storage unit 4128 together with the detected data, the device ID, the occurring time, and the finish time.

After the storing, the control unit 124 determines whether the finish timing for recording is reached (Step S4019). In the case where the finish timing is reached (YES in Step S4019), the control unit 124 finishes the event recording operation. On the other hand, in the case where the finish timing is not reached (NO in Step S4019), the control unit 124 returns to Step S4012, and performs the subsequent operation.

By the event recording operation as described above, the detected data of the event that is detected at the sensor 40 is stored into the event storage unit 4128 in association with the event ID, the device ID, the occurring time, and the finish time (and the PT information).

Figure 47:
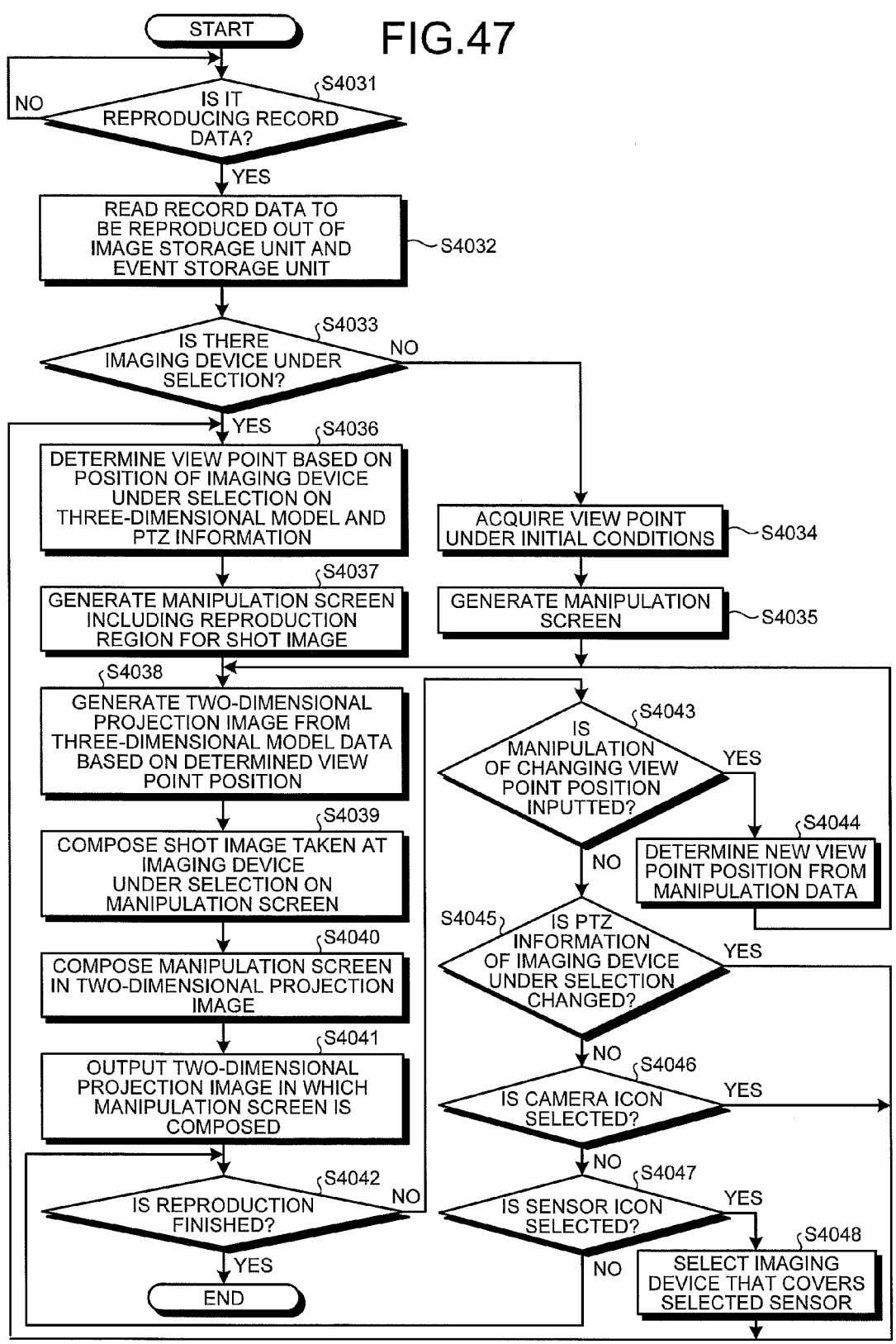
FIG. 47 is a flowchart of an exemplary recording and reproducing operation of the control unit according to the tenth embodiment.

Next, in the following, the operation in recording and reproducing the shot image stored into the image storage unit 4127 will be described in detail with reference to the drawings. FIG. 47 is a flowchart of an exemplary recording and reproducing operation performed at the control unit 124 according to the tenth embodiment. As illustrated in FIG. 47, after started, the control unit 124 waits until an instruction to reproduce record data is input by the user (NO in Step S4031). It is noted that the user may input the instruction to reproduce record data using the manipulating unit 121 of the image processing apparatus 4010.

When the instruction to reproduce record data is received (YES in Step S4031), the control unit 124 reads record data to be reproduced (Step S4032). The record data to be read includes the shot image, the device ID, the shooting time, the PTZ information, and the select flag stored in the image storage unit 4127 and the detected data, the event ID, the device ID, the occurring time, the finish time (and the PT information), and the confirmation flag stored in the event storage unit 4128.

Subsequently, the control unit 124 makes reference to the select flag associated with the first shot image in the read record data, and determines whether there is an imaging device 20 under selection (Step S4033). It is noted that the imaging device 20 under selection referred here is an imaging device being selected by the user at the point in time of starting recording.

In the case where there is an imaging device 20 under selection (YES in Step S4033), the control unit 124 determines the view point position in generating the two-dimensional projection image from three-dimensional model data based on the position of the imaging device 20 under selection on the three-dimensional model (the camera icon position) and the PTZ information associated with the shot image to be reproduced (Step S4036). Moreover, the control unit 124 generates a manipulation screen for inputting manipulations involved in recording and reproduction by the user (Step S4037). This manipulation screen includes a predetermined region for recording and reproducing the shot image (in the following, referred to as a reproduction region). This reproduction region may correspond to a predetermined region in the two-dimensional projection image according to the foregoing embodiments, for example.

On the other hand, in the case where there is no imaging device 20 under selection (NO in Step S4033), the control unit 124 acquires the view point position under the initial conditions related to the corresponding areas from the view point information storage unit 112 described above with reference to FIG. 6, for example (Step S4034). Moreover, the control unit 124 generates a manipulation screen for inputting manipulations involved in recording and reproduction by the user (Step S4035). This manipulation screen may not include a reproduction region for generating the shot image.

After the generating, the control unit 124 generates the two-dimensional projection image from three-dimensional model data based on the view point position determined in Step S4036 or the view point position acquired in Step S4034 (Step S4038). All of camera icons and sensor icons included in the three-dimensional model data at this time reflect the PTZ information of the imaging device 20 and the PT information of the sensor 40 read in Step S4032, for example. Therefore, the three-dimensional model data in reproduction is three-dimensional model data that the motion (such as changes) of the three-dimensional model data in the recording period is reproduced as it is, as similar to three-dimensional model data in live streaming reproduction according to the foregoing embodiments. In the reproduction, it may be fine that each of the camera icons are reproduced by pop-up display using the shot images acquired at the imaging devices 20 (or thumbnails of the images) associated with each camera icon, as similar to the foregoing embodiments.

Subsequently, the control unit 124 composes the shot image read in Step S4032 on the manipulation screen generated in Step S4037 (Step S4039). It is noted that the shot image composed in the manipulation screen is in turn changed in a series of shot images in a time series along a time base. Thus, the shot image is reproduced on the reproduction region in the manipulation screen.

Subsequently, the control unit 124 composes the manipulation screen on which the shot image is composed in Step S4039 in the two-dimensional projection image generated in Step S4038 (Step S4040). Subsequently, the control unit 124 outputs the two-dimensional projection image on which the manipulation screen is composed to the output unit 126 such as a monitor (Step S4041), and displays the two-dimensional projection image.

Subsequently, the control unit 124 determines whether the reproduction of record data is finished (Step S4042). This determination may be made as based on whether a reproduction stop button is input from the manipulation screen and whether the reproduction of record data is finished to the end of the data, for example. In the case where the control unit 124 determines that reproduction is finished (YES in Step S4042), the control unit 124 finishes the recording and reproducing operation. On the other hand, in the case where the control unit 124 determines that reproduction is not finished (NO in Step S4042), the control unit 124 determines whether the user inputs a manipulation of changing the view point position, for example (Step S4043). It is noted that an input method for a manipulation of changing the view point position may be as similar to the input method for a manipulation of the pan direction, the tilt direction, and the zoom lens focal length of the imaging device 20 according to the foregoing embodiments.

In the case where a manipulation of changing the view point position input is made (YES in Step S4043), the control unit 124 determines a new view point position from manipulation data input to the manipulating unit 121 (Step S4044). It is noted that the user manipulation on the view point position in Step S4044 may be as similar to the user manipulation on the imaging device 20 according to the foregoing embodiments. In this case, manipulation data input from the manipulating unit 121 is used for calculating an amount of the view point position changed with respect to the three-dimensional model, and not sent as a control signal to the imaging device 20. After the determining, the control unit 124 returns to Step S4038, and performs the operation subsequent to this step.

On the other hand, in the case where a manipulation of changing the view point position input is not made (NO in Step S4043), the control unit 124 determines whether the PTZ information of the imaging device 20 under selection identified in Step S4033 is changed in the record data read in Step S4032 (Step S4045). In the case where the PTZ information is changed (YES in Step S4045), the control unit 124 returns to Step S4036, and performs the operation subsequent to this step based on the changed PTZ information.

On the other hand, in the case where the PTZ information is not changed (NO in Step S4045), the control unit 124 determines whether the user selects a camera icon in the two-dimensional projection image (Step S4046). In the case where a camera icon is selected (YES in Step S4046), the control unit 124 returns to Step S4036, and performs the operation subsequent to this step based on the position of the selected camera icon on the three-dimensional model and the PTZ information corresponding to the device ID of the camera.

On the other hand, in the case where a camera icon is not selected (NO in Step S4046), the control unit 124 determines whether the user has selected a sensor icon in the two-dimensional projection image (Step S4047). In the case where a sensor icon has been selected (YES in Step S4047), the control unit 124 selects the cover camera ID (the device ID) associated with the device ID of the selected sensor icon from the sensor management table illustrated in FIG. 44 (Step S4048). After the selecting, the control unit 124 returns to Step S4036, and performs the operation subsequent to this step based on the position of the imaging device 20 corresponding to the newly selected device ID on the three-dimensional model and the PTZ information corresponding to this device ID.

The recording and reproducing operation as described above is performed, so that the live streaming reproduction of the monitor image in recording can be reproduced as it is. Moreover, in the recording and reproducing operation illustrated in FIG. 47, such manipulations are made possible in which the imaging device 20 under selection and the sensor 40 are switched as necessary, or the view point position with respect to the three-dimensional model is moved regardless of the relation with the camera icon position under selection, for example. Therefore, the user can confirm the monitor images in the past more easily and more in detail.

Next, in the following, an exemplary composite image displayed on the output unit 126 of the image processing apparatus 4010 by the reproduction operation described above will be described in detail with reference to the drawings.

Figure 48:
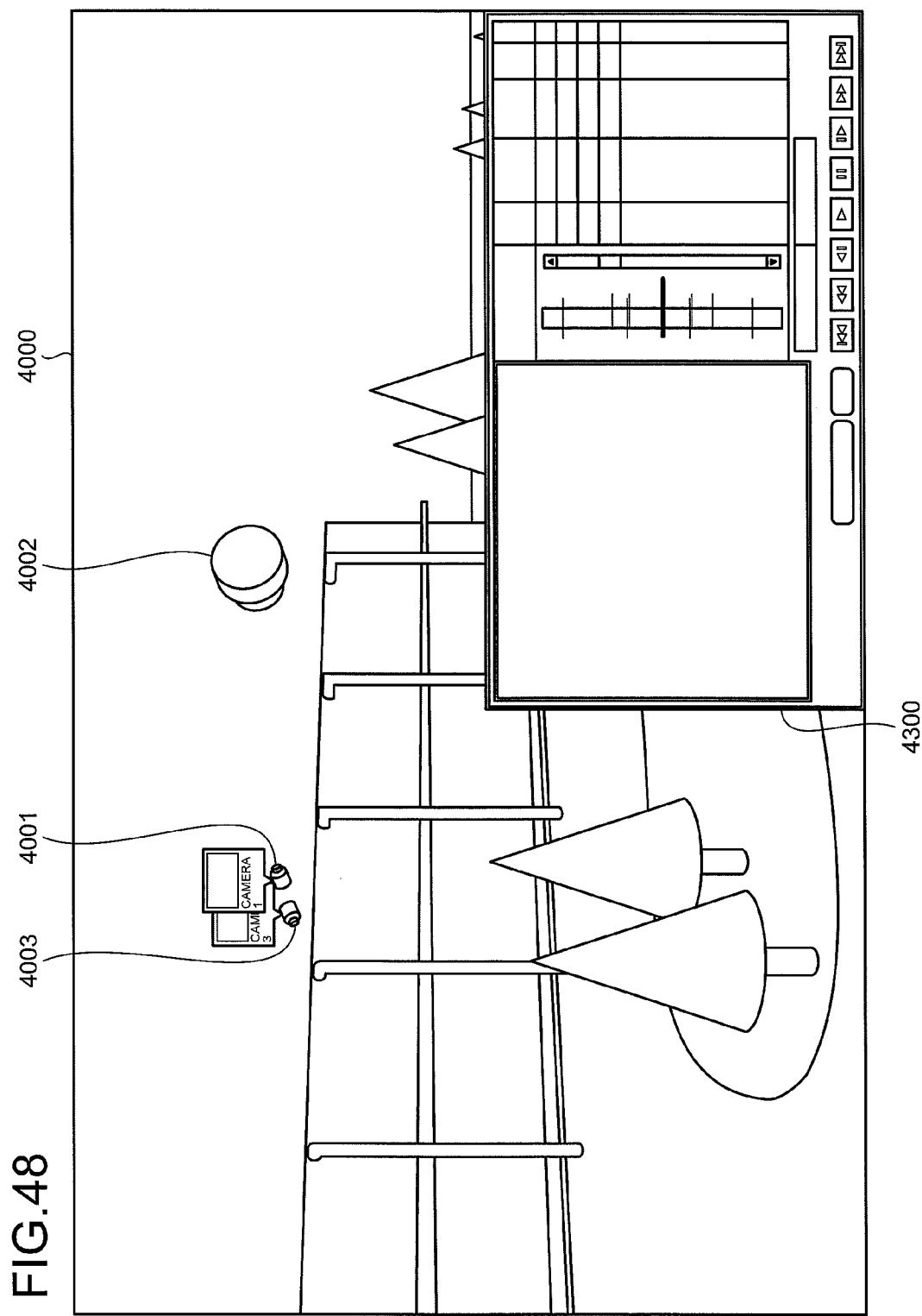
FIG. 48 is a diagram of an exemplary composite image according to the tenth embodiment.

The recording and reproduction of the monitor image according to the tenth embodiment may be a form to reproduce the live streaming reproduction of the monitor image according to any one of the foregoing embodiments. FIG. 48 is a diagram of an exemplary composite image generated in Step S4040 in FIG. 47. As illustrated in FIG. 48, as similar to the composite image in live streaming reproduction according to the foregoing embodiments, a manipulation screen 4300 is composed in a composite image 4000 as a background of two-dimensional projection image including camera icons 4001, 4002, and 4003, for example. It is noted that the manipulation screen 4300 may be disposed in the center part for example, not limited to the lower right of the two-dimensional projection image. Moreover, various items of information may be displayed on the manipulation screen 4300 other than shot images to be displayed.

Figure 49:
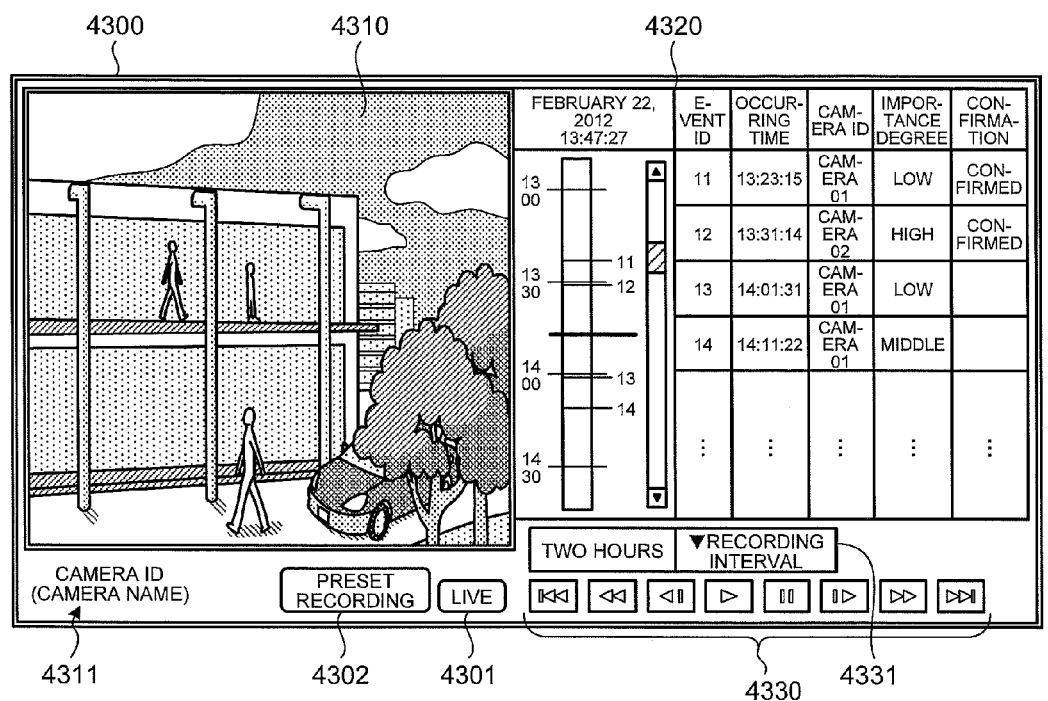
FIG. 49 is a diagram of an exemplary manipulation screen illustrated in FIG. 48.

Here, FIG. 49 is an example of the manipulation screen 4300. As illustrated in FIG. 49, the manipulation screen 4300 includes a shot image reproduction region 4310 in which a shot image is recorded and reproduced and an event display region 4320 in which information about various events is displayed. Moreover, on the manipulation screen 4300, the following may be displayed, including: identification information (a camera ID or a camera name) 4311 about the imaging device 20 that acquires the shot image displayed in the shot image reproduction region 4310, that is, the imaging device 20 under selection; a preset recording and reproduction button 4302 that reproduces record data recorded by preset recording; a live button 4301 that switches between a display to the output unit 126 and the live streaming reproduction of the shot image (the monitor image); a manipulation button group 4330 that the user manipulates to replay, stop, skip, and fast forward during recording and reproduction, and so forth; and a recording interval button 4331 that sets time intervals for recording.

On the event display region 4320, the following may be displayed, including: the shooting time of the shot image presently being displayed in the shot image reproduction region 4310 (may be a date and time); a time series list of event IDs; the occurring time of the events corresponding to the individual event IDs; a cover camera ID (the device ID) of the imaging device 20 covering the sensor 40 corresponding to the individual event IDs; an importance degree in association with the events or the sensors 40 that detect the events; and a confirmation flag expressing whether the user confirms the events. Moreover, a time bar may be displayed in the event display region 4320, which expresses which part of record data is presently reproduced. This time bar may be added with indexes that express the occurring time of the events.

On the manipulation screen as described above, when the user selects the preset recording and reproduction button 4302, a list of record data files preset-recorded, for example, on the output unit 126. When the user selects any one of the files from this list, the control unit 124 performs the operation of recording and reproducing the selected file. This recording and reproducing operation is the operation described with reference to FIG. 47 in the description above. On the other hand, when the user selects the live button 4301 on the manipulation screen, the composite image displayed on the output unit 126 is switched from the composite image 4000 for recording and reproducing the record data to the composite image for performing live streaming reproduction of a live image (a monitor image). See FIGS. 9 and 12, for example.

Furthermore, the recording interval button 4331 is a pulldown menu button, for example, on the manipulation screen. When the user selects the recording interval button 4331, a list of settable recording intervals is displayed (for example, a full frame (30 frames/second), 15 frames/second, ten frames/second, five frames/second, one frame/second, and so on). When the user selects any one of the recording intervals listed up (ten frames/second, for example), the selected recording interval (ten frames/second, for example) is set on the control unit 124, for example. The control unit 124 repeats the recording operation illustrated in FIG. 45 and the recording operation illustrated in FIG. 46 for the individual recording intervals thus set.

The configurations and the operations as described above are provided, so that it is possible for the user to intuitively grasp the region taken at the camera also in recording and reproduction as similarly in the live streaming reproduction of the monitor image according to the foregoing embodiments. It is noted that the other configurations, the operations, and the effects may be as similar to any one of the foregoing embodiments, and the detailed description is omitted here. However, in the tenth embodiment, the case is exemplified where the image processing apparatus 4010 acquires imaging information and event information from the imaging device 20 and the sensor 40 via the network 30. However, the embodiment is not limited thereto. For example, such a configuration may be fine in which the imaging device 20 and the sensor 40 individually include a storage device, and the image processing apparatus 4010 acquires imaging information and event information stored in these storage devices online or offline. Alternatively, such a configuration may be fine in which the imaging device 20 and the sensor 40 directly send imaging information and event information to a storage device on the network 30, and the image processing apparatus 4010 acquires imaging information and event information stored in this storage device via the network 30.

Eleventh Embodiment

Figure 50:
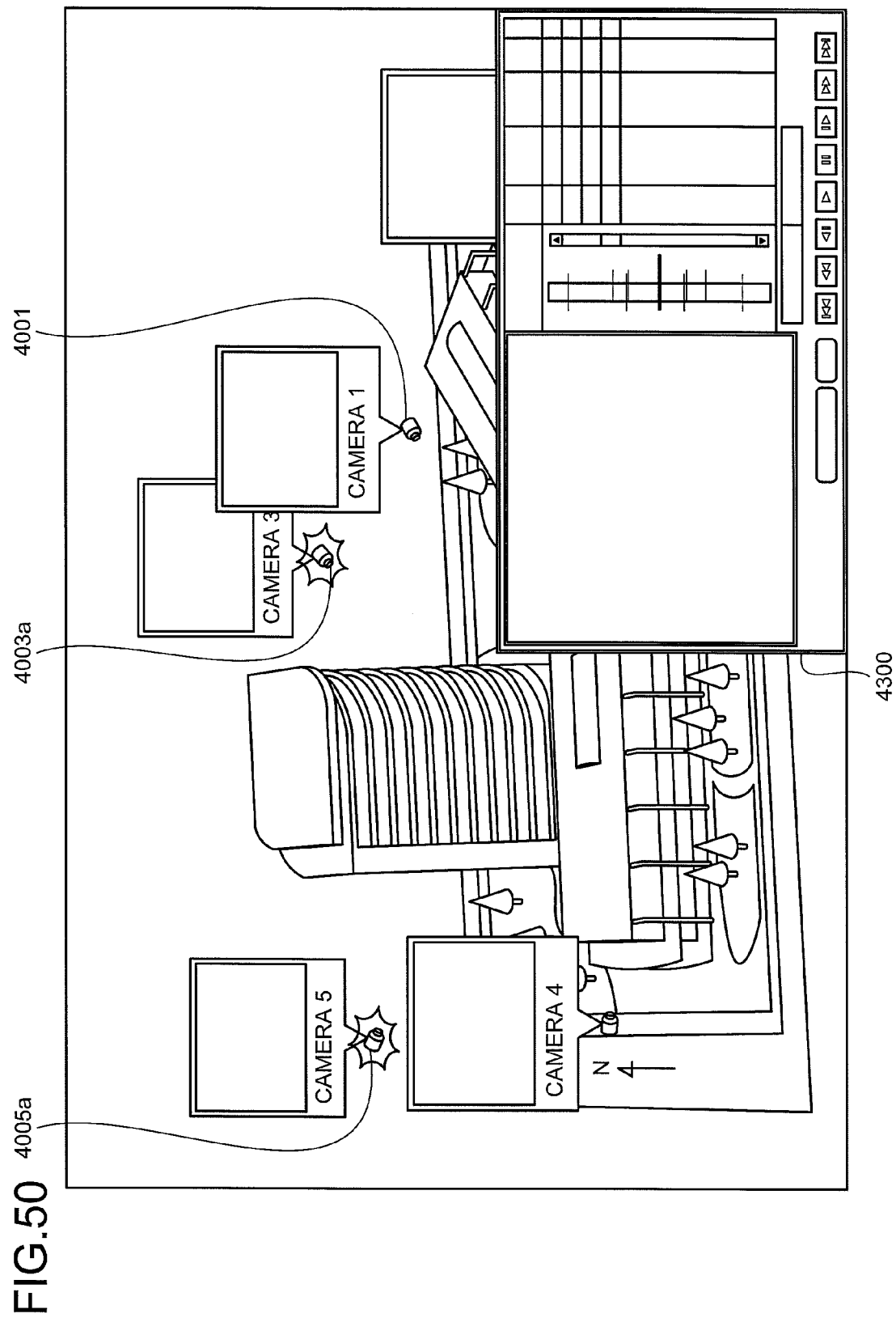
FIG. 50 is a diagram of an exemplary composite image according to an eleventh embodiment.

Moreover, in the tenth embodiment and the forgoing other embodiments, the icons of the sensor 40 and the imaging device 20 that detect events may be highlighted in the two-dimensional projection image. For example, in the case where the imaging devices 20 detect the motion of the shot image and the imaging devices 20 also function as the sensor 40, as illustrated in FIG. 50 camera icons 4003a and 4005a corresponding to the imaging devices 20 that detect an event may be highlighted in the camera icons corresponding to the imaging devices 20. FIG. 50 is a diagram of an exemplary composite image according to an eleventh embodiment. For highlighting various icons, various display methods can be used including for example flashing, coloring with a color different from the background (red, for example), and enlarging.

Highlighting various icons can be implemented by temporarily replacing an icon image to be associated with the device ID of the device to be highlighted (the sensor 40 and the imaging device 20) with another icon image for highlighting for example. In this case, since an icon image for highlighting is incorporated in three-dimensional model data instead of a typical icon image, an icon image in a two-dimensional projection image generated from this three-dimensional model data is also highlighted.

It is noted that here, as similar to the foregoing embodiments, the case is taken as an example where an icon in a two-dimensional projection image generated from three-dimensional model data is highlighted. However, the case is not limited thereto. For example, instead of three-dimensional model data, a two-dimensional model may be used in which a layout similar to the three-dimensional model data is mapped in a two-dimensional plane in parallel with the ground (or a floor surface). In this case, this original two-dimensional model is composed in the shot image and the manipulation screen and displayed on the output unit 126, and icons for highlighting are used for various icons mapped in the two-dimensional model in display. Thus, as similar to the case of the foregoing three-dimensional model, various icons mapped in the two-dimensional model are highlighted as necessary. The other configurations, the operations, and the effects may be as similar to the foregoing embodiments, and the detailed description is omitted here.

Program

Moreover, the configuration of the image processing apparatus 10 is implemented as hardware, for example, using a CPU (Central Processing Unit), a memory, and other LSI (Large Scale Integration) of a given computer. Similarly, the configuration of the image processing apparatus 10 can be implemented as software, for example, using a program, for example, loaded on a memory. In the embodiments described above, the description is made as functional blocks are implemented in cooperation with hardware or software. Namely, these functional blocks can be implemented in various forms using only hardware, only software, or the combination of hardware and software.

Figure 51:
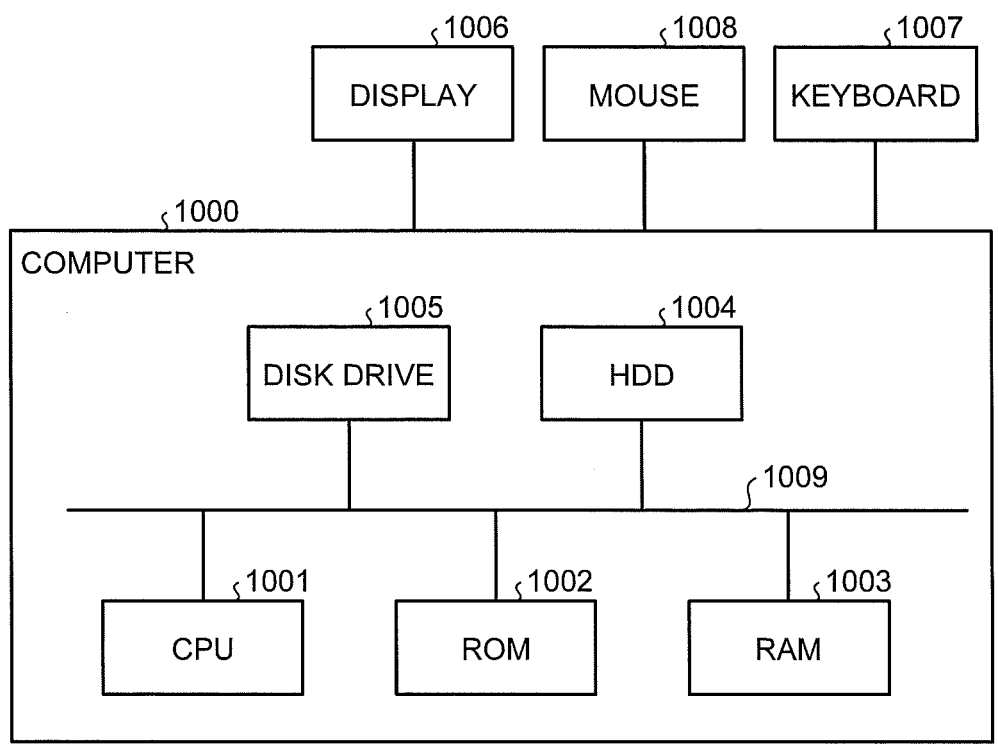
FIG. 51 is a diagram of a computer for implementing an image processing program.

FIG. 51 is a diagram of a computer for implementing an image processing program. For example, as illustrated in FIG. 51, a computer 1000 as the image processing apparatus 10 includes a controller such as a CPU (Central Processing Unit) 1001 connected through a bus 1009, storage devices such as ROM (Read Only Memory) 1002 and RAM (Random Access Memory) 1003, an external storage device such as an HDD (Hard Disk Drive) 1004 and a disk drive 1005, a display device such as a display 1006, and input devices such as a keyboard 1007 and a mouse 1008, in a hardware configuration using a typical computer. Various items of information on the foregoing three-dimensional model storage unit 111 and the view point information storage unit 112 are stored into the storage devices or the external storage device.

An image processing program executed on the image processing apparatus 10 is, as an aspect, provided as recorded in an installable format or an executable format file on a computer readable recording medium such as a CD-ROM, a flexible disk (FD), a CD-R, and a DVD (Digital Versatile Disk). Moreover, such a configuration may be fine in which the image processing program executed on the image processing apparatus 10 is stored into a computer connected to a network such as the Internet and is provided by downloading the program via the network. Furthermore, such a configuration may be fine in which the image processing program executed on the image processing apparatus 10 is provided or distributed via network such as the Internet. In addition, such a configuration may be fine in which the image processing program is installed and provided on ROM, for example.

The image processing program executed on the image processing apparatus 10 has a module configuration including the functional units described above (the acquiring unit 123, the composing unit 125, and the output unit 126). The CPU (the processor), as actual hardware, reads the image processing program out of the recording medium and executes the program. The functional units described above are loaded on a main storage device, and the acquiring unit 123, the composing unit 125, and the output unit 126 are generated on the main storage device, and perform processes using various items of information stored in the storage device or the external storage device.

Moreover, the process procedures, control procedures, specific names, and information including various items of data and parameters illustrated in the specification and the drawings can be freely modified unless otherwise specified. For example, various items of information stored in the three-dimensional model storage unit 111 are appropriately modified when the area 50 to be taken is changed.

The Configuration

Moreover, the illustrated components of the image processing apparatus 10 are functional and conceptual components, which are not necessarily physically configured as illustrated. Namely, the specific forms of distribution and integration of the devices are not limited to ones illustrated in the drawings. All or a part of the devices can be functionally or physically distributed to or integrated in given units depending on various loads or use situations, for example. For example, the composing unit 125 may be distributed both into "a generating unit" that determines the view point of a three-dimensional model based on the camera position and generates a two-dimensional projection image that is a two-dimensional image in which a three-dimensional model is projected onto a two-dimensional plane based on the determined view point and the shooting direction and into "a composing unit" that generates a composite image by composing a shot image in a predetermined region of the two-dimensional projection image.

It is noted that in the foregoing embodiments, an example is taken and described where the image processing apparatus 10 is applied to the monitoring system 1. However, the image processing apparatus 10 can be applied to other various applications such as a distribution system that distributes live images in real time, other than the monitoring system 1.

According to an aspect of the present invention, such an effect is exerted that a region taken at a camera can be intuitively grasped.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a three-dimensional model storage unit configured to store a three-dimensional model data expressing a three-dimensional model of a three-dimensional region, positions of a plurality of devices including a camera disposed in the three-dimensional region as positions in the three-dimensional model, and a plurality of device icons expressing types of the devices in the three-dimensional model;
an acquiring unit read from a non-transitory recording medium and implemented by a processor configured to acquire a shot image taken at the camera and a shooting direction when shooting;
a composing unit read from the non-transitory recording medium and implemented by the processor configured to determine a view point with respect to the three-dimensional model as the camera position disposed in the three-dimension region, generate a three-dimensional model by disposing the device icons corresponding to the device types on positions of the devices stored in the three-dimensional model storing unit according to the determined view point and the shooting direction, generate a two-dimensional projection image that the three-dimensional model is projected from a same direction as the shooting direction, at a same scaling factor as a scaling factor of the shot image, onto a two-dimensional plane, and generate a composite image by composing the shot image in a predetermined region that is generated so as to match a center position of the generated two-dimensional projection image with a center position of said shot image, on the generated two-dimensional projection image; and
an output unit read from the non-transitory recording medium and implemented by the processor configured to output the composite image, wherein the composing unit is configured to display, in case that said device icon is displayed overlapping with the predetermined region when the device icon not corresponding to the camera is displayed on the composite image, the predetermined region in the foreground rather than said device icon.

2. The image processing apparatus according to claim 1, wherein the acquiring unit further acquires zoom information about the camera when shooting, and the composing unit determines an angle of view with respect to the three-dimensional model based on the zoom information, and generates the two-dimensional projection image from the three-dimensional model according to the angle of view.

3. The image processing apparatus according to claim 1, wherein a camera icon corresponding to a camera in the plurality of device icons is an icon that is able to express a shooting direction, and the composing unit matches a shooting direction expressed by the camera icon stored in the three-dimensional model storage unit with a shooting direction of the camera acquired by the acquiring unit, and disposes the camera icon at a position in the three-dimensional model.

4. The image processing apparatus according to claim 1, wherein the composing unit generates the composite image by further composing a shot image taken at a different camera at a position associated with a different camera icon corresponding to a different camera different from the camera composed with the shot image as a region smaller than a predetermined region of the two-dimensional projection image composed with the shot image.

5. The image processing apparatus according to claim 1, wherein the acquiring unit, when a camera icon corresponding to a camera is selected from the plurality of device icons by a user manipulation, acquires the shot image and the shooting direction of the camera corresponding to the camera icon.

6. The image processing apparatus according to claim 1, wherein the composing unit makes a predetermined object included in the composite image transparent so that the device icon is displayed in the composite image.

7. The image processing apparatus according to claim 1, further comprising:
a manipulating unit comprising at least one of a mouse or a touch panel configured to accept a manipulation on the composite image by a user; and
a switch instruction unit read from the non-transitory recording medium and implemented by the processor configured to calculate a moving direction and a moving angle of a shooting direction according to a predetermined user manipulation on the composite image, and instruct the camera to switch a shooting direction according to the moving direction and the moving angle of the shooting direction that are calculated.

8. An image processing method comprising:
a three-dimensional model storing step configured to store, in a storage unit, a three-dimensional model data expressing a three-dimensional model of a three-dimensional region, positions of a plurality of devices including a camera disposed in the three-dimensional region as camera positions in the three-dimensional model, and a plurality of device icons expressing types of the devices in the three-dimensional model;
an acquiring step configured to acquire a shot image taken at the camera and a shooting direction when shooting;
a composing step configured to determine a view point with respect to the three-dimensional model as the camera position, disposed in the three-dimension region, generate a three-dimensional model by disposing the device icons corresponding to the device types on positions of the devices stored in the three-dimensional model storing unit according to the determined view point and the shooting direction, generate a two-dimensional projection image that the three-dimensional model is projected from a same direction as the shooting direction, at a same scaling factor as a scaling factor of the shot image, onto a two-dimensional plane, and generate a composite image by composing the shot image in a predetermined region that is generated so as to match a center position of the generated two-dimensional projection image with a center position of said shot image, on the generated two-dimensional projection image; and
an outputting step configured to output the composite image, wherein the composing step is configured to display, in case that said device icon is displayed overlapping with the predetermined region when the device icon not corresponding to the camera is displayed on the composite image, the predetermined region in the foreground rather than said device icon.

9. A non-transitory computer readable medium having computer-readable program codes therein that, when executed, causes a computer to execute the image processing method according to claim 8.

10. An image processing apparatus comprising:
a three-dimensional model storage unit configured to store a three-dimensional model data expressing a three-dimensional model of a three-dimensional region, and a position of a camera disposed in the three-dimensional region as a position in the three-dimensional model;
an acquiring unit read from a non-transitory recording medium and implemented by a processor configured to acquire a shot image taken at the camera and a shooting direction when shooting;
an image storing unit configured to store the shot image and the shooting direction that are acquired;
a manipulation unit comprising at least one of a mouse or a touch panel configured to receive a play-back instruction of the shot image stored in the image storing unit;
a composing unit read from the non-transitory recording medium and implemented by the processor configured to, when the play-back instruction is received, determine a view point with respect to the three-dimensional model according to the camera position disposed in the three-dimensional region, generate a two-dimensional projection image by projecting the three-dimensional model onto a two-dimensional plane according to the determined view point and the shooting direction stored in the image storing unit, and generate a composite image by composing the shot image stored in the image storing unit onto a predetermined region on the generated two-dimensional projection image; and
an output unit read from the non-transitory recording medium and implemented by the processor configured to output the composite image that is composed, wherein the three-dimensional model further includes another camera icon corresponding to another camera that is different from the camera in the three-dimension region, the acquiring unit acquires selection information indicating whether the camera, when taking the shot image, was in a state selected by the user, a shot image acquired by the another camera, a shooting direction of the another camera when acquiring the shot image, and a selection information indicating whether the another camera, when taking the shot image, was in a state selected by the user, the image storing unit further stores a selection information indicating whether the camera was in a selected state selected by the user when shooting in a corresponding manner with the shot image, and further stores the shot image taken by the another camera, a shooting direction of the another camera when acquiring the shot image, and a selection information indicating whether the another camera was in a selected state selected by the user when shooting in a corresponding manner, and the composing unit, when the manipulation unit receives a selection of the camera icon for the another camera, newly determines a view point position for the three-dimensional model according to a position of the another camera in the three-dimensional model, generates two-dimensional projection image for the three-dimensional model according to the newly determined view point position and the shooting direction corresponding to the shot image taken by the another camera corresponding to the another camera icon, and generates newly a composite image by composing the shot image, which is acquired by the another camera and stored in the image storing unit, onto a predetermined region of the newly generated two dimension project image.

11. An image processing apparatus comprising:
a three-dimensional model storage unit configured to store a three-dimensional model data expressing a three-dimensional model of a three-dimensional region, and a position of a camera disposed in the three-dimensional region as a position in the three-dimensional model; an acquiring unit read from a non-transitory recording medium and implemented by a processor configured to acquire a shot image taken at the camera and a shooting direction when shooting;
an image storing unit configured to store, in a corresponding manner, the shot image and the shooting direction that are acquired;
a manipulation unit comprising at least one of a mouse or a touch panel configured to receive a play-back instruction of the shot image stored in the image storing unit;
a composing unit read from the non-transitory recording medium and implemented by the processor configured to, when the play-back instruction is received, determine a view point with respect to the three-dimensional model according to the camera position disposed in the three-dimensional region, generate a two-dimensional projection image by projecting the three-dimensional model onto a two-dimensional plane according to the determined view point and the shooting direction stored in the image storing unit, and generate a composite image by composing the shot image stored in the image storing unit onto a predetermined region on the generated two-dimensional projection image; and
an output unit read from the non-transitory recording medium and implemented by the processor configured to output the composite image that is composed,
wherein
the three-dimensional model further includes another camera icon corresponding to another camera that is different from the camera in the three-dimension region,
the manipulation unit is configured to receive a user's selection of the another camera icon corresponding to the another camera that is different from the camera in the two-dimensional projection region,
the acquiring unit is further configured to acquire a shot image taken at the another camera and a shooting direction when shooting, the image storing unit further stores, in a corresponding manner, the shot image acquired by the acquiring unit and taken by the another camera, and the shooting direction of the another camera when acquiring the shot image,
the composing unit, when the manipulation unit receives a selection of the camera icon for the another camera,
newly determines a view point position for the three-dimensional model according to a position of the another camera in the three-dimensional model,
generates two-dimensional projection image for the three-dimensional model according to the newly determined view point position and the shooting direction corresponding to the shot image taken by the another camera corresponding to the another camera icon, and
generates newly a composite image by composing the shot image, which is acquired by the another camera and stored in the image storing unit, onto a predetermined region of the newly generated two dimension project image.

12. An image processing apparatus comprising:
a three-dimensional model storage unit configured to store a three-dimensional model data expressing a three-dimensional model of a three-dimensional region, and a position of a plurality of cameras disposed in the three-dimensional region as positions in the three-dimensional model;
an acquiring unit read from a non-transitory recording medium and implemented by a processor configured to acquire a shot image taken at the camera and a shooting direction when shooting;
an image storing unit configured to store the shot image and the shooting direction that are acquired;
a manipulation unit comprising at least one of a mouse or a touch panel configured to receive a play-back instruction of the shot image stored in the image storing unit;
a composing unit read from the non-transitory recording medium and implemented by the processor configured to, when the play-back instruction is received, determine a view point with respect to the three-dimensional model according to the camera position disposed in the three-dimensional region, generate a two-dimensional projection image by projecting the three-dimensional model onto a two-dimensional plane according to the determined view point and the shooting direction stored in the image storing unit, and generate a composite image by composing the shot image stored in the image storing unit onto a predetermined region on the generated two-dimensional projection image;
an output unit read from the non-transitory recording medium and implemented by the processor configured to output the composite image that is generated; a plurality of sensor icons configure to correspond to a plurality of sensors in the three-dimensional region;
a sensor management table configured to manage association with the plurality of sensors and the plurality of camera icons corresponding to the plurality of cameras; wherein
the manipulation unit is configured to receive use's selection of one sensor icon from the plurality of the sensor icons in the two-dimensional projection image,
the composing unit, when the manipulation unit receives the selection of the sensor icon, identifies a camera icon corresponding to the selected sensor icon from the sensor management table,
newly determines a view point position for the three-dimensional model based on a position of the identified camera icon in the three-dimensional model,
generates the two-dimensional projection image for the three-dimensional model according to the newly determined view point position and a shooting direction corresponding to the shot image taken by the camera corresponding to the identified camera icon, and
generates newly a composite image by composing the shot image, which is acquired by the camera corresponding to the identified camera icon that corresponds to the selected sensor icon and stored in the image storing unit onto a predetermined region of the generated two dimension project image by using the newly determined view point position.

13. The image processing apparatus according to claim 1, wherein the composing unit is configured to
display, when the device icon displayed on the composite image corresponds to a first camera icon of a first camera that is differentiate from the camera, a first shot image taken at the first camera on a first pop-up region disposed at a position of the first camera in the composite image, and be able to switch between
- (i) a first displaying state where a size of the first camera icon and a size of the first pop-up region corresponding to said first camera icon, in the composite image, are changed according to a distance between the camera and the first camera and
- (ii) a second displaying state where the size of the first camera icon is kept at a predetermined size and the size of the first pop-up region is changed according to the distance between the camera and the first camera.

14. The image processing apparatus according to claim 13, wherein when a second camera icon corresponding to a second camera differing from the first camera, a second pop-up region corresponding to the second camera icon and the first pop-up region are in the composite image, and in case that the second pop-up region corresponding to the second camera icon is displayed overlapping with the first pop-up region, the composing unit is configured to display, when a second distance corresponding to a distance between the second camera and the camera is smaller than a first distance corresponding to a distance between the first camera and the camera, the second pop-up region in the foreground than the first pop-up region.

* * * * *